(12) United States Patent
Geshwind

(10) Patent No.: US 6,661,463 B1
(45) Date of Patent: Dec. 9, 2003

(54) METHODS AND DEVICES FOR TIME-VARYING SELECTION AND ARRANGEMENT OF DATA POINTS WITH PARTICULAR APPLICATION TO THE CREATION OF NTSC-COMPATIBLE HDTV SIGNALS

(76) Inventor: David Michael Geshwind, 111 Fourth Ave., New York, NY (US) 10003

(*) Notice: Subject to any disclaimer, the term of this patent is extended or adjusted under 35 U.S.C. 154(b) by 0 days.

(21) Appl. No.: 08/485,383

(22) Filed: Jun. 7, 1995

Related U.S. Application Data

(63) Continuation-in-part of application No. 07/077,916, filed on Jul. 27, 1987, application No. 08/485,383, which is a continuation-in-part of application No. 08/110,230, filed on Aug. 23, 1993, now abandoned, which is a continuation-in-part of application No. 07/435,487, filed on Aug. 17, 1989, now abandoned, which is a continuation-in-part of application No. 07/227,403, filed on Dec. 17, 1986, now Pat. No. 4,925,294, and a continuation-in-part of application No. 07/006,291, filed on Jan. 20, 1987, now Pat. No. 5,050,894, which is a continuation of application No. 06/601,091, filed on Apr. 20, 1984, now abandoned, which is a continuation-in-part of application No. 06/492,816, filed on May 9, 1983, now Pat. No. 4,606,625, application No. 08/485,383, which is a continuation-in-part of application No. 07/951,267, filed on Sep. 25, 1992, now abandoned, which is a continuation-in-part of application No. 07/435,487, and a continuation-in-part of application No. 07/077,916.

(51) Int. Cl.$^7$ .................................................. H04N 7/12
(52) U.S. Cl. .................... 348/384; 348/903; 348/904; 348/435; 348/426

(58) Field of Search ................................. 348/384, 390, 348/426, 427, 397, 571, 432, 435, 913, 903, 904, 441, 459

(56) References Cited

U.S. PATENT DOCUMENTS

| 2,940,005 | A | * | 6/1960 | Toulon | 348/384 |
| 4,004,095 | A | * | 1/1977 | Cardone | 381/1 |

* cited by examiner

Primary Examiner—Victor R. Kostak

(57) ABSTRACT

Processes for selecting, manipulating and arranging data points or pixels derived from information bearing signals are useful to reduce the bandwidth of, or improve the perceived quality of, such a signal as transmitted and displayed. The techniques utilize time-varying sampling schemes and take into account the characteristics of the human visual system. For each information frame, a subset (3) of all possible data points (1) is selected (2). A further subset of active data points (5) is selected (4) for which data will actually be sampled. The active points (5) are further divided (6) into points for which a value will be transmitted (x-points) (7) and points which will be sampled but for which no separate value will be transmitted (o-points) (8). A mathematical association between the x-points and o-points is made (9) and new values to be transmitted are calculated for the x-points (10). The parameters of the selection and association processes are varied in a non-trivial manner and the, now modified, cycle repeated (11) for subsequent data frames. In particular, the techniques may be used to process a high-definition television signal prior to its storage, or transmission over a low-bandwidth channel.

22 Claims, 55 Drawing Sheets

SOURCE

| A* 11 | B 11 | A* 12 | B 12 | A* 13 | B 13 |
|---|---|---|---|---|---|
| D 11 | C 11 | D 12 | C 12 | D 13 | C 13 |
| A* 21 | B 21 | A* 22 | B 22 | A* 23 | B 23 |
| D 21 | C 21 | D 22 | C 22 | D 23 | C 23 |
| A* 31 | B 31 | A* 32 | B 32 | A* 33 | B 33 |
| D 31 | C 31 | D 32 | C 32 | D 33 | C 33 |

DESTINATION

| A 11 | A 11 | A 12 | A 12 | A 13 | A 13 |
|---|---|---|---|---|---|
| A 11 | A 11 | A 12 | A 12 | A 13 | A 13 |
| A 21 | A 21 | A 22 | A 22 | A 23 | A 23 |
| A 21 | A 21 | A 22 | A 22 | A 23 | A 23 |
| A 31 | A 31 | A 32 | A 32 | A 33 | A 33 |
| A 31 | A 31 | A 32 | A 32 | A 33 | A 33 |

FIGURE 2

SOURCE

| A 11 | B 11 | A 12 | B 12 | A 13 | B 13 |
|---|---|---|---|---|---|
| D 11 | C 11 | D 12 | C 12 | D 13 | C 13 |
| A 21 | B 21 | A 22 | B 22 | A 23 | B 23 |
| D 21 | C 21 | D 22 | C 22 | D 23 | C 23 |
| A 31 | B 31 | A 32 | B 32 | A 33 | B 33 |
| D 31 | C 31 | D 32 | C 32 | D 33 | C 33 |

DESTINATION

| X 11 | X 11 | X 12 | X 12 | X 13 | X 13 |
|---|---|---|---|---|---|
| X 11 | X 11 | X 12 | X 12 | X 13 | X 13 |
| X 21 | X 21 | X 22 | X 22 | X 23 | X 23 |
| X 21 | X 21 | X 22 | X 22 | X 23 | X 23 |
| X 31 | X 31 | X 32 | X 32 | X 33 | X 33 |
| X 31 | X 31 | X 32 | X 32 | X 33 | X 33 |

FIGURE 3

NO INTERPOLATION

| W | W | X |
|---|---|---|
| W | W | X |
| Z | Z | Y |

INTERPOLATION

| W | $\dfrac{W+X}{2}$ | X |
|---|---|---|
| $\dfrac{W+Z}{2}$ | $\dfrac{W+X+Y+Z}{4}$ | $\dfrac{X+Y}{2}$ |
| Z | $\dfrac{Z+Y}{2}$ | Y |

<u>FIGURE 4</u>

SOURCE

| A* 11 | B 11 | A* 12 | B 12 | A* 13 | B 13 |
|---|---|---|---|---|---|
| D 11 | C 11 | D 12 | C 12 | D 13 | C 13 |
| A* 21 | B 21 | A* 22 | B 22 | A* 23 | B 23 |
| D 21 | C 21 | D 22 | C 22 | D 23 | C 23 |
| A* 31 | B 31 | A* 32 | B 32 | A* 33 | B 33 |
| D 31 | C 31 | D 32 | C 32 | D 33 | C 33 |

DESTINATION

| A 11 | A 11 | A 12 | A 12 | A 13 | A 13 |
|---|---|---|---|---|---|
| A 11 | A 11 | A 12 | A 12 | A 13 | A 13 |
| A 21 | A 21 | A 22 | A 22 | A 23 | A 23 |
| A 21 | A 21 | A 22 | A 22 | A 23 | A 23 |
| A 31 | A 31 | A 32 | A 32 | A 33 | A 33 |
| A 31 | A 31 | A 32 | A 32 | A 33 | A 33 |

FIGURE 5A

SOURCE

| A 11 | B* 11 | A 12 | B* 12 | A 13 | B* 13 |
|------|-------|------|-------|------|-------|
| D 11 | C 11  | D 12 | C 12  | D 13 | C 13  |
| A 21 | B* 21 | A 22 | B* 22 | A 23 | B* 23 |
| D 21 | C 21  | D 22 | C 22  | D 23 | C 23  |
| A 31 | B* 31 | A 32 | B* 32 | A 33 | B* 33 |
| D 31 | C 31  | D 32 | C 32  | D 33 | C 33  |

DESTINATION

| B 11 | B 11 | B 12 | B 12 | B 13 | B 13 |
|------|------|------|------|------|------|
| B 11 | B 11 | B 12 | B 12 | B 13 | B 13 |
| B 21 | B 21 | B 22 | B 22 | B 23 | B 23 |
| B 21 | B 21 | B 22 | B 22 | B 23 | B 23 |
| B 31 | B 31 | B 32 | B 32 | B 33 | B 33 |
| B 31 | B 31 | B 32 | B 32 | B 33 | B 33 |

<u>FIGURE 5B</u>

SOURCE

| A 11 | B 11 | A 12 | B 12 | A 13 | B 13 |
|------|------|------|------|------|------|
| D 11 | C* 11 | D 12 | C* 12 | D 13 | C* 13 |
| A 21 | B 21 | A 22 | B 22 | A 23 | B 23 |
| D 21 | C* 21 | D 22 | C* 22 | D 23 | C* 23 |
| A 31 | B 31 | A 32 | B 32 | A 33 | B 33 |
| D 31 | C* 31 | D 32 | C* 32 | D 33 | C* 33 |

DESTINATION

| C 11 | C 11 | C 12 | C 12 | C 13 | C 13 |
|------|------|------|------|------|------|
| C 11 | C 11 | C 12 | C 12 | C 13 | C 13 |
| C 21 | C 21 | C 22 | C 22 | C 23 | C 23 |
| C 21 | C 21 | C 22 | C 22 | C 23 | C 23 |
| C 31 | C 31 | C 32 | C 32 | C 33 | C 33 |
| C 31 | C 31 | C 32 | C 32 | C 33 | C 33 |

FIGURE 5C

SOURCE

| A 11 | B 11 | A 12 | B 12 | A 13 | B 13 |
|------|------|------|------|------|------|
| D* 11 | C 11 | D* 12 | C 12 | D* 13 | C 13 |
| A 21 | B 21 | A 22 | B 22 | A 23 | B 23 |
| D* 21 | C 21 | D* 22 | C 22 | D* 23 | C 23 |
| A 31 | B 31 | A 32 | B 32 | A 33 | B 33 |
| D* 31 | C 31 | D* 32 | C 32 | D* 33 | C 33 |

DESTINATION

| D 11 | D 11 | D 12 | D 12 | D 13 | D 13 |
|------|------|------|------|------|------|
| D 11 | D 11 | D 12 | D 12 | D 13 | D 13 |
| D 21 | D 21 | D 22 | D 22 | D 23 | D 23 |
| D 21 | D 21 | D 22 | D 22 | D 23 | D 23 |
| D 31 | D 31 | D 32 | D 32 | D 33 | D 33 |
| D 31 | D 31 | D 32 | D 32 | D 33 | D 33 |

FIGURE 5D

```
   (4+1):1                    MIRROR

```
        ONE                    TWO                   THREE
X          X                    X                     X
  A          A                    A                A     A
    B          B                    B              B
C                C               C                       C
    D              D              D               D
X          X                    X                     X

FOUR                   FIVE
            X                    X
              A                    A
          B                    B       B
            C                    C
        D       D              D         D
            X                    X
```

<u>FIGURE 15</u>

```
        ONE                    TWO                  THREE
X           X               A                                B
    A                           B                    C
        B                 C                              D
C                             D                 X                X
    D                 X           X                   A
X           X               A                                B

FOUR                       FIVE
        C                            D
           D              X              X
    X         X                A
        A                           B
           B                C
        C                            D
```

FIGURE 16

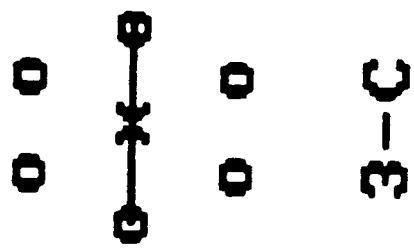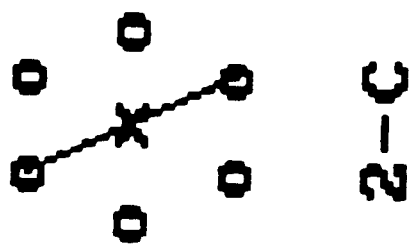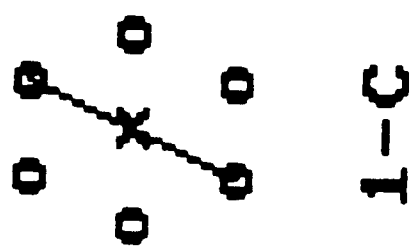
FIGURE 24

(70)

| r7 | r6 | r5 | r4 | r3 | r2 | r1 | r0 |

(71)

| g7 | g6 | g5 | g4 | g3 | g2 | g1 | g0 |

(72)

| b7 | b6 | b5 | b4 | b3 | b2 | b1 | b0 |

(73)

| pm1 | pm0 |

FIGURE 35

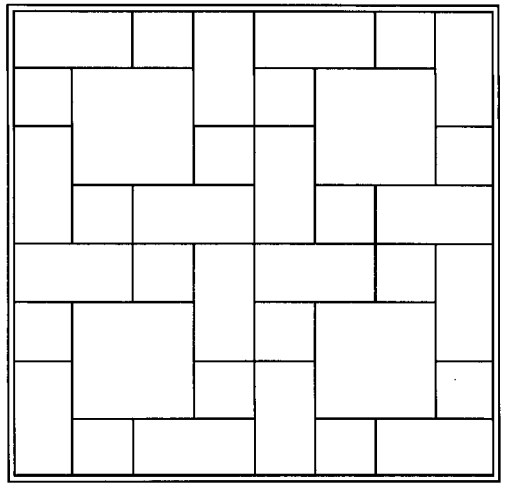
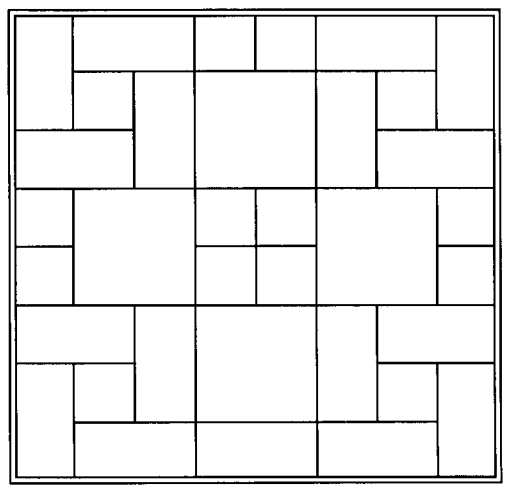
FIGURE 36

ENCODING OF HDTV "SIDE STRIPS" INTO NTSC
BLANKING INTERVALS WHICH MAY BE OF A PREVIOUS FRAME

DECODING OF HDTV "SIDE STRIPS" FROM NTSC
BLANKING INTERVALS WHICH MAY BE OF PREVIOUS FRAME

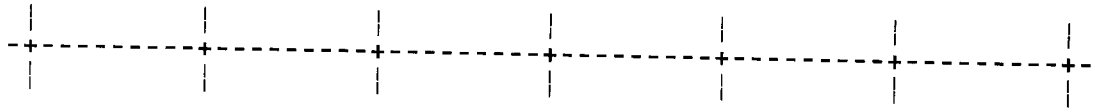
TYPICAL STANDARD AUDIO SAMPLING SCHEME
WITH UNIFORM TIME SPACING
FIGURE 40A
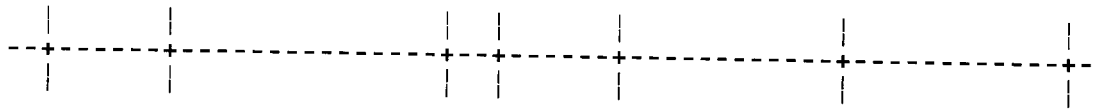
TYPICAL VARIABLE STS AUDIO SAMPLING SCHEME
WITH NON-UNIFORM TIME SPACING
FIGURE 40B
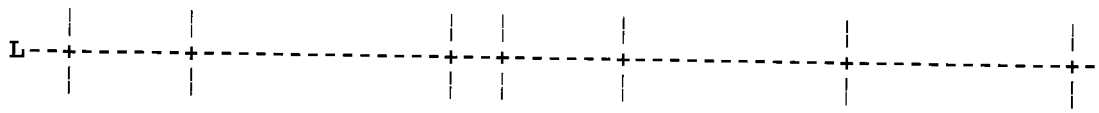
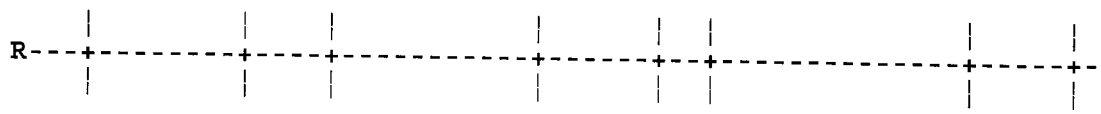
TYPICAL VARIABLE STS AUDIO SAMPLING SCHEME
WITH NON-UNIFORM TIME SPACING APPLIED TO
MULTI-CHANNEL (STEREO - LEFT/RIGHT) AUDIO SIGNAL
FIGURE 40C
'VARIABLE STS' PRINCIPLE APPLIED TO AUDIO SIGNALS
FIGURE 40

OFF-LINE RECORDING AND REAL-TIME PLAYBACK/DELIVERY

|   |   | X |   |   |   |
|---|---|---|---|---|---|
|   | X |   | X |   |   |
|   |   | X |   |   |   |
|   | X |   | X |   |   |
|   |   |   |   |   | X |
| X |   |   | X |   |   |

FRAME 1

| X |   |   |   |   |   |
|---|---|---|---|---|---|
|   |   | X |   | X |   |
|   |   |   | X |   |   |
|   | X |   | X |   |   |
| X |   |   |   |   |   |
|   | X |   |   |   | X |

FRAME 2

|   |   | X | X |   |   |
|---|---|---|---|---|---|
|   |   |   |   |   | X |
|   |   | X |   | X |   |
|   |   |   | X |   |   |
| X |   |   |   | X |   |
|   |   | X |   |   |   |

FRAME 3

|   |   |   | X |   |   |
|---|---|---|---|---|---|
|   | X |   |   |   | X |
|   |   |   |   | X |   |
| X |   |   |   | X |   |
|   |   |   |   | X |   |
|   | X |   |   |   | X |

FRAME 4

```
              5        1        6
         5    5  1     1  6     6
              5        1        6

5  3 5 1 0 1 6 4 6
            3 3 0 5 0 4 1 4
         5  3 1 5 0 6 1 4    6
            3 7 3 0 2 0 4 8 4
              7 7 2 3 2 8 0 8    4
         3  7 0 3 2 4 0 8     4
              7 7 2    2 8     8
                      7       2        8
         7      2 7    8 2        8
```

TILING OF PLANE DEMONSTRATED WITH 'FRAME 1' PATTERN

FIGURE 43

TWO EXAMPLES OF M x N (4 x 2) MULTI-POINT CELL
FOUR FRAME STS SAMPLING PATTERNS

A) 1 X-POINT, 3 O-POINTS, AND O-POINTS
MUST ALL BE INSIDE CELL

B) 2 X-POINTS (UPPER AND LOWER CASE) EACH WITH
4 O-POINTS WHICH MAY BE OUTSIDE CELL

INTERLEAVING OF TRANSMITTED, ACCUMULATED AND
RECONSTRUCTED POINTS

FIGURE 45

CAMERA SYSTEM FOR IRREGULAR TIME INTERVAL
VARIABLE STS OPERATION

METHODS AND DEVICES FOR TIME-VARYING SELECTION AND ARRANGEMENT OF DATA POINTS WITH PARTICULAR APPLICATION TO THE CREATION OF NTSC-COMPATIBLE HDTV SIGNALS

The instant application is a continuation-in-part of applicant's application Ser. No. 07/077,916 filed Jul. 27, 1987.

The instant application is also a continuation-in-part of applicant's application Ser. No. 08/110,230 filed Aug. 23, 1993 now abandoned which is a continuation-in-part of Ser. No. 07/435,487 (filed Aug. 17, 1989, now abandoned), which was both: a continuation-in-part of application Ser. No. 07/227,403 filed Dec. 17, 1986 (issued May 15, 1990 as U.S. Pat. No. 4,925,294); and, a continuation-in-part of application Ser. No. 07/006,291 filed Jan. 20, 1987 (issued Sep. 24, 1991 as U.S. Pat. No. 5,050,894) which was a continuation of Ser. No. 06/601,091 (filed Apr. 20, 1984, now abandoned) which was a continuation-in-part of application Ser. No. 06/492,816 filed May 9, 1983 (issued Aug. 19, 1986 as U.S. Pat. No. 4,606,625).

The instant application is also a continuation-in-part of applicant's application Ser. No. 07/951,267 filed Sep. 25, 1992 now abandoned which is a continuation-in-part of the above referenced application Ser. No. 07/435,487 and also of the above referenced application Ser. No. 07/077,916.

All of these documents (except for those abandoned) are hereby incorporated by reference.

TECHNICAL FIELD

The instant invention relates to a class of methods for selecting subsets of information, such as that derived by digitizing a high-definition television signal, and arranging that reduced amount of information into a second set of information which can then be, for example, converted to a low-definition signal which can then be transmitted over channels intended for low-definition signals, with minimal perceivable artifacts.

BRIEF DESCRIPTION OF DRAWINGS

FIG. 2 depicts selection of a subset of a relatively high-resolution information signal for transmission over a lower bandwidth channel, where the upper left corner element (A) of each two-by-two pixel cell, is transmitted (*) for every cell, in every frame of the source image.

FIG. 3 depicts selection of a subset of a relatively high-resolution information signal for transmission over a lower bandwidth channel, where all four picture elements from each two-by-two cell in the source image are averaged, as by a low-pass digital filter, to derive the pixels of the destination display cell denoted by X, in every frame of the source image, FIG. 4 depicts a digital filtering technique called bi-linear interpolation.

FIGS. 5A through 5D each depict a data point selection scheme, similar to FIG. 2; but for each figure, a different pixel from the two-by-two cell is selected, indicated by a (*). These four types of selection would be alternated in a cycle of four.

FIG. 13 shows two mirror-image variations applied to the (4+1):1 pattern.

FIG. 15 shows additional variations applied to the (4+1):1 pattern where the selection of active points need not remain constant and the five column shift is shown.

FIG. 16 shows additional variations applied to the (4+1):1 pattern where the selection of active points need not remain constant and the five row shift is shown.

FIG. 24 shows three ways one (x)-point may be combined with two opposing (o)-points, with the (2+1):1 pattern.

FIG. 35 shows one example of a data structure for storing red, green, blue and pixel modification information.

FIG. 36 shows one example of an embodiment using pixel modification information and variable-geometry pixels. Two arrangements of pixels (shown above and below) each employ four different shaped pixels.

FIG. 40A depicts the standard method of uniformly selecting data points from an audio signal.

FIG. 40B depicts a method of selecting data points from an audio signals employing a variable STS scheme.

FIG. 40C depicts the method of FIG. 40B applied in different variations to a two-channel stereo audio signal.

FIG. 43 depicts a typical shotgun data point selection pattern.

FIG. 45 depicts interleaving of transmitted, accumulated and reconstructed points.

SCOPE OF INVENTION AND PRIOR ART

Figure 1:
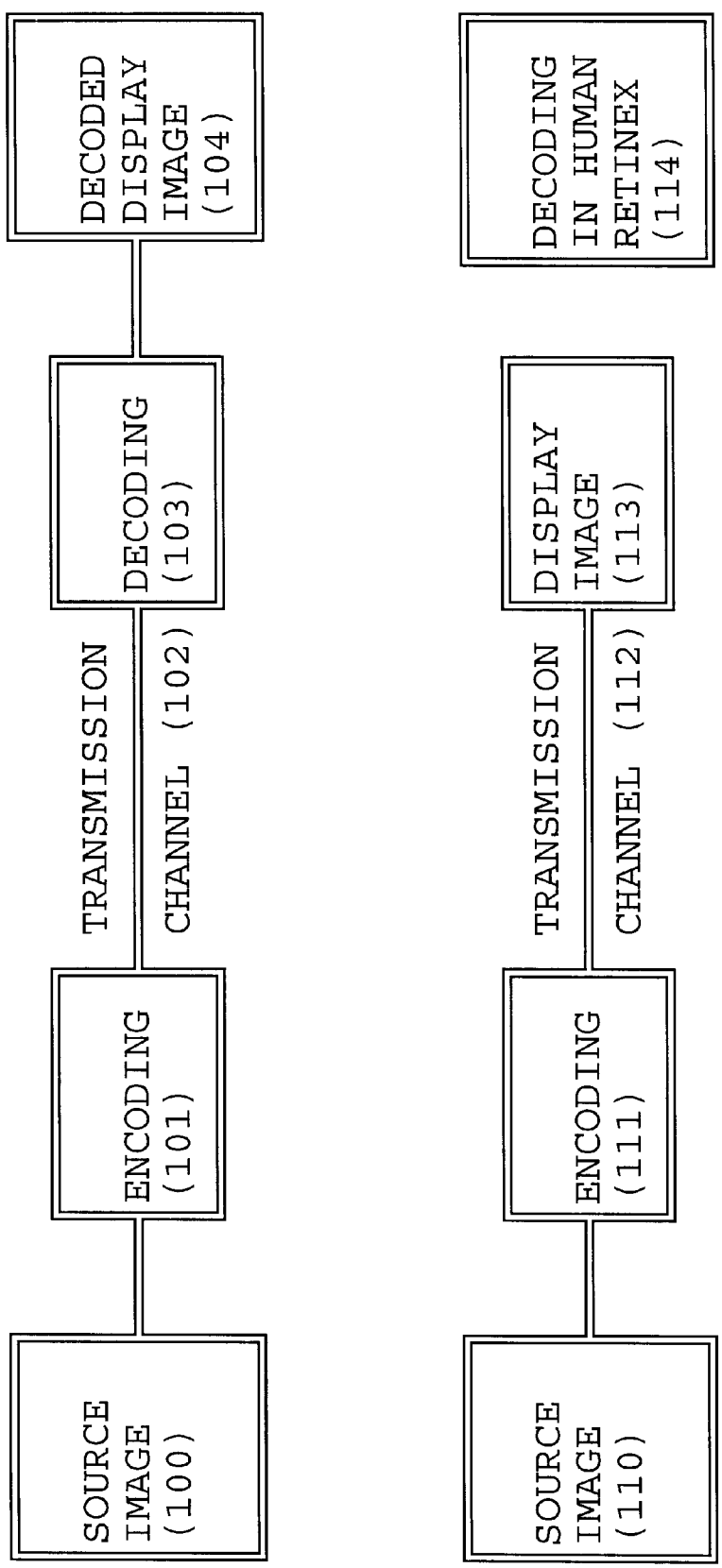
FIG. 1 depicts in the top configuration a standard encoding/decoding bandwidth reduction scheme. The bottom configuration depicts one class of embodiments where decoding occurs after display, as viewed, in the human eye/brain (retinex).

Generally, the domain where the instant invention can be applied is any process, system, device, or product made by a process, which involves a processing element whereby a first information bearing signal (often, a three-dimensional data construct consisting of a two-dimensional image plane and a third dimension of time—e.g., a television or motion picture image stream) is transformed into a second information bearing signal of similar type. Further, these signals, though of similar type, are, generally, different in some characteristic, such as resolution or definition. Examples of such areas of potential application include, without limitation, devices or processes that: encode a higher-definition television or video signal into a lower-definition television or video signal suitable for transmission, display or recording; record, transmit, decode or display such an encoded signal; transduce or transfer an image stream from an imaging element to a transmission or storage element, such as a television camera or film chain; transfer an image stream from a signal input to a recording medium, such as a videotape or videodisc recorder; transfer an image stream from a recording medium to a display element, such as a videotape or videodisc player; transfer data representing images from a computer memory element to a display element, such as a framestore or frame buffer; synthesize an image output stream from a mathematical model, such as a computer graphic rendering component; modify or combine image streams, such as image processing components, time-base correctors, signal processing components, or special effects components; products that result from the foregoing; and many other devices, processes and products that fall within the realm of motion picture and television engineering.

The invention, rather than comprising any of the foregoing, constitutes a method (e.g., a process or algorithm) for selecting and arranging information derived from the first information bearing signal, which processed information will then be used to create a second information bearing signal. Thus, the inventive matter is limited to algorithms for selecting and arranging information.

In particular, the method comprises a class of techniques for doing so in a time-varying manner such that the artifacts introduced by the process or device involved become less noticeable to a human viewer than if standard techniques or algorithms are applied. It is this "greater than standard" variability over time, of the selection of information derived from the source signal and/or its arrangement into the information which will comprise the destination signal, that results in the improvement; and, in order to achieve an improvement, the variation over time must be of sufficient magnitude.

To distinguish patterns, techniques, processes or algorithms with variability sufficient to achieve a reduction in perceptual artifacts, from those which do not reduce (and may even increase) such artifacts, the words complex or complexly will be occasionally used herein to modify terms such as sampling pattern, time variation or time-varying STS (Spatial Temporal Signature, described below); and the words complex or complexity (sometimes used with variation) will be occasionally used to point out inventive techniques which can be used to achieve a sufficient magnitude of variation for effective practice.

Examples of "complex variable STS" or "complexity" when used to describe a variable STS or sampling pattern herein comprise, singly or in combination: rectangular (M×N) multi-pixel cells with a sampling scheme that decimates information significantly less than by a factor of M×N for a particular frame; multi-pixel cells that are non-rectangular; multi-pixel cells where more than a single pixel is sampled for a particular frame; pseudo-random and/or non-contiguous multi-pixel cells; distributions of multi-pixel cells of non-uniform size or shape over an image, or from frame to frame; multiplication weights for information points not equal to 1 (or a constant), or which change over a cell or frame, or from frame to frame; sampling schemes that utilize non-uniform time slices from frame to frame or over a frame; or as otherwise described herein. Thus, the word "complex", unless otherwise indicated, as used herein means intricate or sophisticated, and does not refer to numbers comprising real and imaginary parts.

The intended practitioner of the present invention is someone who is skilled in designing, implementing, integrating, building, creating, programming or utilizing processes, devices, systems and products, such as described in the first paragraph of this disclosure. That is, one skilled in the art required to practice the instant invention is capable of one or more of the following: design and/or construction of devices, systems, hardware and software (i.e., programming) for motion picture and television production, motion picture and television post production, signal processing, image processing, computer graphics, and the like. That is, motion picture and television engineers, computer graphic system designers and programmers, image processing system designers and programmers, digital software and hardware engineers, communication and information processing engineers, applied mathematicians, etc.

Those skilled in the art know how to accomplish such tasks as to: design and construct devices, design and integrate systems, design software for and program those devices and systems, and utilize those devices and systems to create information product, which devices and systems transfer and/or transform information derived from image streams. Such devices and systems comprise well known digital or analog electronic hardware, and software, components. The details of accomplishing such standard tasks are well known and within the ken of those skilled in these arts; are not (in and of themselves) within the scope of the instant invention; and, will be referred to but not described in detail in the instant disclosure.[1]

Rather, what will be disclosed are novel algorithms for selecting and arranging the information transferred or transformed by those systems, devices and processes; or the selection and arrangement of information comprising various information products such as magnetic or optical media containing, or transmissions of, information bearing signals. Disclosed will be what one skilled in the art will need to know, beyond that with which he is already familiar, in order to implement the instant invention. These algorithms will be presented by description, algebraic formulae and graphically, indicating how information data points or "pixels" are to be selected from data derived from a first information signal, and arranged, manipulated and/or combined to create the pixels or data points that will then comprise a second information signal; as is standard and frequent practice in the field of motion picture and television engineering.[2]

These descriptions, formulae and illustrations are such as to completely and clearly specify algorithms which may be implemented in a straightforward manner by programming a programmable computer imaging device such as a frame buffer.

For example, the programmable frame buffers (some with onboard special-purpose microprocessors for graphics and/or signal processing) suitable for use with personal computers, workstations or other digital computers, along with off-the-shelf assemblers, compilers, subroutine libraries, or utilities, routinely provide as standard features, capabilities which permit a user to (among other tasks): digitize a frame of a video signal in many different formats including higher-than-television resolutions, standard television resolutions, and lower-than-television resolutions, and at 8- 16- 24- and 32-bits per pixel; display a video signal in any of those same formats; change, under program control, the resolution and/or bit-depth of the digitized or displayed frame; transfer information between any of a) visible framestore memory, b) blind (non-displayed) framestore memory, and c) host computer memory, and d) mass storage (e.g., magnetic disk) memory, on a pixel-by-pixel, line-by-line, or rectangle-by-rectangle basis.[3]

Thus, off-the-shelf devices provide the end user with the ability to: digitize high-resolution video frames; access the individual pixels of those frames; manipulate the information from those pixels under generalized host computer control and processing, to create arbitrarily processed pixels; and, display lower-resolution frames, suitable for recording, comprising those processed pixels. These off-the-shelf capabilities are sufficient to implement an image processing system embodying the information manipulation algorithms specified herein.

Similarly, higher performance and throughput (as well as higher cost and more programming effort), programmable devices, suitable for broadcast or theatrical production tasks, provide similar and much more sophisticated capabilities, including micro-coding whereby image processing algorithms can be incorporated into general purpose hardware, are available as off-the-shelf programmable systems.[4]

Additionally, specialized (graphic and image processing) programmable microprocessors are available for incorporation into digital hardware capable of providing special-purpose or general-purpose (user-programmable) image manipulation functions.[5,2]

Further, it is well known by those skilled in the art how to adapt processes that have been implemented as software running on programmable hardware devices, to designs for special purpose hardware, which may then provide advantages in cost vs. performance.

In summary, the disclosure of the instant invention will focus on what is new and novel and will not repeat the details of what is known in the art.

Additionally, in the disclosure, a number of specific processes, devices or systems into which the algorithms of the instant invention can be incorporated, and applications to which the algorithms of the instant invention can be applied, will be pointed out. The intended practitioner of the instant invention is already skilled in the art of: building and/or programming some one (or more) of these devices; integrating and/or programming for some one (or more) of these systems; implementing (and/or utilizing to create information product) some one (or more) of these application systems; or, designing processes and devices to manipulate information that has been modified by random noise or some specified process in order to counteract that manipulation to some degree, including encoding, decoding, reconstruction, compression and decompression.

As such, the intended practitioner has within their skill in the art the knowledge to design and create and/or use such devices, processes or systems which "push pixels around" from some first or source information bearing signal, in a specified manner, to create a second or destination information bearing signal.

Examples include, without limitation: special purpose hardware or programmable devices that permit the implementation of specific or arbitrary image processing functions (for example, image filtering, blurring, sharpening, warping, zooming, sizing, tilting, compositing, wiping, keying, matting, texture mapping, colorization[6], posterization, etc.); and, hardware devices that transfer or transform information, including image streams, from a source form to a destination form (encoders, decoders, cameras, recorders, players, displays, switchers, timebase correctors, noise reducers, compressors, decompressors, modulators, demodulators, etc.).

The intended practitioner is already in command of the knowledge required to design and build such devices and application systems that select, arrange and manipulate the pixels of image streams, in various previously specified manners. What is provided herein is the specification for a novel manner for selection, arrangement and manipulation of the pixels comprising such image streams. What is claimed as inventive are these algorithms and/or the incorporation of the novel algorithms into an otherwise standard device.

For example, Inventor's own film colorization system (U.S. Pat. No. 4,606,625) discloses a system comprising all the elements needed to input an image stream, process it by applying colorization and other digital filtering algorithms, and output a processed image stream. Replacing the colorization process or algorithm element of that prior invention with some one of the algorithms herein would result in a system for practicing the encoding envisioned herein on an information bearing signal derived from motion picture film or video.

Additionally, in the disclosure, it will be pointed out that a number of the parameters (e.g., the set five weights Ka, Kb, Kc, Kd and Kx for the 4+1:1 pattern) can be varied, and may be adjusted or "fine tuned". It is common practice for users of television imaging systems to adjust or "fine tune" operating parameters via physical controls or data entry. For example, with a computer image processing capability (such as those provided with computer paint systems or special effects systems—e.g., digital filters that blur, sharpen, colorize, posterize, size, stretch, warp or otherwise manipulate an image or image stream) it is common practice for a practitioner to adjust various parameters that control the processing results via numeric keyboard input, or by physical or graphic controls. Considerable time may be spent making adjustments to the process, for any particular image input to the system, to achieve the desired results. The determination of what constitutes such desired results, and when those goals have been adequately approximated are, in the motion picture and television industry, most often a matter of subjective artistic taste; what one practitioner (or, more importantly the creative director to whom he reports) may deem successful, might be entirely unacceptable to another team. The specific adjustments made, will vary from case to case and will depend upon both the characteristics of the source material and the results hoped for after processing. How the system parameters should be adjusted is often not known ahead of time. Parameters are adjusted until a desired result is achieved or approximated.

Further, some image processing systems, such as Inventor's own film colorization system (U.S. Pat. No. 4,606,625) permit the application of algorithms with separately adjusted parameters (such as color specification or digital filtering parameters) to be applied to distinct areas of images in an image stream. Typically (in Inventor's systems) parameters are specified and adjusted in a small percentage of images from a moving sequence; the computer being capable of interpolating the practitioner's instructions for the intervening frames. Thus, it is not only common practice to fine tune parameters for a particular image, but also for individual areas of a given image.

Further still, it is common practice to "color correct" each individual scene of a motion picture film as it is printed, or transferred to video. Considerable time and effort, by highly skilled practitioners, is spent adjusting the parameters separately for individual scenes to achieve a desired overall "look".

Thus, in commercial applications of motion picture and television image manipulation processes, large amounts of time, effort and expense are expended in experimenting with the adjustment of operational parameters in an effort to achieve, as closely as reasonable, a desired result. And, this may be done for individual images, image sections, or motion scenes.

One of the major applications intended for the instant invention is the incorporation of the algorithms disclosed herein into a film chain (a film to video transfer device). Such transfers are an important and costly part of the television motion picture industry. Much time and effort is expended in achieving desired and artistic results. And, in particular, as described above, the scene-by-scene color correction of such transfers is common practice.

Thus, in the instant disclosure, it will be suggested that practitioners make adjustments to the operational parameters of the disclosed algorithms in order to better achieve desired results. Further, it will be suggested to such practitioners that such individual adjustments may be applied to images or image portions exhibiting different characteristics.

Commercial black & white and, later, color television has been available since the 1940s. American and Japanese systems offer 525 line frames, 30 times each second, while most European systems offer a higher resolution 625 line frame but run at a frame rate of 25 per second. Higher resolution military and laboratory video systems exist and, recently, a commercial high definition television standard (HDTV) has been developed to improve delivered image quality.[7]

In the US, motion picture film is projected at 48 frames per second (FPS) by showing each of 24 pictures twice. Recently, a system was developed by Douglas Trumbull called Showscan. It provides 60 FPS, with 60 pictures each shown only once, to improve visual quality.

When color was added to US black & white television, it was decided to adopt a "compatible" system, which enables black & white sets to receive color television signals and display them in black & white, while color sets display the same signals in color. Similarly, it has been suggested that the HDTV signal be compatibly receivable by standard televisions displaying standard resolution pictures, as well as by HDTV receivers. HDTV provides both more video lines and more pixels (from PICture ELements: visual data points) per line. It has been suggested that the standard television channels may be used to transmit a "compatible" standard resolution signal while a second channel (not receivable by a standard television) be used to transmit the "inbetween" higher resolution information. However, HDTV may also display a wider picture when compared with standard television. Inclusion of the extra "side strips" in a compatible broadcast system has been one of the main problems.

It is established practice to transmit motion picture film, which has a much higher resolution and a different frame rate, over a broadcast television channel by use of a film chain. Essentially a motion picture projector coupled to a television camera, the film chain synchronizes the two imaging systems. In newer film chain systems the video camera has been replaced by a digital image sensor and digital frame store. In the US, each video frame consists of two interleaved video fields, resulting in 60 fields per second. US film runs at 24 frames per second. This results in a ratio of 2.5 video fields per film frame. Practically, this is achieved by alternating 3 repeated video fields and 2 repeated video fields for alternate film frames. The spatial resolution of the image is reduced by the characteristics of the video camera.

It is also established practice to generate synthetic television signals (without a camera) by using electronic devices such as character (text) generators, computer graphic systems and special effects generators.

Recent developments in home televisions and VCRs include the introduction of digital technology, such as full-frame stores and comb filters.

There exist many techniques for bandwidth compression of electronic signals, a number of which have been applied to television systems. These are particularly useful for transmitting images from space probes or for satellite transmission, where resources are limited.

DESCRIPTION OF INVENTION

The instant invention relates to a method of signal encoding that is particularly useful for preparing a high-definition television signal for transmission over a channel intended for lower resolution signals. It can also be used to improve the perceived quality of television systems, or for other purposes.

In brief, the invention comprises a system for selecting a subset of information to be transmitted, from all the information in a frame, and for varying the parameters of selection from frame to frame. This results in the reduction of transmitted information, and improved perception on the part of the viewer when compared to non-varying selection schemes.

In order to understand the invention more fully, it is helpful to examine certain aspects of film and video display systems, their shortcomings, and the functioning of the human visual system.

Spatial/temporal Characteristics of Film and Video Systems

Film and video display systems each have their own characteristic "signature" scheme for presenting visual information to the viewer over time and space. Each spatial/temporal signature (STS) is recognizable, even if subliminally, to the viewer and contributes to the identifiable look and "feel" of each medium.

Theatrical film presentations consist of 24 different pictures each second. Each picture is shown twice to increase the "flicker rate" above the threshold of major annoyance. However, when objects move quickly, or contrast greatly, a phenomenon known as strobing happens. The viewer is able to perceive that the motion sequence is actually made up of individual pictures and motion appears jerky. This happens because the STS of cinema cameras and projectors is to capture or display an entire picture in an instant, and to miss all the information that happens between these instants.

In cinematography, the proportion of time the shutter is open during each 1/24th second can be adjusted. Keeping the shutter open for a relatively long time will cause moving objects to blur. In "stop motion" model photography it is now common practice to leave the shutter open while the model is moved for each exposure, rather than to take a series of static images (the technique, first popularized at Industrial Light and Magic, is referred to as "go motion" photography). In both cases, each motion picture frame is taken over a "long" instant, while objects move. This does cause motion blurring, but does also lessen the perception of strobing; the "stuttering" nature of the film STS has been lessened by temporal smearing.

A phenomenon related to strobing, which also is more noticeable for contrasty or fast moving situations, is call doubling. As noted, each motion picture frame is shown twice to increase the flicker rate. Thus, an object shown at position A in projected frame 1, would again be shown at position A in projected frame 2, and would finally move to position B in projected frame 3. The human eye/brain system (sometimes called the Retinex, for RETinal-cerebral complEX)[8] expects the object to be at an intermediate position, between A and B, for the intermediate frame 2. Since the object is still at position A at frame 2, it is perceived as a second object or ghost lagging behind the first; hence, doubling. Again, this is a consequence of the STS of film projection. The overall result is a perceived jitteriness and muddiness to motion picture film presentations, even if each individual picture is crisp and sharp.

Video, on the other hand, works quite differently. An electron beam travels across the camera or picture tube, tracing out a raster pattern of lines, left-to-right, top-to-bottom, 60 times each second. The beam is turned off, or blanked, after each line, and after each picture, to allow it to be repositioned without being seen.

Except for the relatively short blanking intervals, television systems gather and display information continuously, although, at any given time, information is being displayed for only one "point" on the screen. This STS is in marked contrast to that of film. Some defects of such a system are that the individual lines (or even dots) of the raster pattern may be seen because there is only a limited number of individual dots or lines—i.e., resolution—that can be captured or displayed within the time or bandwidth allotted to one picture.

In US commercial television systems, each 1/30 second video frame is broken into two 1/60 second video fields. All the even lines of a picture are sent in the first field, all the odd lines in the second. This is similar to showing each film frame twice to avoid flickering but here it is used to prevent the perception of each video picture being wiped on from top to bottom. However, since each video field (in fact each line or even each dot) is scanned at a different time, there is no sense of doubling.

The muddiness or opacity of film presentations, when compared to video, is related to the repeated presentation of identical information to the human visual system. This can be demonstrated by watching material transferred from film to video using newer equipment. As explained above, each film frame is repeated for either 3 or 2 video fields during transfer. Newer film chains can pan, pull or tilt across the visual field during transfer. In doing so, each video field contains unique information. Even if the same film frame is scanned, it is scanned from a different position or orientation. During those brief sequences when a camera move is added by the film chain equipment, there is a perceivable increased clarity to the scene.

In summary, film systems deal with information everywhere at once, but for only small slices of time. Television systems deal with information (almost) all the time, but for only small slices of space. Each STS approach leads to characteristic perceivable anomalies or artifacts; primarily, temporal muddiness for film, low geometric resolution for video.

The instant invention employs an STS scheme which has been developed to reduce both types of perceivable anomalies and which can be used to reduce the bandwidth required to transmit a high-definition television signal.

Theory of Operation

The basis of the instant invention is that the human visual system is capable of, and sometimes even works better by, reconstructing information that is presented over time.

A simple example of this involves a picket fence. If a viewer looks fixedly through a picket fence, about half the scene will be hidden from view and the pickets will be clearly defined. However, if the viewer shifts the head back and forth, or walks briskly by the fence, the perception will be of seeing the entire scene, even though half the scene will be missing at any given instant. The pickets will also become less noticeable. The human eye/brain system is capable of reconstructing the scene from the stream of partial views and of disregarding the sampling scheme imposed by the (relatively moving) pickets.

In the parlance of this application, both these cases constitute bandwidth compression (half the scene is hidden at all times); but, the fixed view is a static STS, and the moving perspective view is a variable STS. Thus, the eye is capable of reconstructing information presented through a varying sample window.

Other aspects of human vision indicate that varying information is preferable to static information. As described above, repeating identical information to the eye, as with theatrical motion picture film projection, creates the perception of muddiness or opacity. Certain structures in the retinex, such as edge detectors and motion detectors, only work in differential mode. That is, they do not work when presented with information that is temporally or spatially uniform. Another (although, longer term) phenomenon is visual fatigue or after-imaging. The receptor elements in the eye become exhausted by looking at a fixed image. The scene will eventually become almost invisible (if the view remains constant) and a negative of the scene will be perceived upon finally looking away.

The human eye vibrates with a continuous tremor of 30 to 80 Hz. during its normal function. The retinex is able to reconstruct a stable detailed image from this vibrating input. It may, in fact, yield a more detailed image than could be constructed from an absolutely stable eye and may help prevent the perception of the structure of, or defects in, the retinex itself.[9]

A similar situation results from the way in which motion picture film is manufactured and used. Film images are made up of a random distribution of photosensitive particles collectively called "film grain". When blown-up on a large screen the grain structure would be more easily seen, however, because the distribution changes from frame to frame the grain structure is generally not perceived. There are two ways that still images are added to motion picture presentations. With one technique a still scene is filmed on a number of film negative frames. Each has a different grain structure and, thus, when the sequence is projected (or viewed on a video monitor) the film grain structure is not noticed. The other technique calls for "step printing" the same film negative on many frames of the print to be projected (or to repeatedly scan the same film frame in a film chain). In this case the same film negative frame, with the same grain structure, is viewed repeatedly and the grain structure becomes more noticeable. The frames of the motion picture print also have grain structure, however, since this structure always changes (unless the projector jams or is stopped) the print film grain structure is not noticed.

The tremor function provides variation to the STS of human vision. Thus, the retinex may be better suited to deal with variable STSs than static.

The retinex has the ability to reconstruct a scene from bits and pieces spread over space and time. It is possible to take advantage of this ability by presenting a succession of moderate bandwidth pictures (subsets of full-definition images), taken through varying sample windows, and to have the retinex reconstruct a higher resolution scene.

Thus, for some embodiments, the compressed transmitted data points will be directly displayed on a monitor of resolution that is comparable to the transmission channel. Reconstruction, or collection, will occur in the retinex. Improved perception will result, when compared with standard transmission over the same channel and display. Thus, the technique may be used to improve perception of material transmitted for standard systems. It is only the camera and/or transmission parts of the system that would be replaced; standard reception and display elements would be used in this embodiment. This is in marked contrast to most bandwidth compression techniques, which utilize complex coding schemes that require complex decoding before display. For example, an image compressed by run-length encoding would appear as gibberish if the data were displayed directly, without proper decoding.

Other embodiments will present the results on a higher definition (compared to the channel) display. The "holes" between the transmitted points may be smoothed over by interpolative techniques, or intermediate data may be (approximately) "reconstructed" by computation.

Referring to FIG. 1, the top configuration (100–104) depicts a standard encoding/decoding (101/103) bandwidth reduction scheme. The bandwidth of the source (100) and display image (104) are equal and higher than the bandwidth of the channel (102).

The bottom configuration (110–114) depicts one class of embodiments of the instant invention. The bandwidth of the source image (110) is higher than both the channel (112) and the display (113) which are comparable to each other. Decoding (114) occurs after display (113), as it is viewed (114), and it is only in the retinex (114) that the image is reconstructed.

The goal of most bandwidth compression schemes is to "squeeze" a given information signal into a smaller channel. A main goal of the instant invention is to "squeeze" (111) a larger picture into a given channel. Although this may at first sound as a semantic difference only, there is a significant practical difference.

Broadcast television in the US is a "given channel" that is unlikely to change for the foreseeable future. Bandwidth compression schemes that would allow the use of a smaller transmission channel (102) and require complex decoding at destination (103) could not be used with the many millions of existing home receivers (e.g. 104). The bottom configuration (110–114) shown in FIG. 1 requires no decoding equipment prior to display (113); decoding is accomplished in the human eye/brain (114). Therefore, it can be used with existing distribution and reception/display equipment (113).

It should also be noted that the "channel" (112) shown in the bottom part of FIG. 1, can incorporate a standard encode-transmit-decode system (101–102–103), as shown above. In this way, the varying STS scheme (e.g., 111) will function as a pre-selection or thinning function, prior to applying some other compression algorithm (e.g., 101), such as run-length encoding, delta encoding, etc.

Static Sampling Schemes

The visual artifacts of film and video systems are perceivable because the STS of each system is constant. Many times each second, images are presented to a viewer. While these image streams approach viewing a real scene, they represent only a small subset of the available information. The way in which the subset of information is selected remains constant, frame after frame after frame, while the content of each frame is different. In this way the "shape" of the STS is re-enforced by being superimposed over many different images. Perceived visual anomalies result.

In order to select a subset of a relatively high-resolution television signal for transmission over a lower bandwidth channel, two straightforward approaches are depicted in FIG. 2 and FIG. 3.

In both cases, the reduction is by a factor of four; by half in both the horizontal and vertical directions. Two-by-two cells of pixels are labeled with subscripts representing the row and column of the cell. Within the cell, individual pixels are labeled A, B, C and D.

In the first figure, the upper left corner element (A) of each two-by-two pixel cell, is transmitted (*) for every cell, in every frame of the source image. This pixel value is used to reconstruct the entire destination cell in the destination image. Picture details that fall in pixels labeled B, C or D do not get transmitted or displayed at all. As a small visual detail moves across the screen it would pop on (as it passes A*) and off (as it passes B, C or D).

In FIG. 3, all four picture elements from each two-by-two cell in the source image are averaged, as by a low-pass digital filter, to derive the pixels of the destination display cell. The average of A, B, C & D is denoted by X. Here individual small details are lost as they are averaged with the neighboring three pixels.

Both approaches exhibit defects. In the first, small details pop on and off, in the second, small detail is lost in the blur. This is because the method of selecting the subset of information—the STS—is constant from frame to frame. The "shape" of the static STS is re-enforced by viewing changing content upon which the same STS is repeatedly imposed.

Varying the STS

Although each is unique, the successive frames of a standard film or video presentation each have much redundant information in common with their neighbors. The STS of the present invention varies from frame to frame. By this scheme, the differences in the STS that is applied to successive frames is comparable to, or will even exceed, the differences in the content of successive frames. Therefore, the shape of the STS will not be re-enforced from frame to frame. Thus, sampling artifacts will be obscured, as they change from frame to frame, and the perception of visual anomalies, resulting from the overall varying sampling scheme, will be minimized.

Bi-linear Interpolation

Before describing a simple implementation of the time varying STS scheme, a technique called bi-linear interpolation will be described. In the two techniques described in FIGS. 2 and 3, the destination cells of two-by-two pixels contain identical information in each pixel. This is equivalent to having larger pixels and would result in a more "blocky" looking picture. In order to obscure the edges of the large two-by-two pixel cells, certain of the individual pixels can be displayed as averages of the neighboring pixels. For two-by-two pixel cells the scheme is shown in FIG. 4.

The pixels of a subject cell are labeled W: the cell to its right, X: the cell below, Z: the cell diagonally down and right, Y. It is assumed that the image has been derived by sampling as depicted in FIG. 2, where the upper left pixel in each cell is transmitted. Since that pixel is displayed exactly as it is in the source image, it will be unchanged. The pixel to its right and the pixel below it are each intermediate between two sampled (upper-left corner of cell) pixels and are displayed as the average of those two pixels; (W+X)/2 and (W+Z)/2 respectively.

This process is called linear interpolation and would be adjusted if the subject intermediate pixel were not exactly half-way between the two sampled pixels. For example, if it were one third of the way toward X from W it could be displayed as (2W+X)/3.

The fourth pixel of each cell (the one diagonally opposite from the sampled pixel) is directly between two pairs of linearly interpolated pixels and, by interpolating between either the horizontal or vertical pair (or taking an average of all four) would be re-interpolated (i.e. bi-linearly interpolated) as (W+X+Y+Z)/4.

The principles illustrated above can also be applied to non-rectilinear situations or situations where the distribution of sampled points is non-uniform over the image. However, the implementation may be more complex than illustrated.

In the instant invention, these mathematical principles will be applied both to constructing intermediate display pixels between transmitted data points and to apportioning sample values that fall in between transmitted or displayable points.

The application of bi-linear interpolation to the destination display is a post-transmission digital filter that is, in some sense, similar to the pre-transmission filter described as averaging in FIG. 3. Both pre- and post-transmission filtering will be described below as components of some embodiments of the instant invention. Basic principles of digital filtering and digital sampling are well known[10] and, in and of themselves, are not intended as the subject of the present invention. However, the basic principle of the invention, the time varying STS, may be implemented with one or more of its components comprising a known digital sampling or filtering technique. The examples of bi-linear interpolation, averaging or other examples of digital filtering or sampling processes are intended to be illustrative and not limiting in nature. Other digital filtering or sampling techniques may now, or come to, be in existence, and using the varying STS scheme in conjunction with such techniques is intended to be within the scope of the instant invention.

However, it should be noted that some of the specifics of the instant invention may fall under the categories of digital sampling or digital filtering. The specific schemes and patterns disclosed herein are intended as being within the scope of the present invention.

Simple Varying STS Scheme

A simple embodiment of the instant invention is depicted in FIGS. 5A through 5D. These figures each depict source and destination images, again organized as cells of two-by-two pixels each. Each of the four represent a point sampling scheme, similar to FIG. 2. But, for each figure, a different pixel from the two-by-two cell is sampled, indicated by a (*). These four types of sampling would be alternated, in a cycle of four, to provide a simple time varying STS.

Bi-linear interpolation could be applied to the displayed images. However, the corner pixel that requires no interpolation would be oriented in each of the four phases to correspond to the position of the source pixel that is sampled.

The scheme is rather simple and has a short repeat cycle and, thus, is more prone to creating perceivable STS artifacts than other, more complex sampling patterns, such as will be described later. However, this simple situation is a clear illustrative example of the basic principle.

Adding Complexity and Variation

The 2×2 cell of pixels can be generalized to N×N. A 1×1 cell is the degenerate case with no reduction in sampling rate from the source image. The 2×2 case has been described above and provides a reduction in bandwidth by a factor of four, and a cycle of four phases. For 3×3, 4×4 and 5×5 cells, if one pixel per cell is transmitted for each frame, reduction is by a factor of 9, 16 and 25, and repeat cycles are of 9, 16 & 25 steps, respectively. For the general case, an N×N pixel-cell, if sampled one pixel per phase, provides a bandwidth reduction factor of $N^2$ and a repeat cycle of $N^2$ steps. The percentage of information sampled for large N ($N \geq 4$) becomes too small, and the unsampled "holes" in the images can become apparent. For small N, the short repeat cycles can cause perceivable artifacts. Therefore, additional variations will be added to the STS schemes to improve the perception of "transparency".

First, particularly for short repeat cycles, the perception of a repeat, jiggle or sampling rotation may be reduced by repeating the steps of the cycle in random or pseudo-random order.

A pseudo-random (i.e., determined, but apparently random) sequence of numbers can be easily generated,[11] by a computer algorithm, from a small amount of "seed" information. The sequence can be easily re-generated at the destination by transmitting just the seed (rather than sending the entire sequence), since the algorithm is already known. An algorithm is chosen to generate a sequence that has the statistically average properties of "randomness" that are required for the particular application. For example, if we wished to generate a pseudo-random sequence for the 2×2 case depicted in FIGS. 5A–D, it would, in the long run, be required to contain equal numbers of 1s, 2s, 3s & 4s, and favor no particular two digit, three digit, or other multiple digit sequences. Further, it should not be possible (without knowing the algorithm, or expending an inordinate amount of computer time to analyze the series and reconstruct the algorithm) to predict the next number in the sequence. Obviously, the 1, 2, 3, 4, 1, 2, 3, 4, 1, 2, 3, 4 . . . sequence, as initially described in FIGS. 5A through 5D, does not meet these criteria; it is completely determined and predictable. This could result (particularly with such a short repeat cycle) in the perception of an anomalistic visual defect or artifact of the process.

In addition to randomizing the overall cycle, the particular phase of the cycle need not be the same for every cell in the image. For some STS schemes, particularly for large N, there may be more than one sampled pixel per cell, in some or all of the cells, in some or all of the frames. The particular variations of any of these parameters, over space or time, may be cycled, determinate or pseudo-random.

Additionally, the cell shape need not be square, N×N. Pixel-cells can be M×N rectangles, or any shape, and need not be continuous, in space or time. Pixel-cell size, shape or orientation may be varied, over an entire frame, or in one area, from frame to frame. The concept of distinct multi-pixel cells may even be replaced by a random (or pseudo-random) "shotgun" spray of sampled points over the image.

A multiplicity of "shotgun" or other patterns could be easily generated by a (pseudo-)random number generator algorithm by supplying it with different seed numbers for each frame. This seed number could be transmitted with each frame and the pattern re-generated at the destination, on the fly. Alternately, to speed operation and reduce the need for calculation power at the destination, data for a multiplicity of different patterns could be pre-calculated and stored in some form of memory at the destination display. Similarly, the coefficients for a bi-linear (or other) interpolation scheme, developed for these more complex sampling patterns, could be algorithmically generated or, to speed operation at the destination, pre-calculated and stored. In this way, a large number of different sampling/display schemes could be applied to a sequence of frames to generate a complexly varying STS without encountering a short repeat cycle. The added complexity and longer repeat will minimize the possibility that any visual artifact of the STS will be picked up by the human visual system.

It should be noted that most of the discussion here will concentrate on varying the STS by varying the spatial sampling or selection process over uniform time slices. This is because both film and video systems currently work with only uniform frame rates. However, as variable sampling rate (either for entire frames or for individual pixels) equipment becomes available, it will also be possible and useful to select and sample information with varying time slices as well as non-uniform spatial patterns. Both the position in time and "thickness" of the slices may be varied. Such temporal variations may be implemented for entire frames, individual pixels or multi-pixel cells, or for different image areas (as discussed below in the section "Variable Algorithm Over Image Frame"). The variations may be implemented based on various criteria including, characteristics of images or image sequences, equipment characteristics, different applications or, limitations on time, processing or bandwidth (again as described below).

Frame Store Techniques

For a single still image, 4:1 bandwidth compression may be achieved by the processes depicted in FIG. 2 or in FIG. 3 for each transmitted frame. In either case, the same source image will be processed according to the same STS for each frame, resulting in a repeat of an identical destination frame. For the simple case of the instant invention, depicted in FIGS. 5A through D, 4:1 compression is also achieved but with improved perception on the part of the viewer. Four different destination frames are derived from the same source image, using the varying STS, and presented in sequence. (In any of the above three cases, post-transmission filtering, such as bi-linear interpolation, may be used to improve image smoothness).

However, if it were known that a still image were to be transmitted for a number of frame times, the simple varying STS scheme depicted in FIGS. 5A through 5D could be adapted to a variation that will provide further benefits. Assuming that the destination display incorporates some digital frame-store[12] or other memory function, the information from all four frames can be accumulated and used to completely reconstruct the original high-definition source image. This "accumulation mode" would not provide similar benefits if implemented with either of the two static STS schemes depicted in FIGS. 2 and 3, since the information from successive frames would be identical.

With this scheme, once four frames were collected the oldest of the four could be discarded and replaced by the newest as it came in. The same principle could be applied to other patterns or distributions of data points and the scheme may be varied (as described below) over the frame or over time.

Another technique can be implemented on a relatively high-definition display with a built-in frame store. Normally, a frame store provides data storage for each pixel that can be displayed by the monitor[13]. However, by using the varying STS technique, bandwidth is compressed by transmitting data for only a sub-set of display points. Only some of the memory locations in the frame store would be required to store incoming data for an image frame. (Additional pixels could be used to hold data from previous frames, as in the accumulation mode described above; or, to hold intermediate data points created at the destination display.)

By this scheme, the number of pixels (i.e. resolution) in the frame store would not need to be as high-definition as the display, at any given frame. However, since, over the course of many frames, data will be sent for all (or many) of the points that can be displayed on the high-resolution monitor, data storage points would be required for all those display points. This is because, in standard frame stores, a stored information point can only be displayed at one specific display point. Therefore, the resolution of the frame store would need to be comparable to that of the display, to accommodate the different points at different positions to be displayed over time.

The technique described below will allow a low-resolution frame store to be used with a high-resolution display when implementing a variable STS scheme. The scheme described in FIGS. 5A through 5D will be used as an example. For each 2×2-pixel-cell only one data point is transmitted at each frame and is displayed at the destination position that it occupies in the source image. The other three are derived from repeated data, or intermediate data derived by interpolation or reconstruction. While storage for all four pixel positions in the display cell are needed over time, only one of four is needed at each frame. If the position of the display point associated with the information storage point could be moved, then one storage space per multi-pixel cell would suffice.

In standard frame store devices, display data is read from digital memory and used to specify the color and/or intensity of pixels on the screen. The "look" of the displayed pixel is determined by the data contents of the associated memory location; the position of the displayed pixel is determined by the address of the memory location[14]. In some frame stores several different modes are available that "map" the memory locations to display screen locations in different ways. But for each mode the mapping is constant from frame to frame[15].

A specialized frame store device would facilitate the implementation of the varying STS technique. It is described below. In the specialized frame store the "look" of the pixel is still determined by the contents of the memory location. However, the location of the displayed pixel on the screen is determined by the address of the memory location plus an offset that can be determined in several ways.

One way would be appropriate to the varying STS scheme described in FIGS. 5A thorough 5D. In this case the position of the entire raster would be adjusted to coincide with the upper-left pixel of the multi-pixel cell for FIG. 5A. Similarly, for other frames, shifts would be made to coincide with the upper-right, lower-right and lower-left for FIGS. 5B, 5C and 5D, respectively. Other patterns may also be used to "wobble" the entire display. These would be synchronized with a corresponding "wobble" in the video camera or transmission system.

In another implementation the "wobble", perturbation or offset would be applied independently to individual pixels, or groups of pixels. Groups of pixels may correspond to small geometric areas (neighboring pixels or multi-pixel cells, for example); or a group may consist of a distribution of pixels spread out over a large section of, or an entire, image frame. In this case the complex pattern of offsets for each frame could be pre-determined and synchronized with the camera or image creation system.

Alternately, pixel (or pixel group) position offset data could be stored along with pixel content data in the frame store. The display location of a pixel would then be determined by the address of the memory location and an offset that was stored and associated with the individual pixel or pixel group. A specific case for 2×2 multi-pixel cells is described next.

In standard frame stores pixel content data is stored for each pixel. For example, if eight bits each were required for Red, Green and Blue display data, each pixel would require 24 bits and the 2×2 cell would require 96 bits of data storage (24 bits for each of four pixels). In the specialized frame store 24 bits would be required for display content data (8 each for Red, Green and Blue). An additional 2 bits would be stored with each 24-bit pixel data. These two bits would be used, for example, as follows:

| EXTRA BIT 1 | EXTRA BIT 2 | PIXEL DISPLAY LOCATION |
| --- | --- | --- |
| 0 | 0 | Upper-left pixel of cell. |
| 0 | 1 | Upper-right pixel of cell. |
| 1 | 0 | Lower-left pixel of cell. |
| 1 | 1 | Lower-right pixel of cell. |

In this way, for each 2×2-pixel cell, storage requirements have been reduced from 96 bits to 26 bits. If groups of 2×2 pixel cells were to be offset in like manner, the 2-bit position specification would only have to be stored once for the entire group.

When this type of frame buffer is used with a monitor, the offset may be applied to the electron beam deflection mechanism[16] to implement the wobble of the entire image or individual pixel elements. Beam de-focussing may also be applied to cover the "holes" between transmitted pixel data.

Another technique may be used to fill the holes, or to other benefit. Besides adjusting the position of displayed pixels, the size or shape of pixels can also be adjusted. Again, these adjustments to the pixels may be designated by pre-determined pattern or from data stored with the pixel content data, and may be applied to individual pixels, pixel groups or to an entire frame uniformly. For example, one particular information point may be displayed as a single pixel one time, and as a 2×2 square in another frame. Or, one data point may be displayed as a single pixel in one frame, as a two-by-one pixel block in another frame, and as a one-by-two pixel block in still another frame.

Alternately, and particularly with higher-resolution monitors, intermediate display data would be created to fill the "holes" between transmitted pixel data. This may be done using a digital (or analog) filter to perform simple interpolation or by a more complex reconstruction algorithm. The creation of the intermediate data could be done on the fly, by accessing several data points from the frame store and computing intermediate values. But a low-cost frame store may not provide fast enough data access for complex point-oriented display processing. Therefore, several lines of frame store data may be transferred to a smaller amount of very high-speed memory. This high speed memory can also be of higher resolution (then the rest of the frame store) so as to provide a place to temporarily store the calculated intermediate display data, until they are displayed.

Multiple frame stores, of either standard or specialized construction, can be contained in a single display. They can be used to advantage if implementing a complex interpolation or reconstruction algorithm. For example, one frame store can be used to compute the incoming frame while another frame store is being scanned out to display the previous frame. Two frame stores can be alternated in this fashion, or more than two can be installed in a "pipeline" allowing several frame times to be used to process a frame, once it has been received.[17]

Several frame stores can also be used to store several sequential incoming frames. These can then be displayed, in interleaved manner, to implement the accumulation mode, which can be applied to the entire image or in limited areas.

This discussion has made specific reference only to the sampling pattern described in FIGS. 5A through 5D. However, any of the patterns, techniques and variations described elsewhere in this disclosure can be used in conjunction with these frame store techniques.

Multiple Applications and Different Embodiments

Numerous variations on the basic time varying STS principle have been described above, and will be below, including the "accumulation mode". Different embodiments and variations can be fine tuned for different applications or for different image (or image sequence) characteristics. Any such variations are considered to be within the scope of the instant invention.

Depending upon the application, different embodiments, comprising variations of algorithms and systems, may be implemented. Such application dependent variations are considered to be within the scope of the instant invention, and may include variations intended for:
 display on high-definition television;
 display on low-definition television;
 compatible display on both high- and low-definition televisions;
 exposure onto motion picture film;
 distribution by closed circuit or cable;
 distribution by NTSC, PAL or SECAM transmission;
 distribution by HDTV transmission;
 distribution by videotape or videodisc;
 source derived from motion picture film;
 source derived from videotape;
 source derived from video cameras;
 source derived from synthetic imagery;
 source derived from text or graphics;
 recording on analog medium; and/or,
 recording on digital medium.

Algorithms may also be fine-tuned depending upon the characteristics or features of the image(s) being encoded, and any such adjustments are considered to be within the scope of the instant invention. Such variations may be made to accommodate, for example:
 fast moving, slow moving or still imagery;
 imagery with much small detail or with large undetailed areas;
 text, graphics or pictorial imagery;
 textures or edges;
 imagery with horizontal, vertical or diagonal lines, edges or details;
 imagery of high or low contrast;
 color or black & white imagery; and/or,
 pastel or saturated colors.

Variable Algorithm Over Image Frame

As described above, the varying STS principle may be implemented in numerous embodiments, which may be fine tuned for images or image sequences with different characteristics. For example, the "accumulation mode" described above may improve visual quality for image sequences that have little or no movement, for a period, or for images of text or graphics. It is also possible that certain images or image sequences will have different characteristics in different areas and that the shape or position of those areas will change, over time, from frame to frame.

Many image analysis techniques now exist and other useful techniques may continue to be developed. Similarly, techniques and algorithms now exist, and may later be developed, that can be used to encode area shapes, edges or boundaries. These algorithms and techniques can be used to analyze and specify various areas of different image characteristics. The analyses can be made on a single frame basis, or by comparing progression or change over two or more frames.[18]

Once a frame is analyzed and separated into multiple areas of different characteristics, different versions of the encoding technique can be used for those several areas. These variations of the encoding technique can be designed so that the encoded image can be decoded using a uniform decoding technique over the whole image.

Alternately, a multiplicity of fine tuned decoding algorithms can be used on different areas of the image. The shapes of the decoding areas need not be identical to the encoding areas. The different decoding areas may be determined by analysis at the destination display or, the decoding areas may be derived from area specification information, to be included with the image data in the transmitted signal or transmitted separately.

An image can be displayed with several decoding algorithms, even if it were encoded with a single uniform algorithm. For example, although an image stream were encoded uniformly, the accumulation mode algorithm can be applied to limited areas (with little or no movement, or containing text or graphic information), while elsewhere, information is discarded as soon as it has been displayed.

The method of specifying area shape can be varied depending upon: the encoding/decoding algorithm, image characteristics, the characteristics of camera, transmission or display equipment, or, constraints imposed by transmission bandwidth, computing power or time. For example, areas can be limited to groups of rectangles, triangles, polygons, or other shapes, or may be freely specified on any pixel, or multi-pixel cell, boundary. Limits can also be placed on the number of distinct areas in an image(s), or on the maximum change of area specification from frame to frame.

If the constraints of image complexity, time or computing power do not allow for real-time analysis and/or separation of images into areas, analysis can be done off-line[19] for certain applications. For example, a relatively long time may be spent on the analysis and encoding of the frames of a motion picture film, prior to transmission. The encoded results, perhaps with area specifications would then be stored on videotape (or other medium) for real-time playback, transmission, and display, at a later time. Alternately, frames can be computed, transmitted and recorded off-line, for real-time playback at a later time.

Practical Applications

Digital technology has become commonplace in home television equipment as well as in broadcast equipment. Digital controls, comb filters and even whole-frame digital image stores are now available in home televisions and VCRs. Industrial and broadcast equipment is becoming even more sophisticated. Certain embodiments of the instant invention will prove useful on even the simplest of standard television equipment. Other variations will be best implemented using the newer digitally capable equipment. For example, the "accumulation mode" would require some sort of frame store.

Since HDTV broadcast systems are not in place, standards have not been finalized, and home HDTV receivers are not yet available, it would be possible to include new hardware features (to implement the more complex features of the instant invention) in HDTV equipment without having to worry about incompatibility with existing HDTV systems.

Regarding compatibility between HDTV and standard NTSC broadcast television: some variations of the present invention will provide direct compatibility by displaying the encoded low-bandwidth image directly on a standard television, while the fully decoded, processed and reconstructed (or "accumulated") image would be displayed on a high definition monitor. However, the specific high definition system known as HDTV is wider than standard television by approximately 20% and the incorporation of the "side strips" is a problem not directly addressed above. However, there are portions of the television frame (totaling approximately 10%–15%) during the blanking intervals of the signal, unused for picture information. It is already common practice to store and broadcast digital information in some parts of the blanking intervals.[20] Utilizing the bandwidth reducing capabilities of the instant invention or other encoding techniques, the "side strips" could be compressed, and then encoded into the blanking intervals (or the blanking intervals of a previous frame, to allow more time to decode and reconstruct a more complex and dense coding scheme) and reconstructed, upon reception, by special HDTV televisions. The quality of the "side strips" may suffer slightly when compared to the rest of the image. However, those areas of the image are peripheral and therefore somewhat less critical to viewing.

For those variations of the invention that are not suitable for "compatible" broadcast television, or for HDTV, there are other useful applications. For example, specially encoded "premium" channels could be distributed, by cable or direct satellite broadcast, for reception by special home televisions. Similarly, non-standard "premium" channels could be made available for delivery of special sports or entertainment events to theaters or arenas. Such premium channels may require special television camera or recording equipment to produce the required signals or tapes. In particular, however, transferring movies using a special film chain would require only a limited amount of special production equipment. The popularity of pay movie channels may well justify the added production costs and even the cost of special home receivers.

The invention can also be used to reduce the bandwidth required to record television signals or to increase the amount or quality of information that can be recorded on existing VTR systems. Such systems can be incorporated into VCR (or videodisc) units to improve their recording and/or playback operation, or to provide extra performance when playing tapes (or videodiscs) that have been specially pre-recorded. Similarly, specially recorded tapes can be used in theaters, with special playback and/or display equipment, for high quality electronic cinema. In particular, the new digital tape recorder (DTR) can be adapted to making recordings for the instant invention. A version of the invention can also be used for industrial, commercial, broadcast or scientific image recording systems. Lastly, the varying STS scheme can be applied for bandwidth compression and/or improved perception when recording audio or other signals, as well as for image information.

DETAILED DESCRIPTION OF DRAWINGS

What follows is a detailed description of drawings that will illustrate several preferred embodiments of the instant invention.

Figure 6:
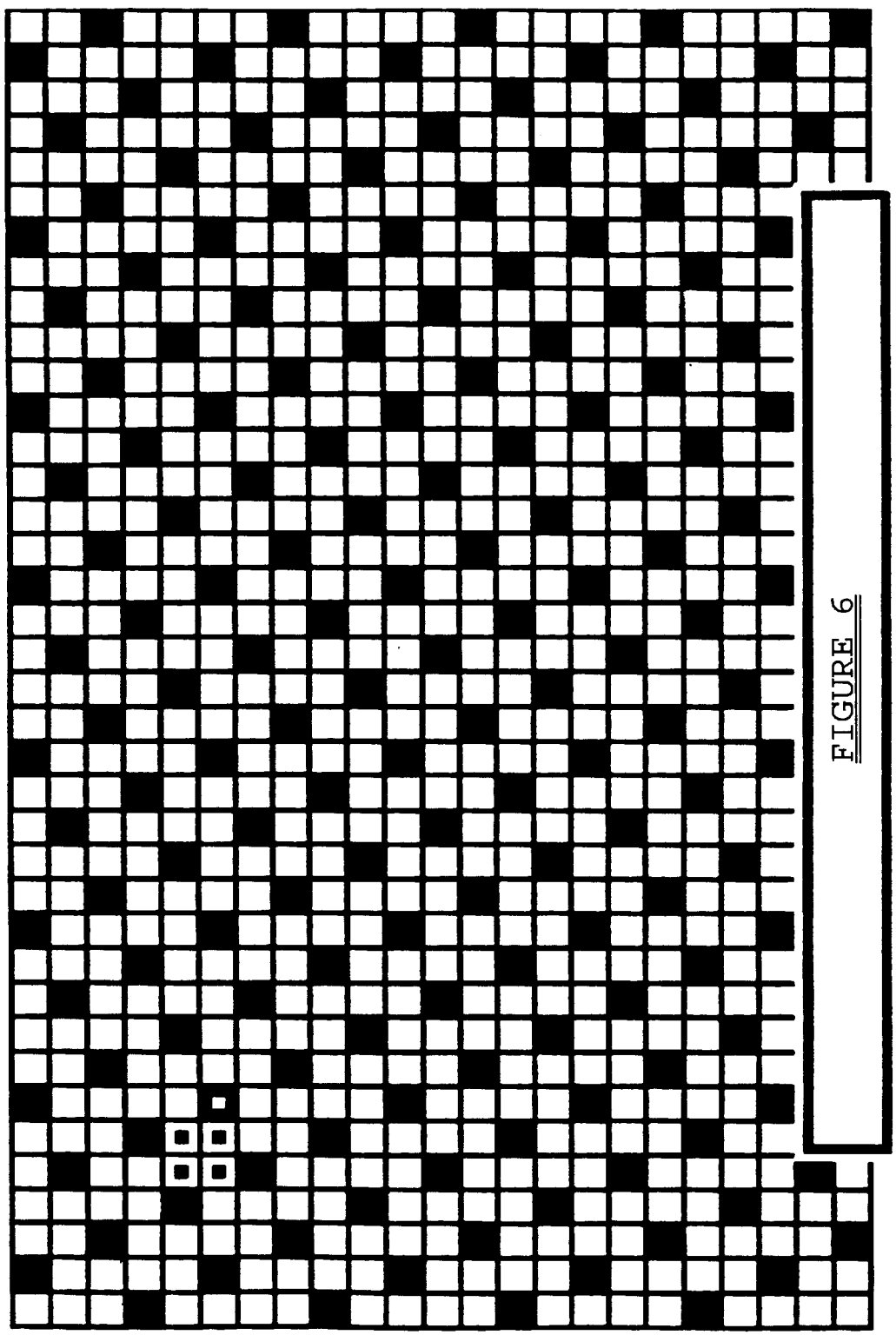
FIG. 6 shows the (4+1):1—four plus one, to one—data point selection pattern.

FIG. 6 shows what will be called the (4+1):1—four plus one, to one—pattern. As discussed earlier, a 2×2-pixel cell pattern yields a rather simple varying STS scheme; and square image cells of larger "N" (with a single pixel sampled) will result in a large reduction of bandwidth. The (4.+1):1 pattern was developed to provide moderate bandwidth reduction, yet with a complex and subtle selection pattern capable of being implemented systematically, but with enough flexibility to be adaptable to numerous situations.

FIG. 6 shows that the entire image plane is tiled by an equal number of single black pixels and white 2×2-pixel cells; an example of each type is shown in the upper left by a small reverse colored box. Information samples can be taken from any of the pixels, black or white, but are transmitted only at the black pixels. Thus, a reduction of 5:1 is achieved.

It will be the convention, throughout the instant application, to refer to two types of pixels: (o)-pixels and (x)-pixels. For (o)-type, data may be sampled, but no data will be transmitted. For (x)-type, data will be transmitted. The (x)-point data will generally be computed from a combination of its own data and the data of associated (o)-points, although (x)-points may also be transmitted alone.

Together, the (x)-pixels and (o)-pixels are referred to as active points. Non-active points are those points on a grid that are used to space out the active points. They are neither sampled nor transmitted. In FIG. 6 all points are active. The white pixels are (o)-type; the black pixels are (x)-type.

Figure 7:
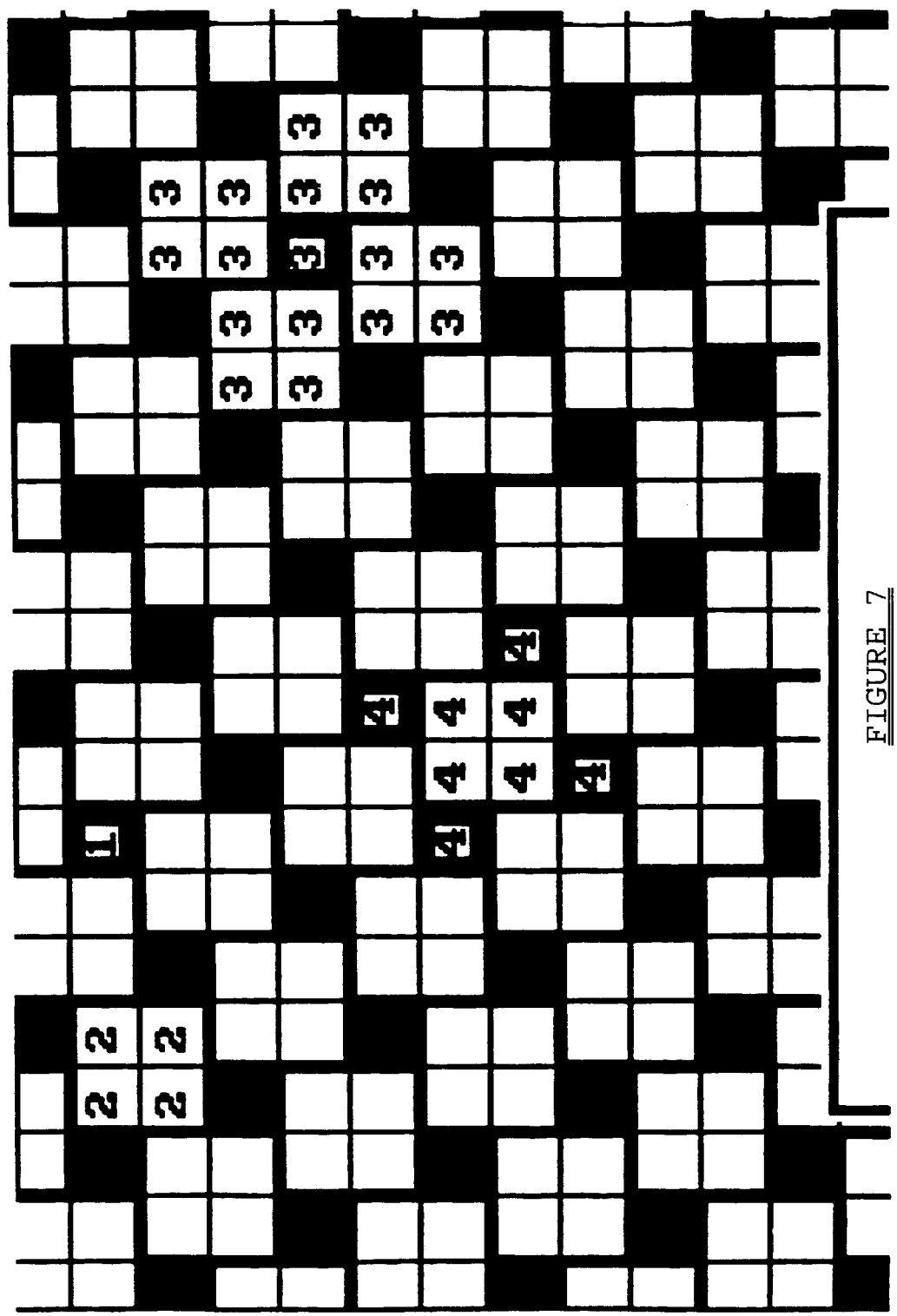
FIG. 7 shows the relationships between elements of the (4+1):1 data point selection pattern.

FIG. 7 shows a single black (x)-point (1), a white 2×2-pixel cell of (o)-points (2), how each single black (x)-point is surrounded by four white 2×2-(o)-pixel cells (3), and how each white 2×2-(o)-pixel cell is surrounded by four single black (x)-points (4).

Figure 8A:
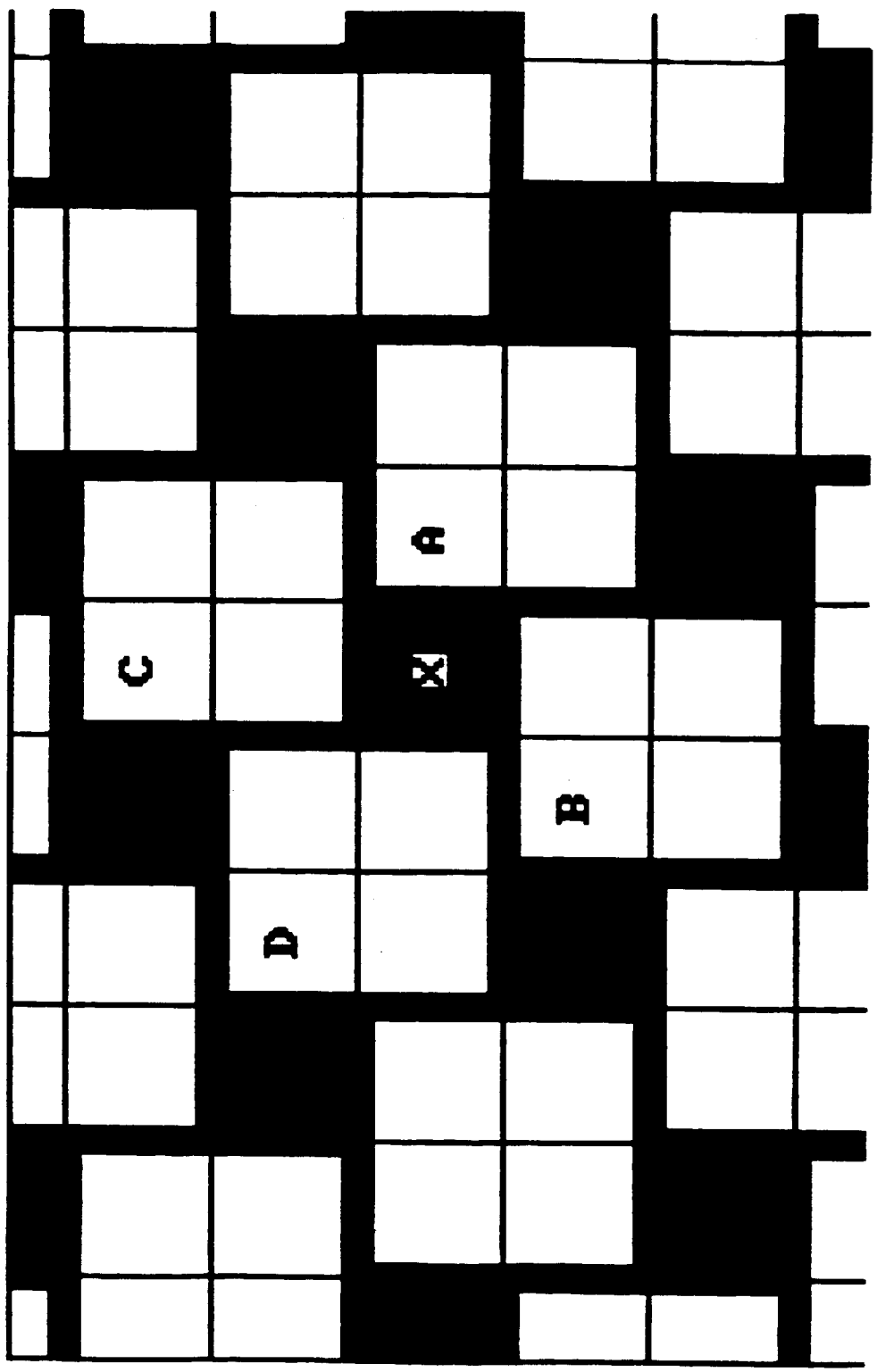
FIGS. 8A through 8D each show one phase of a four phase (4+1):1 data point selection scheme.

FIGS. 8A through 8D each show one phase of a four phase sampling scheme. Referring to FIG. 8A, a single black (x)-pixel is labeled X. For each of the four white 2×2-(o)-pixel cells surrounding X, a single pixel has been selected for sampling. With respect to pixel X, each of the other pixels has a center to center distance of, A=1, B=the square root of 2, C=2 and D=the square root of 5.

Figure 8B:
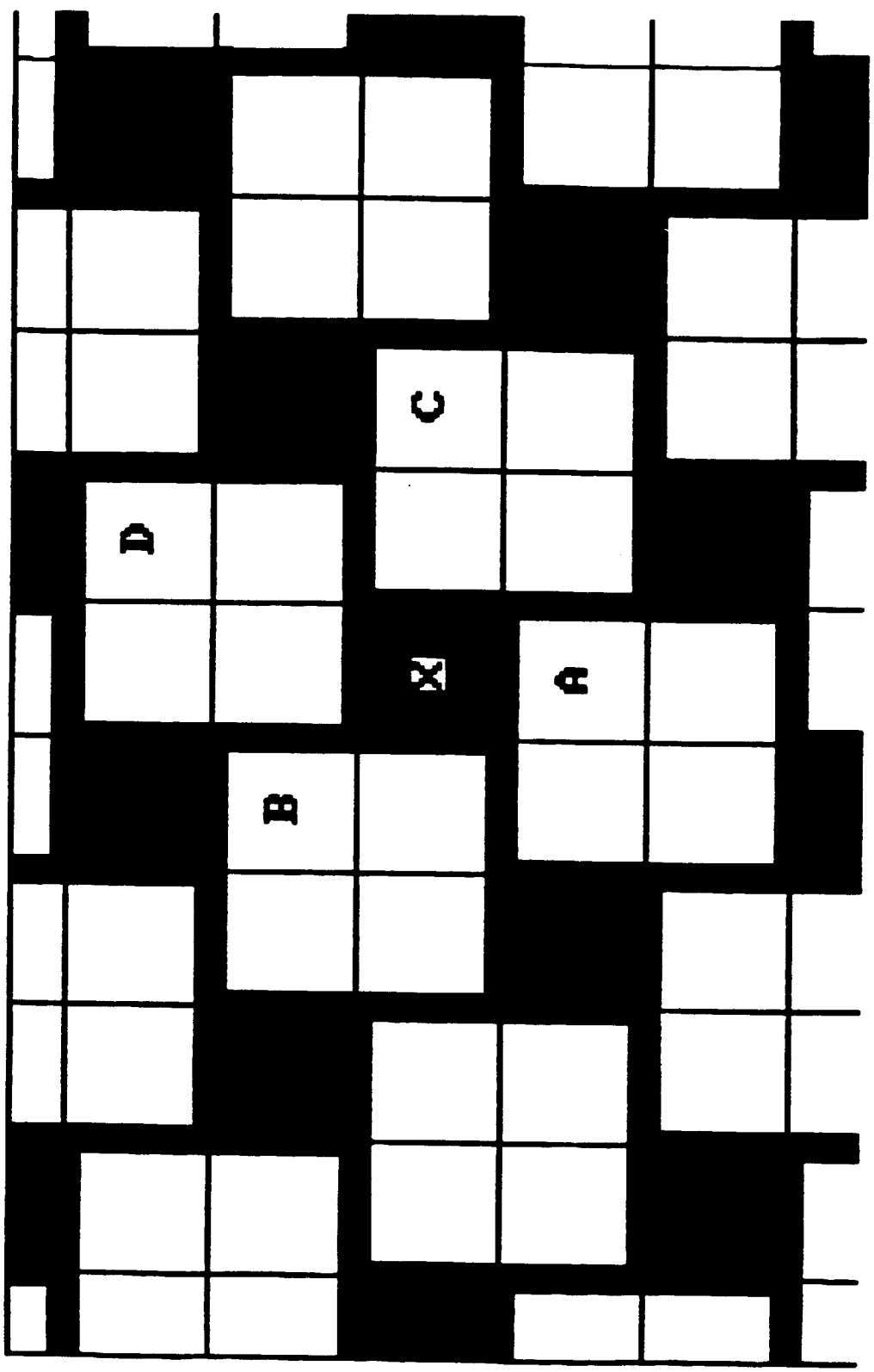
Figure 8C:
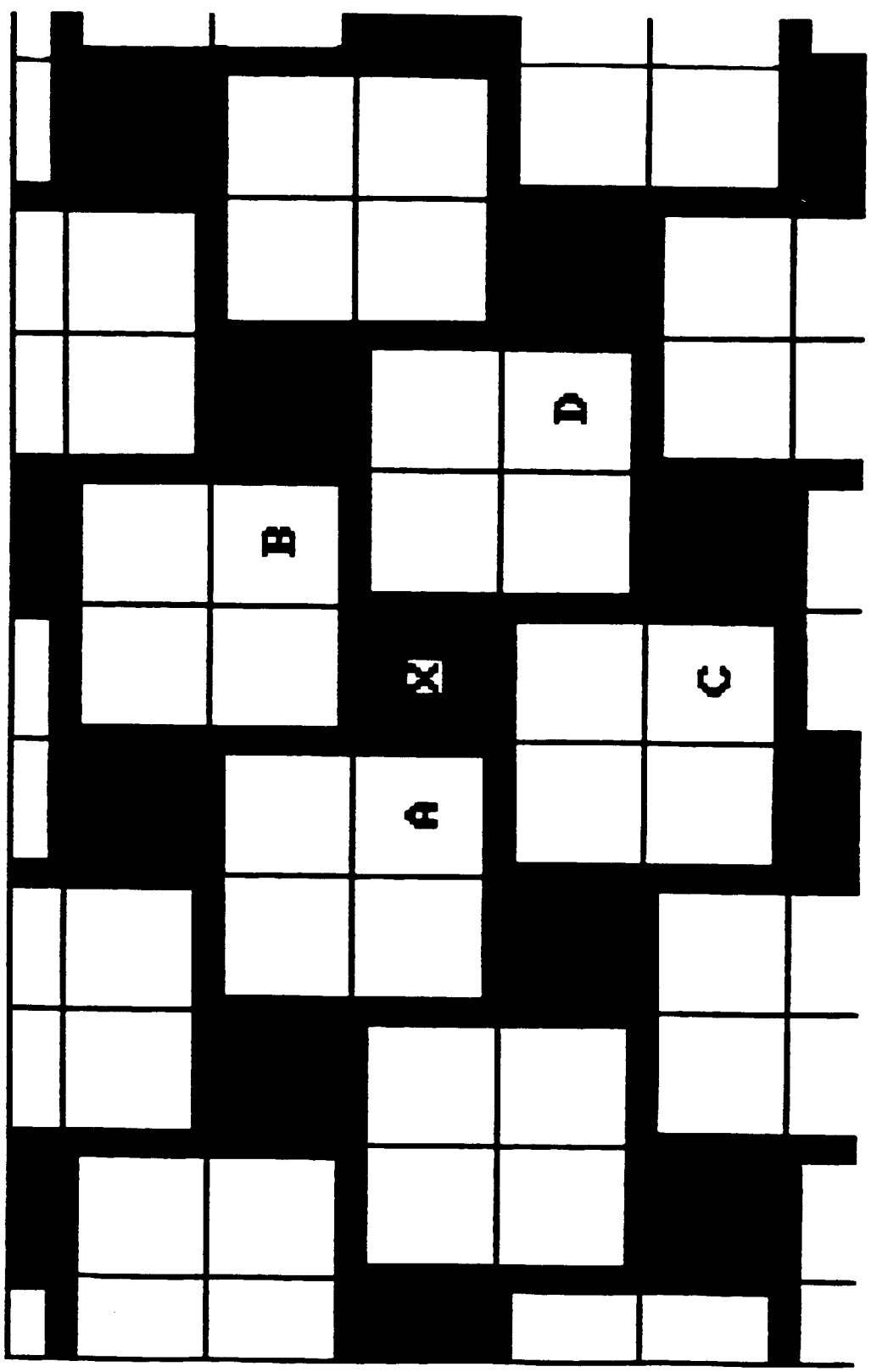
Figure 8D:
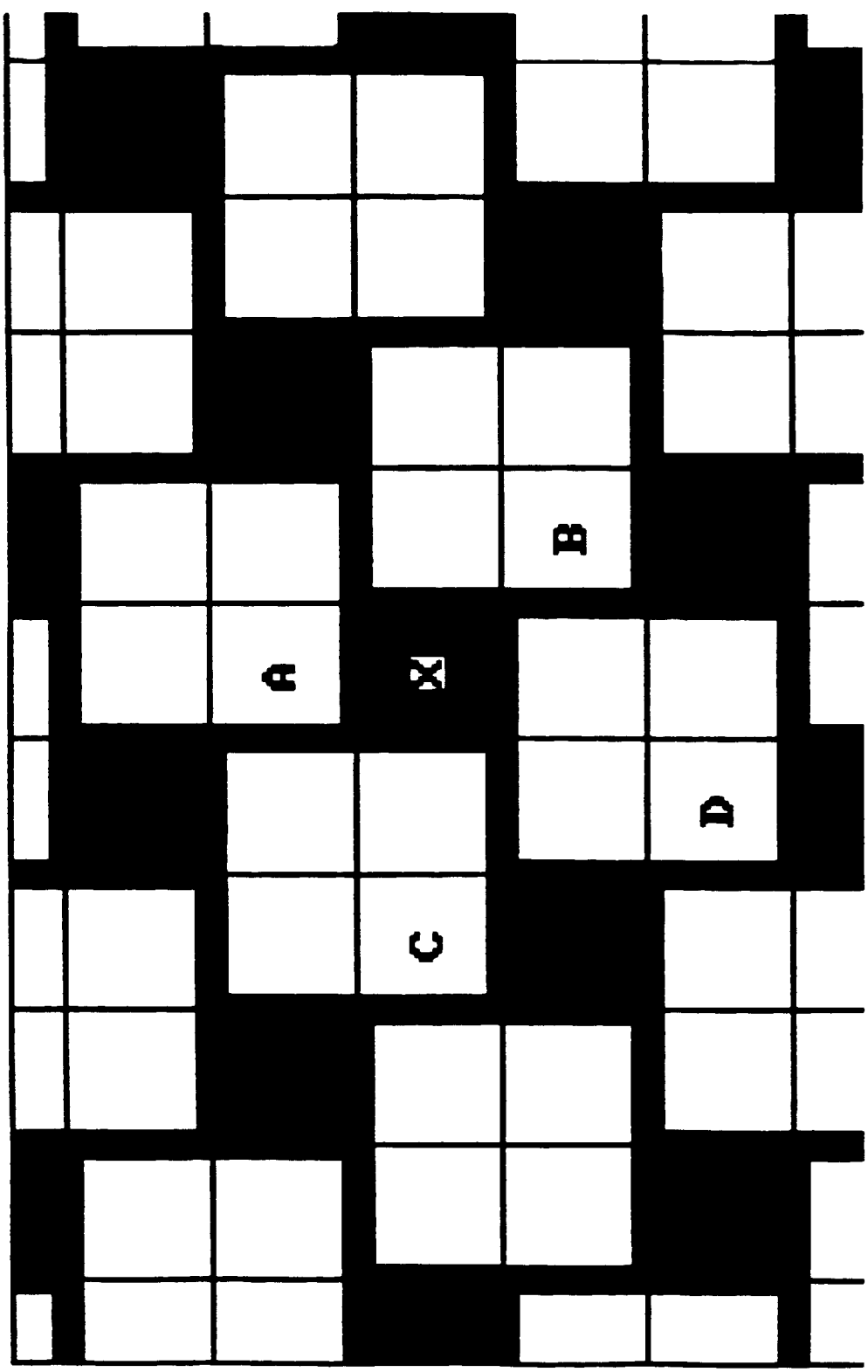
Figure 9:
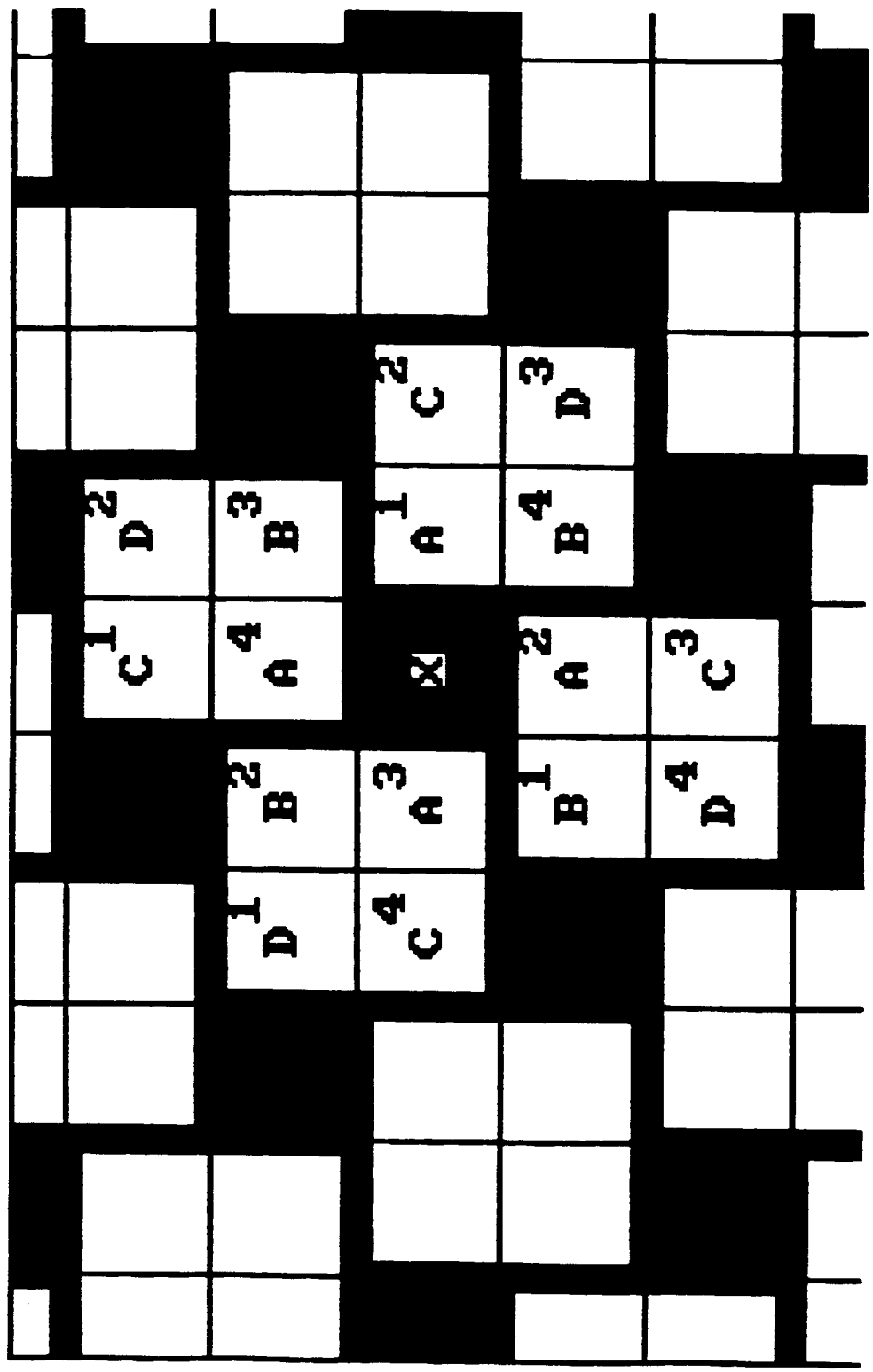
FIG. 9 summarizes the relationships depicted in FIG. 8A through 8D, where the superscripts refer to phase numbers.

Similar patterns for the other three phases of the four phase cycle are shown in FIGS. 8B, 8C and 8D, and summarized in FIG. 9, where the superscripts refer to phase numbers. Note that, in FIG. 9:

each 2×2-pixel cell contains one each of A, B, C & D;
each 2×2-pixel cell contains one each of 1, 2, 3 & 4;
there are four each of A, B, C & D;
there are four each of 1, 2, 3 & 4; and,
each letter is paired with each number exactly once.

Figure 10:
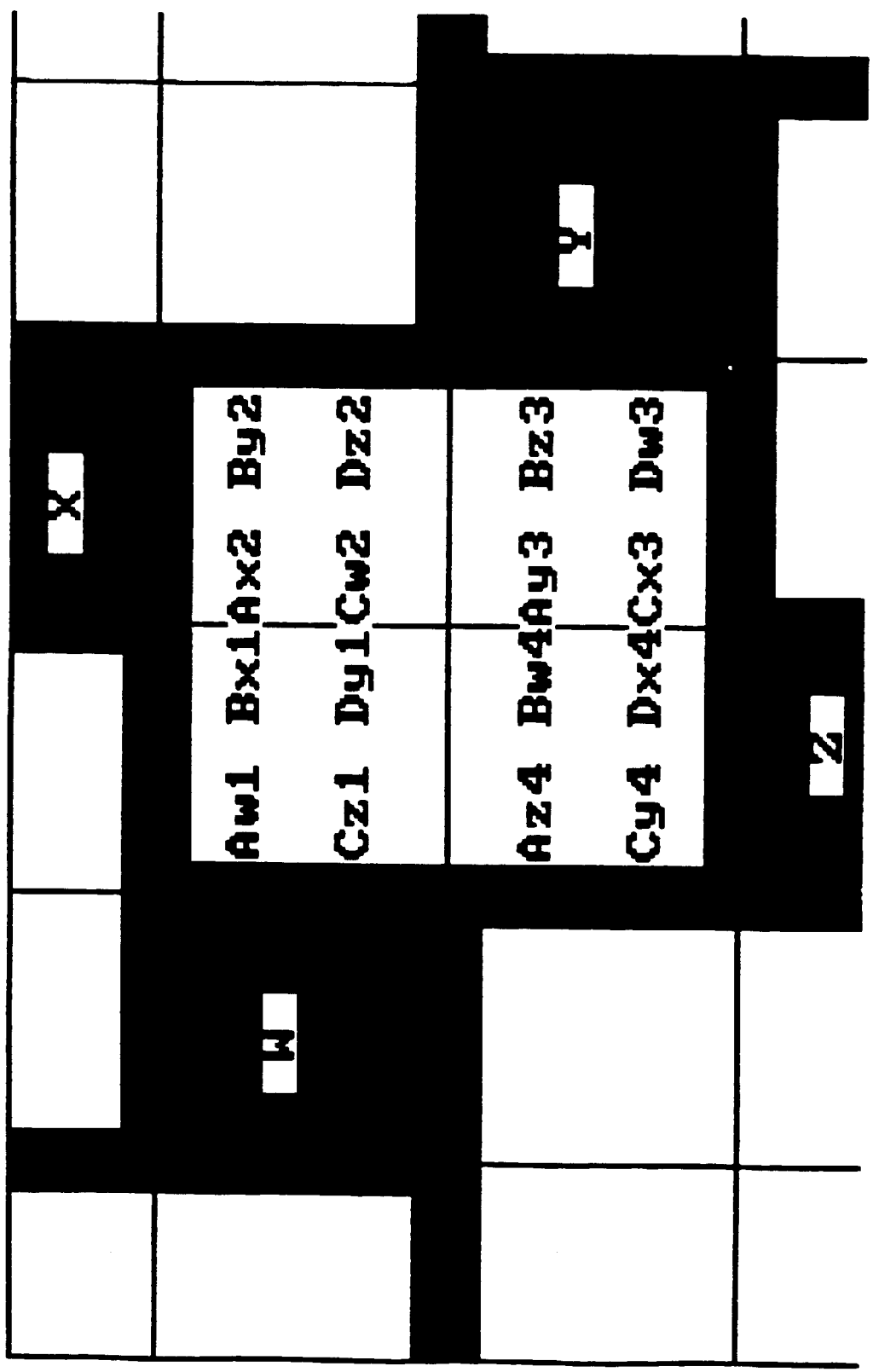
FIG. 10 shows the STS data point selection pattern shown in FIGS. 8A through 8D and 9 applied to four black single pixels (labeled W, X, Y & Z) that surround one white 2×2-pixel cell.

It has been noted that each white 2×2-pixel cell is surrounded by four black single pixels. The STS sampling pattern shown in FIGS. 8A through 8D and 9 has been applied to four black single pixels (labeled W, X, Y & Z) that surround one white 2×2-pixel cell, and is depicted in FIG. 10. Each of the four white pixels contains four, three-character items. The first character, an upper-case letter, refers to the position of the white pixel with respect to the black pixel it is associated with, and is either A, B, C or D. The second, a lower-case letter, refers to the single black pixel that the white pixel is associated with, and is either w, x, y or z. The third character is a number referring to the phase of the cycle, and is either 1, 2, 3 or 4. Note that for each of the four white pixels:

- one and only one, three character item, each contains an A, B, C & D;
- one and only one, three character item, each contains a w, x, y & z; and,
- all the items for any one pixel contain the same number, either 1, 2, 3 or 4;

and that:

- there is one and only one combination of each upper-case letter with each lower-case letter;
- there is one and only one combination of each upper-case letter with each number; and,
- there is one and only one combination of each lower-case letter with each number.

In practice, this results in a situation where one white pixel of the 2×2-pixel cell is associated with all four single black pixels at the same time. A different white pixel is associated at each phase, with all four pixels of the 2×2-pixel cell having a turn.

Other sampling patterns may be used. For a given single black pixel, A, B, C & D may be sampled in the reverse order, or other order, or randomly. And, as will be shown later, the same pattern or phase need not apply to all single black pixels.

Intermediate Transmission Scheme

Bi-linear interpolation was described, above, as a way to create display information for intermediate pixels, between those pixels for which transmission information exists. By a conceptually similar technique, source information that exists, between pixels that will be transmitted, can be apportioned and included with those transmitted points.

For example, assume three pixels are on a single scan line, labeled A, B & C, and that only A and C will be transmitted, in order to reduce the transmission bandwidth. The information from pixel B may be split and transmitted with the other two pixels. Thus, one transmitted pixel would contain A+(B/2) and the other C+(B/2). In order to normalize the content of each pixel from 1.5 information points, back to 1 point, they would each be divided by 1.5, yielding (2A+B)/3 and (2C+B)/3.

The above assumes that point B is exactly half way between A and C and that its entire content is equally apportioned to the two transmission points. If B were only ¼ of the way from A to C a linear apportionment scheme would result in A+(3B/4) and C+(B/4), which again might (or might not) be normalized. In this way, the intermediate point may be "located" or "positioned" between the transmitted points. Other apportionment schemes may also be used and may involve different numbers of transmitted and non-transmitted points. However, the general principle is that the closer the non-transmitted point is to the transmitted point, the larger the apportionment or "weighting" factor should be.

However, for certain applications, a counter-intuitive scheme, where closer points were weighted less, could be used. Other weighting schemes may prove useful for certain types of images or for certain applications.[21]

(4+1):1 Digital Weighting Scheme

Returning now to the (4+1):1 pattern, depicted in FIGS. 6 through 10, one particular weighting scheme will be described. Other weighting schemes are possible, and the particular weighting factors, or the exact positions of the transmitted or intermediate points, may be adjusted to accommodate various camera, transmission, storage or display systems, or for other purposes. Specifically, the (4+1):1 scheme is square (i.e., points are equally spaced in the horizontal and vertical directions) and this may be adjusted for certain television systems with non-square line and point spacing, or to adapt the technique to particular screen shapes, information sampling rates or, transmission or modulation frequencies.

A transmitted point, X, in the (4+1):1 scheme, will be associated with four other points, A, B, C & D, in descending order of closeness. Therefore, the data at each transmitted point, X, will consist of five pieces of information, A, B, C, D and X itself. Each will be weighted by a factor.

Any point-oriented algorithm, to be implemented in digital hardware, would have to be executed millions of times each second. Therefore, it is important to develop a weighting algorithm that will not require undue calculation. Integer arithmetic is preferred, and division is a particularly sensitive operation that can take much computing time. However, division (or multiplication) by a power of two is easily accomplished by shifting a digital register to the right (or left), a trivial operation. With this in mind, the following normalized weighting factors ($K\_$) have been developed:

| | |
|---|---|
| for X, | $K_x = 6/16$; |
| for A, | $K_a = 4/16$; |
| for B, | $K_b = 3/16$; |
| for C, | $K_c = 2/16$; |
| for D, | $K_d = 1/16$. |

Of the numbers involved for multiplication or division, most (1, 2, 4 & 16) are powers of 2 and the others (3=2+1; 6=4+2) are sums of two powers of 2.

Weighting factors need not be based on powers of two. Other weighting factors may prove to be superior to those above, for certain purposes. In particular, the factor for the transmitted point $K_x$ can be varied to effect and can even be reduced to zero (as can other weighting factors, for certain purposes). Weighting factors can even be made negative; for example, as a way of incorporating an edge enhancement[22] or other image processing algorithm into the instant invention. Alternately, weighting factors do not have to be constant but can be varied on a pre-determined or a pseudo-random basis. Or, they can be determined based on other criteria, such as, image characteristics. Any such variation is considered to be within the scope of the instant invention and may include, for example:

- weight most heavily the brightest (or dimmest) pixels;
- weight most heavily the pixels that are most different from (or most similar to) their neighbors;
- weight most heavily the pixels that are most different from (or most similar to) the equivalent pixels in adjacent or neighboring frames, both forward and backward in time; and/or,
- set or adjust a weighting factor, based on an additional factor, calculated in any other way, from the image sequence data.

Similarly, when displaying or decoding an image encoded by the instant invention, a set of "weighting factors" may be calculated for use in a bi-linear (or other) interpolation scheme, or other image reconstruction scheme. These factors can be determined in many ways, as described above.

They would then be encoded into the transmitted signal, or derived independently at the destination by predetermined algorithm or by analysis of the image sequence data.

Returning to the above specific example, for each transmitted point, X, the amount of information devoted to itself is roughly 1/3(exactly 6/16), with the remainder devoted to intermediate information. For each white pixel, a total of 10/16 of an information point is devoted to it; 1/16+2/26+3/16+4/16, as it is in the A, B, C & D positions, with respect to four different transmitted (x)-pixels at the same time. In this way, the non-transmitted white pixel is (approximately) properly located between the four black transmitted points. However, each white pixel is apportioned and transmitted only once every four frames, so the average, over time, is 2·5/16 of an information point devoted to each white pixel.

Intermediate Point Reconstruction

For many applications, embodiments of the instant invention will simply display the transmitted (x)-pixels. Straightforward interpolative techniques may be used to "fill in the holes" between those points, but no extraordinary computational efforts will be made to "reconstruct" the sampled-but-not-transmitted (o)-points. Alternately, armed with knowledge of how data from the (x)- and (o)-points have been combined, extra computational effort may be expended to (approximately) reconstruct the intermediate points at the display.

Computational methods exist, from fields such as Computerized Axial Tomography (CAT scanning), image un-defocussing (i.e. to digitally sharpen a fuzzy image), Fourier transform processing and auto-correlation processing, that facilitate the reconstruction of individual data points that have been dispersed and/or embedded in larger data structures.[23] These, or other techniques, can be applied to a limited section, or to the entire image, to compute better values for the intermediate display points than would be obtained by simple interpolative techniques.

(4+1):1 Pattern, in Practice

To this point in the instant application, the (4+1):1 pattern has been depicted in a particular orientation that facilitates the clear illustration of the relationship between the single black pixels and the white 2×2-pixel cells (see FIG. 6). Lines drawn between the nearest neighbors of the single black (x)-points would be approximately on 28 and 118 degree lines. However, television imaging systems are usually set up on rectilinear grids of 0 and 90 degrees. Also, note that the distance between nearest neighbors of the single black (x)-points is the square root of five, when compared with the unit of the grid in FIG. 6.

Figure 11:
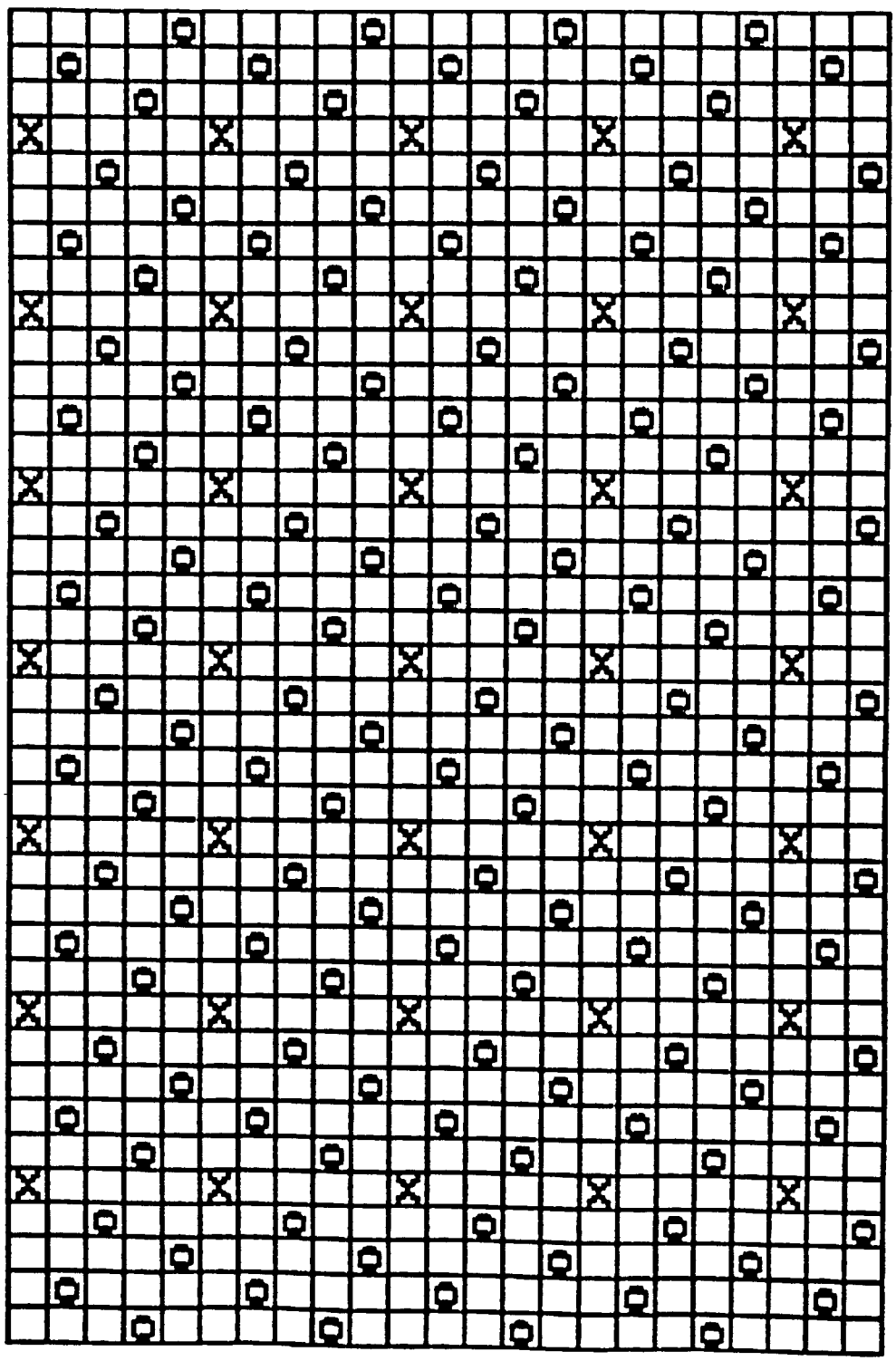
FIG. 11 shows the pattern of FIG. 6 multiplied in scale by the square root of five, and tilted approximately 28 degrees, to conveniently impose it on a unit square grid.
Figure 12A:
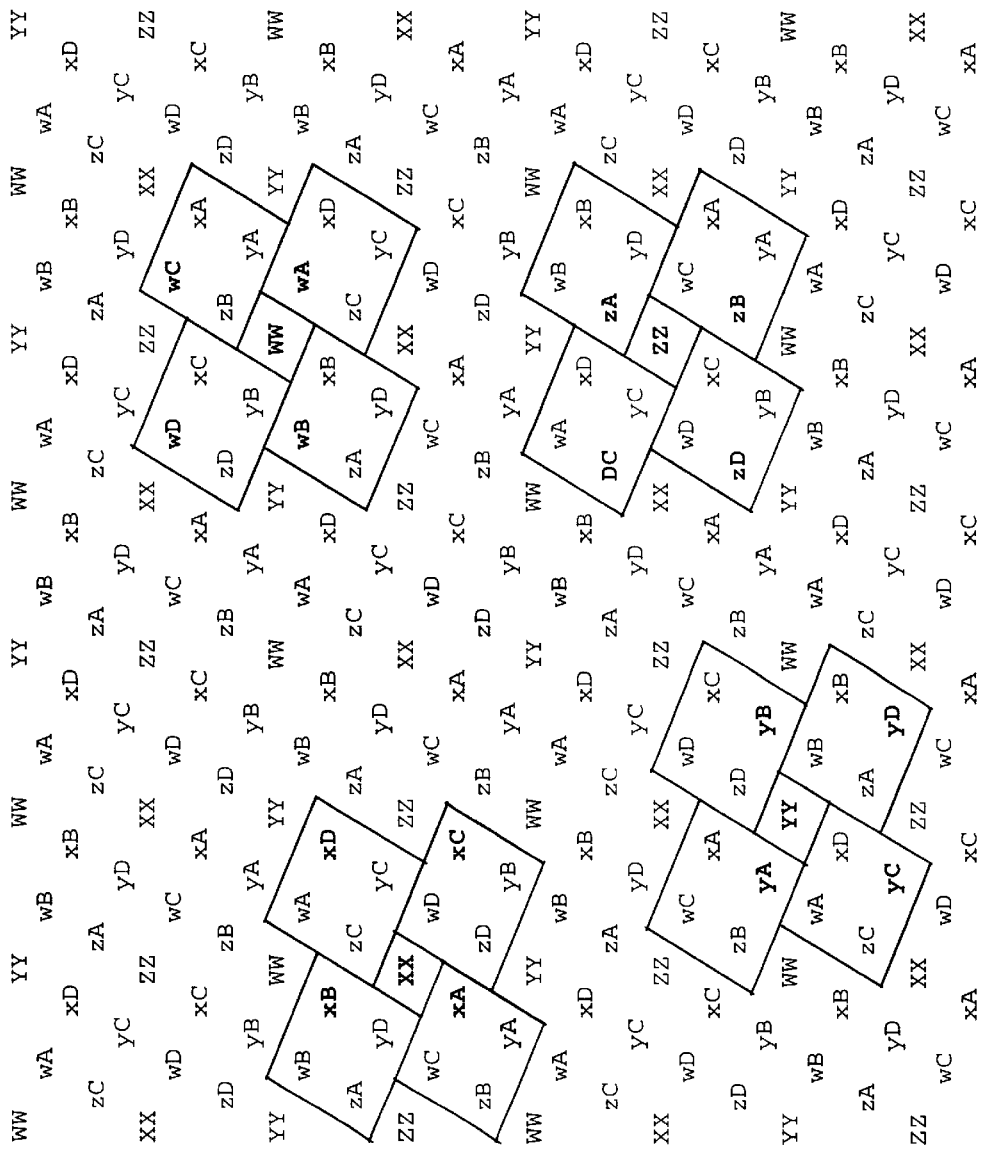
FIGS. 12A through 12D each show one phase of a four phase cycle of a (4+1):1 pattern, where the phase of the (x)-points has been varied.
Figure 12B:
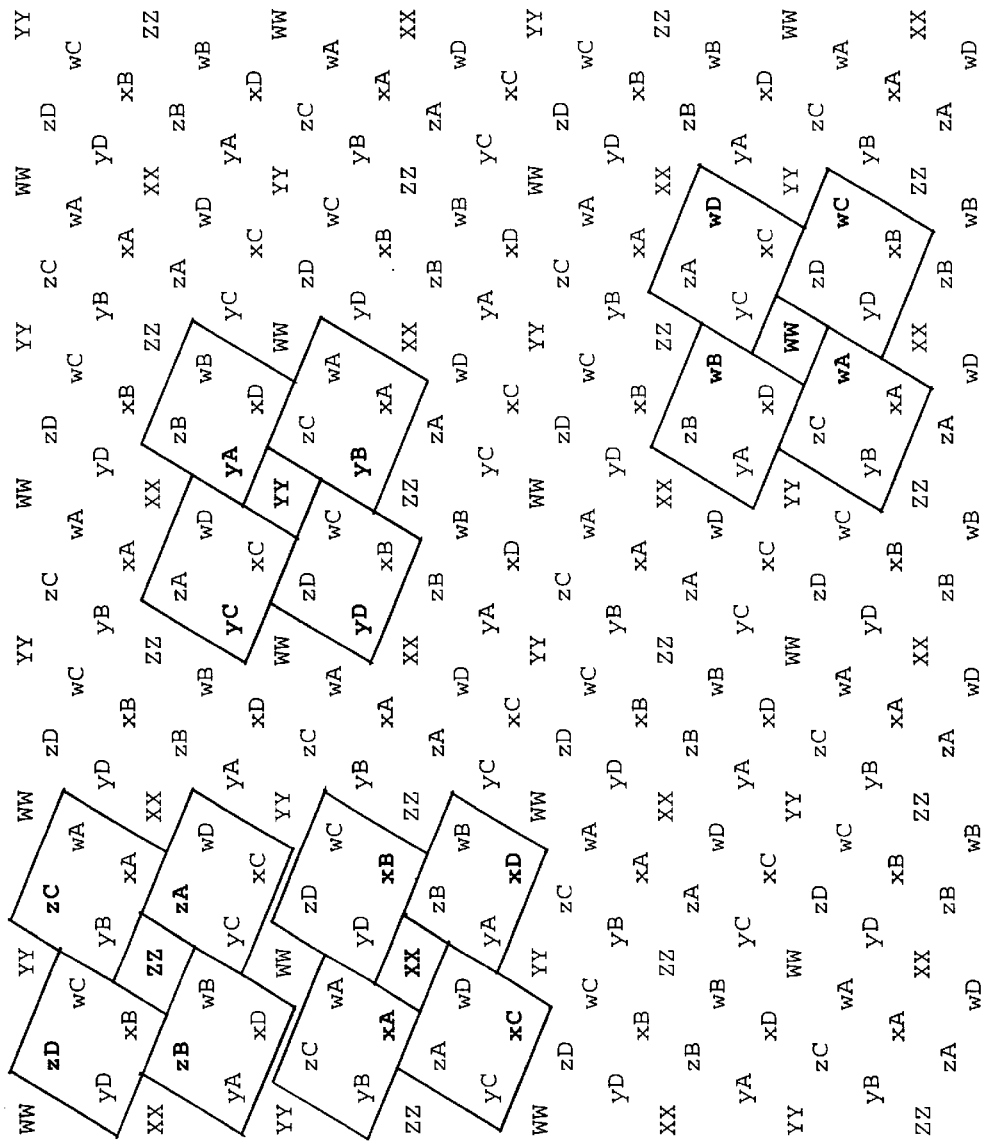
Figure 12C:
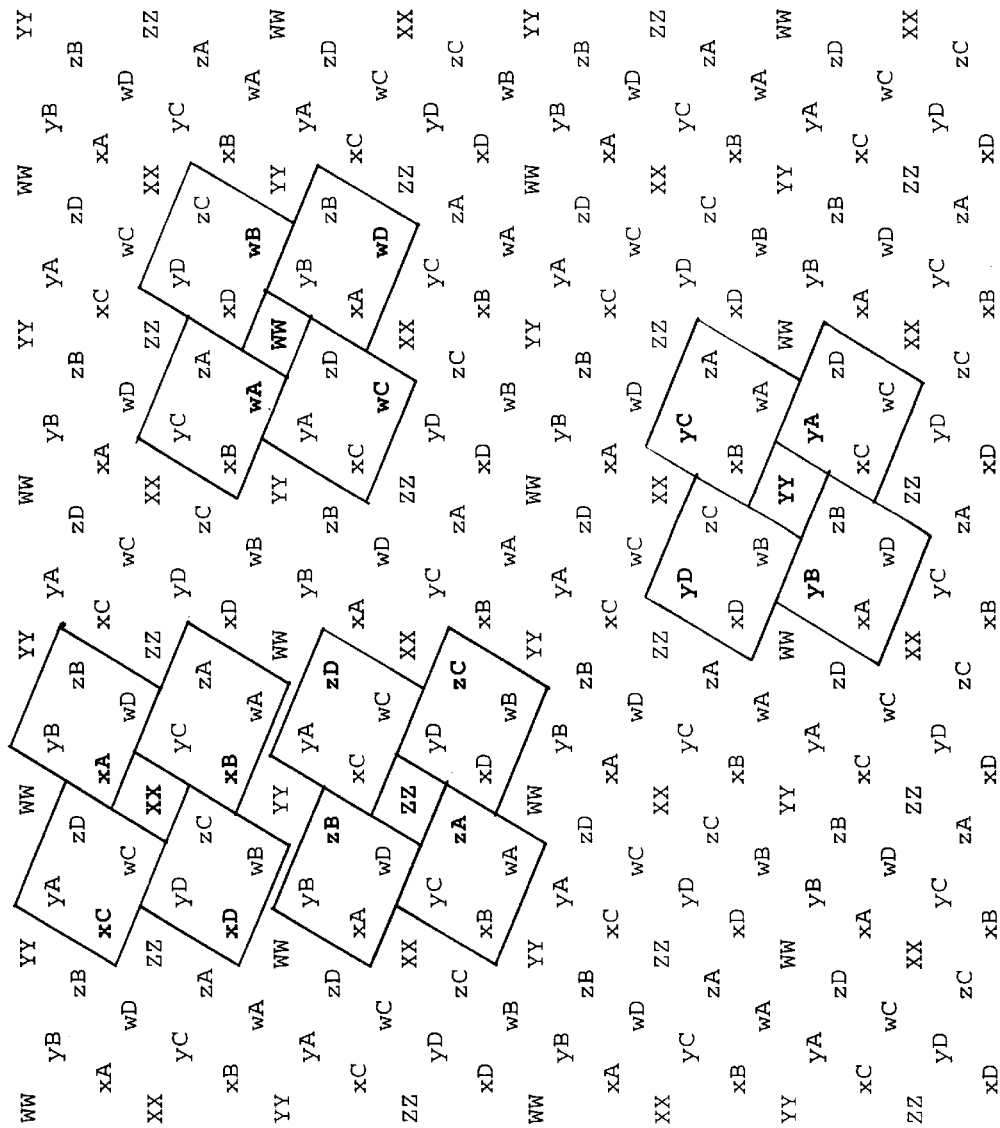
Figure 12D:
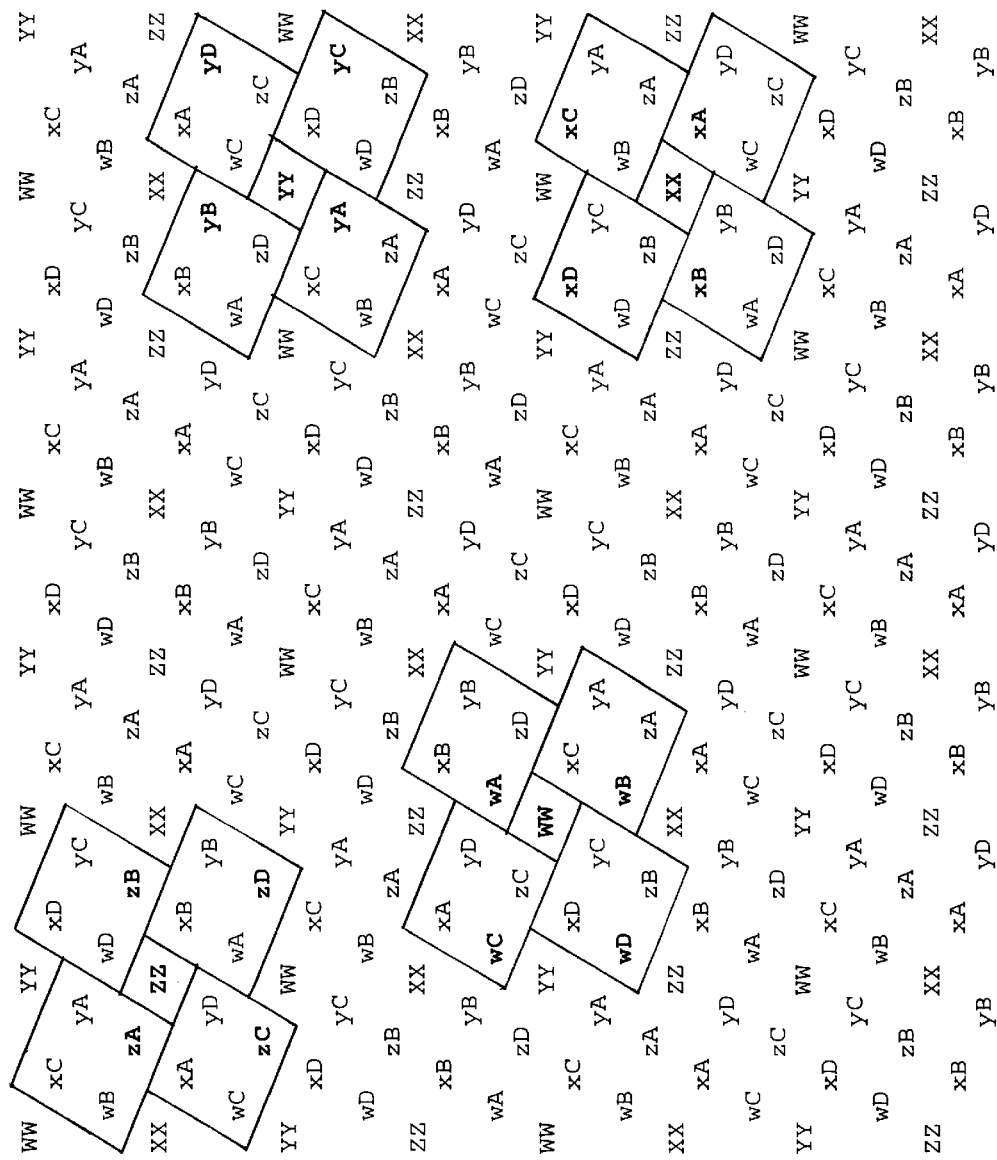

By multiplying the entire scale of the pattern by the square root of five, and tilting it approximately 28 degrees, it may be conveniently depicted on a unit square grid; see FIG. 11. In FIG. 11, the position of the black pixels are depicted by (x), the position of the white pixels by (o), and blank squares indicate inactive pixels that are included for spacing purposes only. The result is that the transmitted pixel positions (x) fall on a square grid with a unit side of five, when compared to the unit side of the grid in FIG. 6.

This square grid, of (x)-pixels, can be conveniently overlaid on a standard rectilinear television raster. Or, it can be stretched or squeezed, either horizontally or vertically, to accommodate the requirements of picture aspect ratio, scanning or sampling rate, modulation or transmission frequency, or other system or operational requirement.

For interlaced video systems, with frames consisting of two interleaved fields, each containing only odd or even lines, the grid can be overlaid on the whole frame, or on each field separately.

Standard interlaced television cameras only scan half of the possible raster lines for each field. For some embodiments of the instant invention, it will be necessary to use cameras that scan all lines of an interleaved frame in one field time, or can even scan at a rate higher than one full frame for each field. One "field's worth" of information will then be selected, encoded and transmitted according to the techniques described herein. For some applications, e.g. a film chain, it will be possible to use a very high resolution camera that scans slower than real-time. The encoded frames can then be recorded on videotape, or some other medium, for real-time playback and/or transmission.

Most color television systems utilize three different color signals. These are often Red, Green and Blue of equal resolution, or one luminance and two chrominance signals (sometimes in the form called Y, I & Q), with the luminance signal of a higher resolution and the chrominance signals at lower resolutions. For Y, I & Q, the bandwidth of the three signals are approximately 3.5 MHz, 1.5 MHz and 0.6 Mhz respectively. In some embodiments of the instant invention, different versions of the varying STS technique will be utilized to encode different signal components, particularly if the signals are at different resolutions or bandwidths. Similarly, different versions of varying STSs can be applied to the left and right signal components of a stereo pair of image signals.[24] Further, a varying STS can be applied to a method for combining the various signal components. These techniques will further increase the variation and complexity of the STS and will apply not only to the (4+1):1 pattern but to any pattern used to implement the instant invention.

Note that, for the (4+1):1 pattern as depicted in FIG. 11, if the (x)- and (o)-points only, are considered, a reduction of 5:1 is achieved. But, if all points on the grid are considered as valid data, the reduction is 25:1.

Differential Phasing

As described above, the varying STS scheme using the (4+1):1 pattern samples only one of the intermediate, white, 2×2-pixel cell points, for each of the four phases of the cycle. The point is apportioned to four black, single, transmission points at the same time. This firmly "locates" the intermediate data point by weighting its apportionment among the four transmission points. However, by including each intermediate point only once every four frames (or fields) –7.5 (or 15) times each second—a visual roughness or texture may result.

In order to reduce this possibility, the phase of the multiplicity of transmission (x)-points can be varied. An example of one variation scheme is depicted in FIGS. 12A through 12D.

FIGS. 12A through 12D each show one phase of a four phase cycle of a (4+1):1 pattern, where the phase of the (x)-points has been varied. With a four part cycle, (x)-points may be set to four different phases. These have been denoted by WW, XX, YY & ZZ. The arrangement is such that the four (x)-points that are associated with each 2×2-pixel cell of (o)-points are each of a different phase. The (o)-points are denoted by a two letter code. The first lower-case letter (w, x, y & z) refers to the (x)-point with which the (o)-point is associated at that time. The upper-case letter (A, B, C & D) refers to the position relationship between the (x)-point and (o)-point.

In each of the four FIGS. 12A through 12D, one of each type of (x)-point (WW, XX, YY & ZZ) is printed in bold type, as are the four (o)-points associated with it. Also, boxes have been drawn to clearly indicate the (x)-pixel and the four 2×2-(o)-pixel-cells associated with it.

This particular scheme is well distributed both spatially and temporally, yet is based on direct, simple rules that can easily be implemented in a systematic fashion. It results in several nice features:

all (o)-points are used in each phase;

each (o)-point is used with one, and only one, (x)-point at each phase;

each (o)-point is associated with each of the four (x)-points (WW, XX, YY & ZZ), that surround its 2×2-pixel cell, during some phase;

each (o)-point is in each type of position relationship (A, B, C & D), during some phase;

each (x)-point is associated with all four types of positions (A, B, C & D) at each phase; and, each (x)-point is associated once, and only once, with all 16 of the possible (o)-points it can be associated with, at some phase of the cycle.

It should be noted that, the above differential phasing scheme is an example and should not be interpreted as limiting in nature; it is extremely regular and systematic. It is possible to vary the phase or direction of the cycle, or even use entirely different cycles or pseudo-random (i.e. non-cyclic, or non-repeating) sequences, for any of the multiplicity of (x)-points. The number of ways that various sequences may be constructed and assigned to the (x)-points over the image plane, is almost limitless; and, the pattern of assigning the various sampling sequences to the (x)-points may itself vary over time. In particular, cycling sequences of different lengths may be used over the frame, so that, while the scheme for an individual point is relatively short, the overall cyclic repeat for the entire frame may be quite long. Also, in particular, the above examples show cases where (o)-points of the type A, B, C & D are sampled in order, one at a time. Other orders or schemes are possible, for example, A+C alternated with B+D; or, associating more or fewer (o)-points with each (x)-point.

Symmetry and Other Variations

FIG. 13 shows two variations on the (4+1):1 pattern. The left unit square is the same as the one used thus far; the right unit square is a mirror image pattern. The difference is that the square of (o)-points, within each larger square of (x)-points, is skewed, or flipped, in the opposite direction. The two patterns may be used, for example, to extend the cycle of phases from 4 to 8, e.g., A, B, C, D, mirror A, mirror B, mirror C and mirror D.

It should be noted that, when comparing the pair of unit squares in FIG. 13, if the four (x)-points remain constant, the (o)-points in one configuration are inactive points in the other. In general, STS schemes can also be varied by changing the assignment of (x)-points, (o)-points and inactive points, over the frame, from frame to frame.

Figure 14:
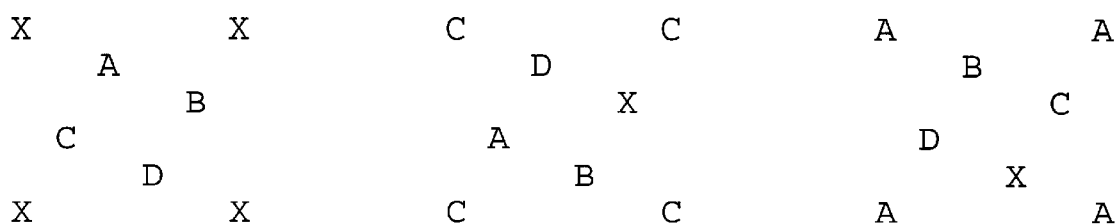
FIG. 14 shows a five-way variation applied to the (4+1):1 pattern.

In FIG. 14, a five-way variation on the (4+1):1 pattern is shown. Here, it is required that the ⅕ subset of the total number of points that are active (i.e., in FIG. 11, the union of the set of (x)-points and (o)-points, but none of the blank points) remains constant. However, it is allowed that the active points be reassigned as (x)- and (o)-type. Five types of points are shown in a unit square, which represents the repeat of the pattern; X for the (x)-points, and A, B, C & D for the four (o)-points (which differ from each other only in their relative positions). To generate the five variations, the columns or rows of the unit square are shifted, with "wrap-around". In this case the columns are shifted right-to-left and then, adjusted up/down so that an active point is in the upper left corner. Alternately, one may consider that, with five types of points, one may start the pattern, at the upper left corner, with any of the five. The points may be interchanged for these purposes because the distance between any two adjacent active points is the same. The five alternatives may be presented in any cycle or non-cyclic order. Although, 1, 3, 5, 2, 4, 1 . . . may help disguise the cyclic horizontal shift.

If, instead, we consider the situation where four (x)-points are out of phase (and designated W, X, Y & Z) the number of variations is increased to 20. For each of the five variations shown in FIG. 14 there are four further variations. The character X, or the upper right X for number One, may be any one of W, X, Y or Z. The full unit square repeat for a differential phase pattern is thus greater than for the previous situation.

If we remove the requirement that the ⅕ subset of active points must remain constant, the number of variations increases greatly. In this case, the shift (with wrap-around) of rows and the shift of columns are not equivalent. The five column shift, right-to-left, is shown in FIG. 15; and the five row shift, bottom-to-top is shown in FIG. 16. They can be used in the order shown, in reverse, or in any order or sequence, although, the order 1, 3, 5, 2, 4 will help make the cycle of row/column shifting less apparent. The two shifts may be applied independently for a total of 25 combinations.

Alternately one may derive the same alternatives by considering that there are 25 points ((x)-, (o)- and blank) in the original unit square and a given reference point may reside at any of those 25 points. For the differential phase (W, X, Y & Z) case, the repeat square is 20 by 20 points and the number of variations of this type is, thus, 400. The number of ways those 400 variations can be sequenced is virtually limitless.

This last technique will provide a means for varying the overall pattern in subtle and complex ways. In particular, it may be used as follows: Some of the techniques described, in particular the simpler patterns, may produce their own perceivable artifacts. For example, if we consider the first (4+1):1 pattern with uniform phase, each of the four (o)-points, in a 2×2-pixel cell, is selected by all four (x)-points at the same time, and the other three (o)-points are ignored. And the four (o)-points are sampled in a circular order. The entire cycle may run as few as 7.5 times per second, if each phase were applied to a standard video frame. These factors may combine to produce a perceivable circular wobble or texture to the image. A sequence of subtle adjustments may be selected, from the sets of up to 400 variations described above, to mask or counteract a perceived wobble, spin or texture anomaly.

Any and all of the techniques and variations described herein may be applied, in combination, to achieve the overall desired system operation or a visually pleasing result. The discussions have focused on what has been called the (4+1):1 pattern. However, all of the principles of interpolation, weighting, phasing, spatial and temporal variations, etc., can be applied to other basic sampling patterns. One other such pattern will be shown below.

(2+1):1 Hexagonal-cell Pattern

An additional pattern will be described as providing the basis for alternate embodiments of a varying STS sampling scheme. This is intended as an illustration of how the basic concepts and techniques described above may be applied to a pattern that is substantially different than the (4+1):1 pattern. Therefore, the following discussion should not be interpreted as limiting in nature. All of the techniques described both above and below may be applied, where appropriate, to both the (4+1):1 and the (2+1):1 hexagonal patterns, or any other repeating or non-repeating, static or time-varying mathematical distribution pattern of information points. In particular, the STS sampling techniques may be applied to cases other than a flat, two-dimensional array of data points. For some mathematical or computational purposes, video image data can be considered a three-dimensional array of points. For example, with time as the third dimension (after horizontal and vertical), the various frames of a sequence may be "stacked up" in the third dimension. Or, several different image frames, or components (for example the Red, Green and Blue components of a color image) may be stacked into a 3-D "block" of data. Also, for application to audio signals the data structure may be a one-dimensional array, or several one dimensional streams for multi-channel sound.

Figure 17:
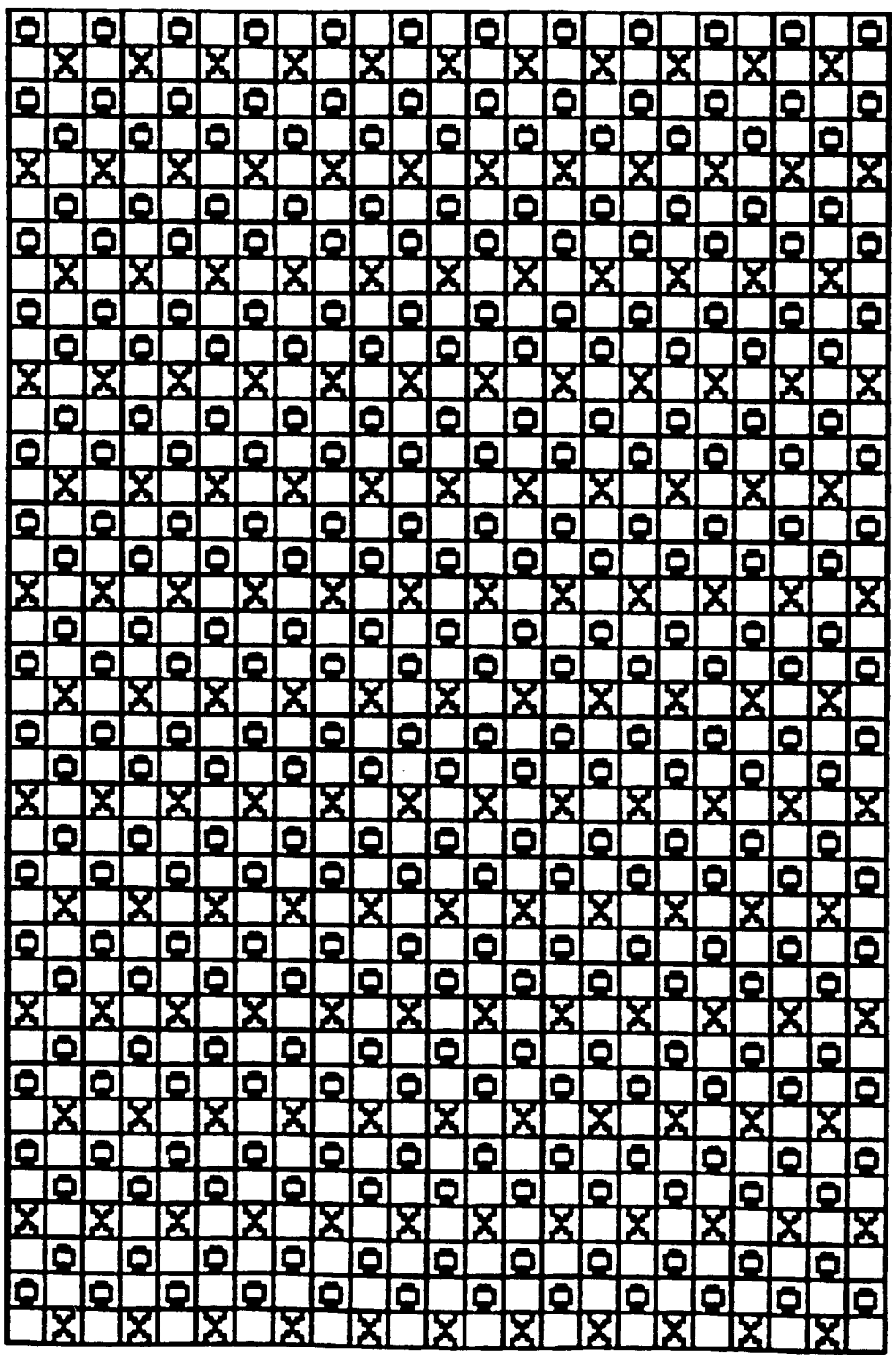
FIG. 17 shows the (2+1):1—two plus one to one—hexagonal data point selection pattern where the active points are ½ of all possible points.
Figure 18:
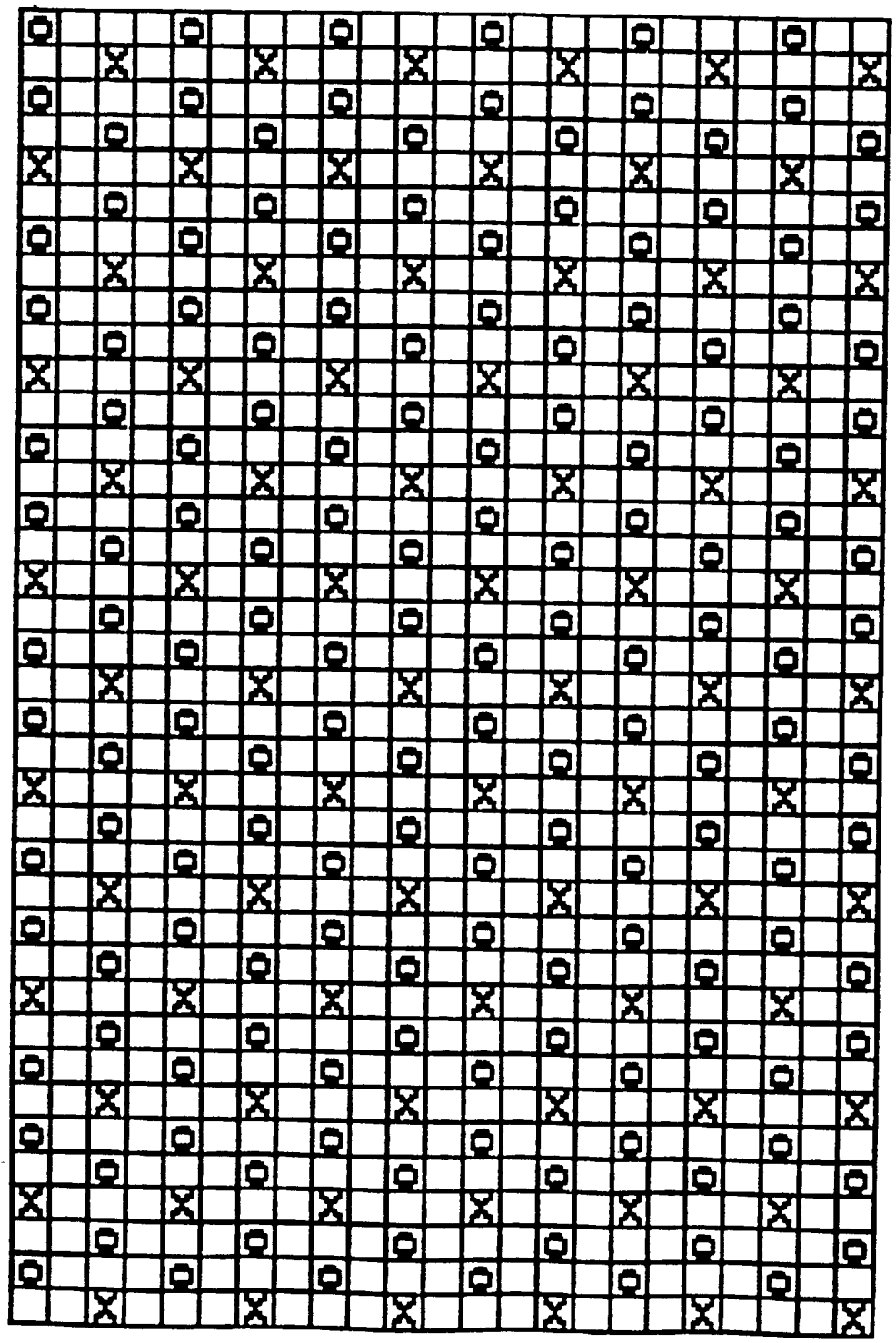
FIG. 18 shows the pattern of FIG. 17 spread out to make the ratio of active to total points 1:4.
Figure 19:
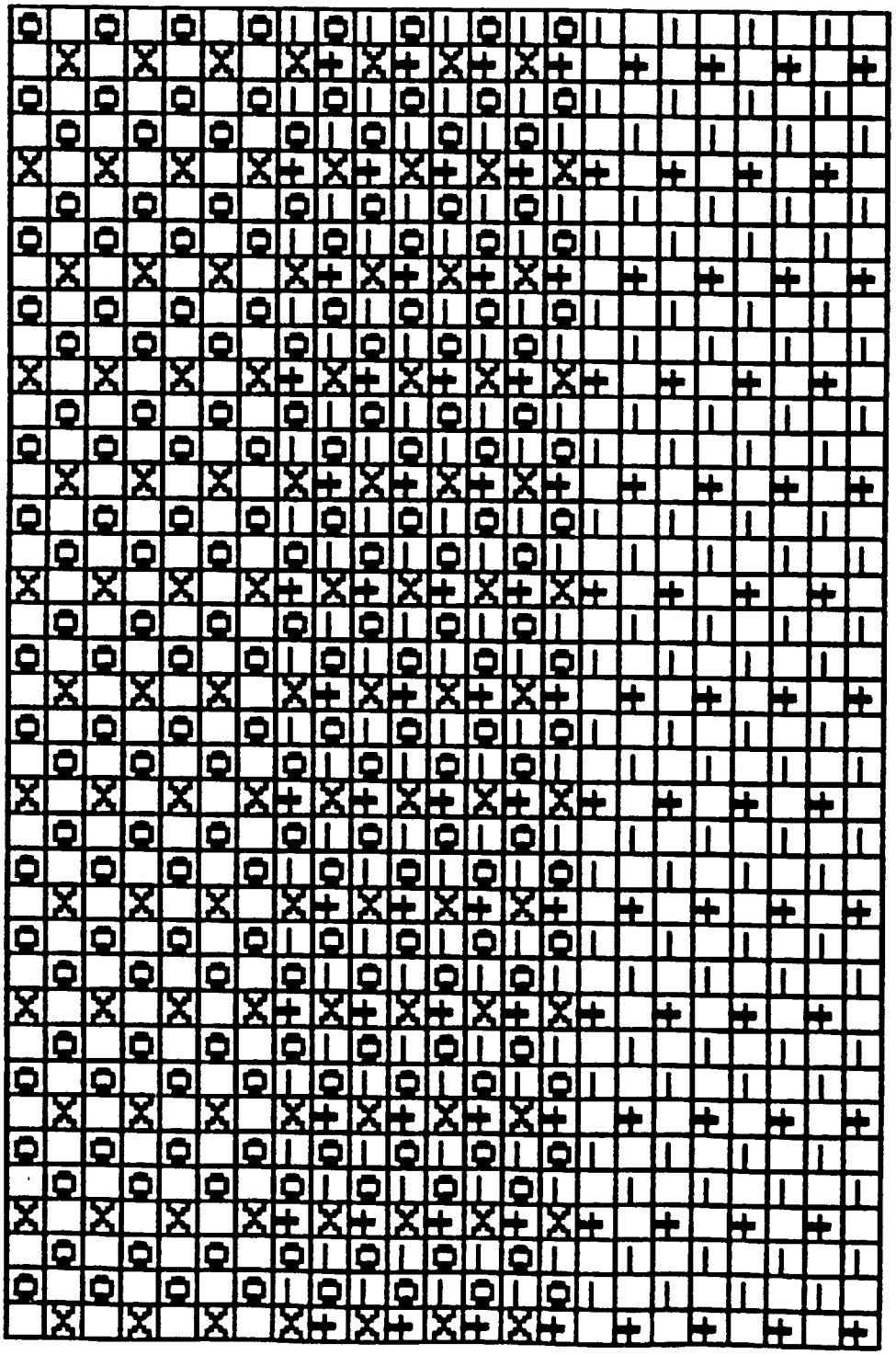
FIG. 19 shows two (2+1):1 patterns interleaved.

The (2+1):1 hexagonal pattern has been developed on a rectilinear grid to facilitate easy adaption to raster patterns. From the universe of possible points, the active points ((x)- & (o)-type) are one half, as depicted in FIG. 17. In order to make the hexagonal cells more regular, the pattern may be spread out, as depicted in FIG. 18, so that the ratio of active to total points is 1:4. Of the active points, the ratio of (o)-points to (x)-points is 2:1—thus (2+1):1 ((o)-type+(x)-type):(x)-type. The scheme provides a 3:1 data reduction when considering the active points only, and a 6:1 or 12:1 when considering all possible data points in FIGS. 17 and 18 respectively. FIG. 19 shows how two such patterns may be interleaved; one is shown with (x)s and (o)s, the other with (+)s and (−)s, for the (x)-points and (o)-points respectively.

Figure 20:
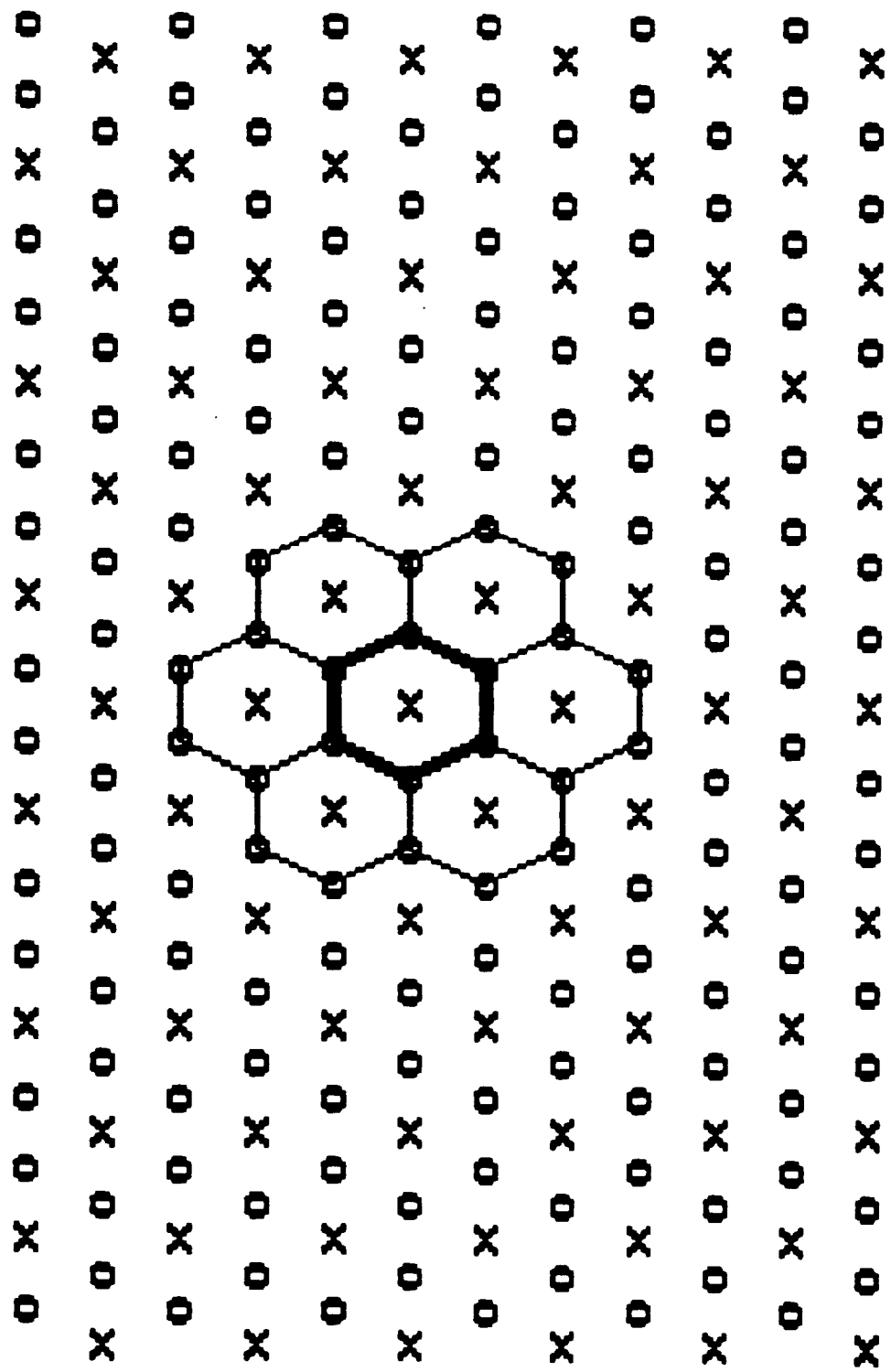
FIG. 20 shows the basic repeat cell of the (2+1):1 hexagonal data point selection pattern, denoted by a heavy line.

FIG. 20 shows the basic repeat cell of the (2+1):1 hexagonal pattern, denoted by the heavy line, a hexagon of six (o)-points surrounding a single (x)-point. This cell shares each adjacent pair of (o)-points with another cell, shown by lighter lines. Therefore, each (o)-point is shared by three cells.

Figure 21:
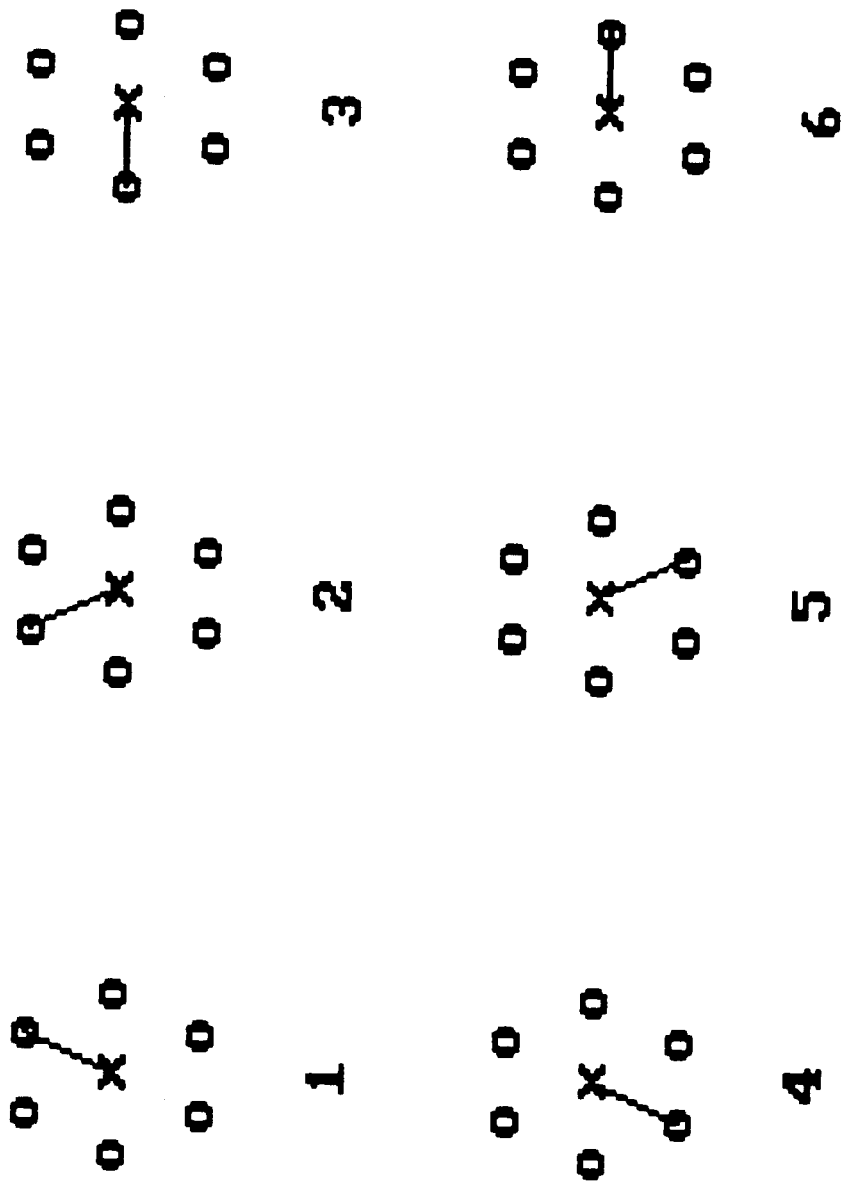
FIG. 21 shows six possible ways of combining data from the (x)-point with one (o)-point for transmission, indicated by a connecting line, with the (2+1):1 pattern.

FIG. 21 shows the six possible ways of combining data from the (x)-point with one (o)-point for transmission, indicated by a connecting line. These may be used in a rotating cycle as indicated, in any other repeating or ordered manner, or pseudo-randomly.

Figure 22:
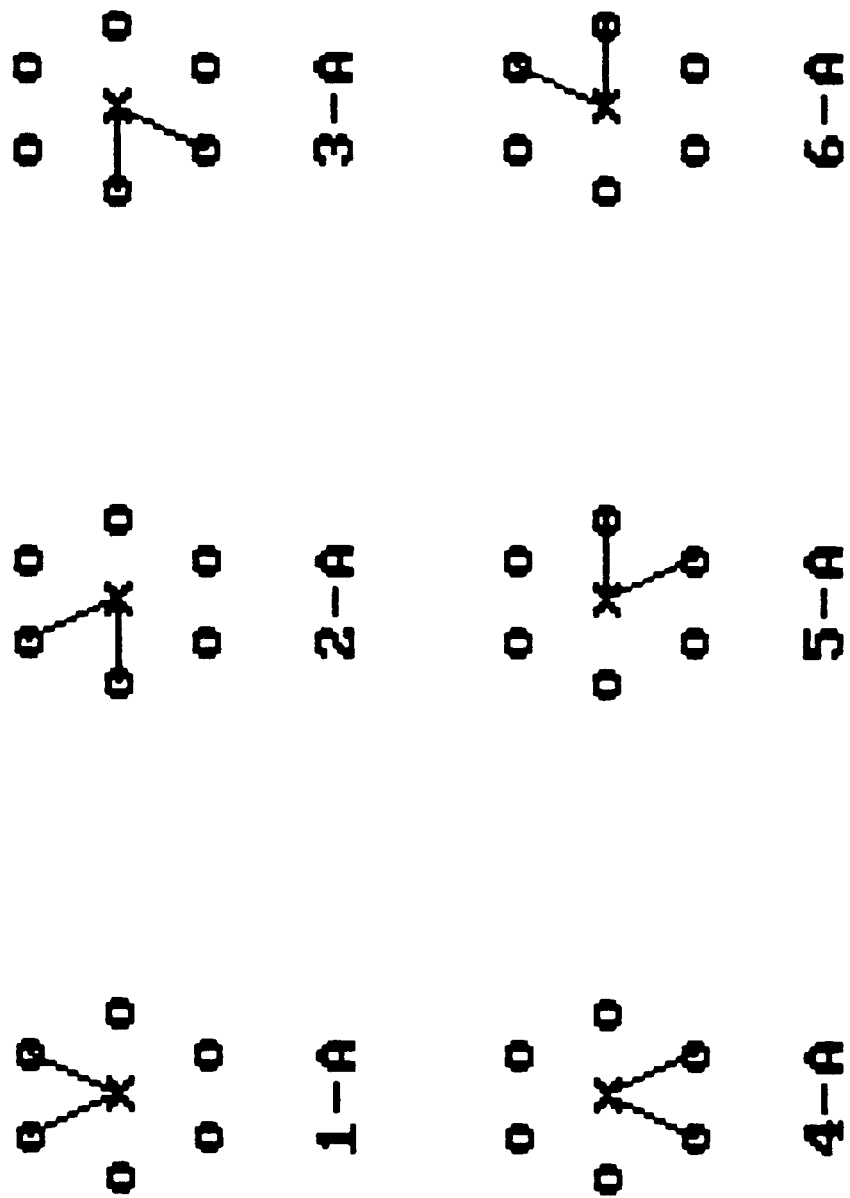
FIG. 22 shows six ways that an (x)-point may be combined with two adjacent (o)-points, with the (2+1):1 pattern.
Figure 23:
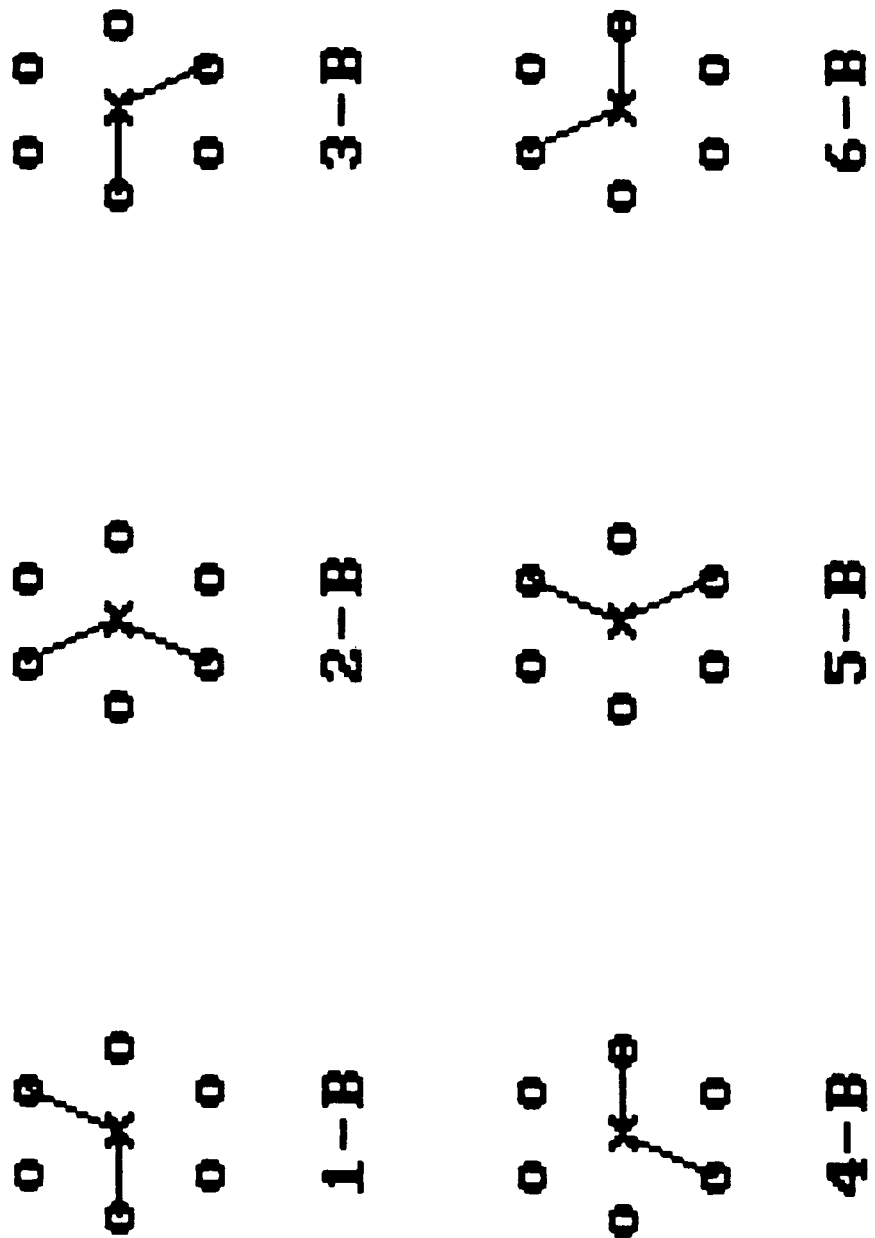
FIG. 23 shows six ways that an (x)-point may be combined with two (o)-points separated by one, with the (2+1):1 pattern.

FIGS. 22 and 23 each show six ways that an (x)-point may be combined with two (o)-points: adjacent points in FIG. 22; points separated by one in FIG. 23. FIG. 24 shows three ways one (x)-point may be combined with two opposing (o)-points. There are only three rotations because of symmetry.

Figure 25:
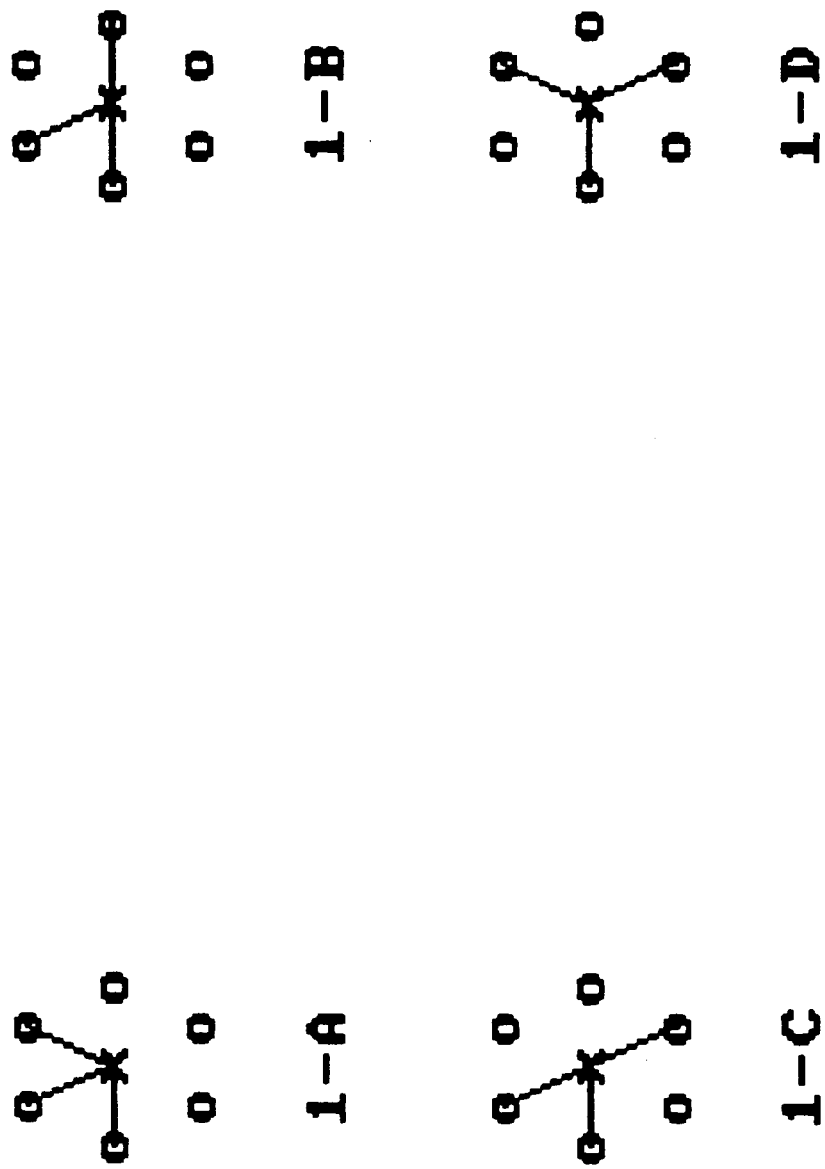
FIG. 25 shows the starting positions (without showing the possible rotations) for the ways three (o)-points may be combined with an (x)-point, with the (2+1):1 pattern.

FIG. 25 shows the starting positions (without showing the possible rotations) for the ways three (o)-points may be combined with an (x)-point. There are six rotations for A, B & C, but only two for D, due to symmetry.

Patterns can be developed for 4 or 5 (o)-points, or even for all six (o)-points so long as weighting factors were varied to provide a varying STS.

Figure 26:
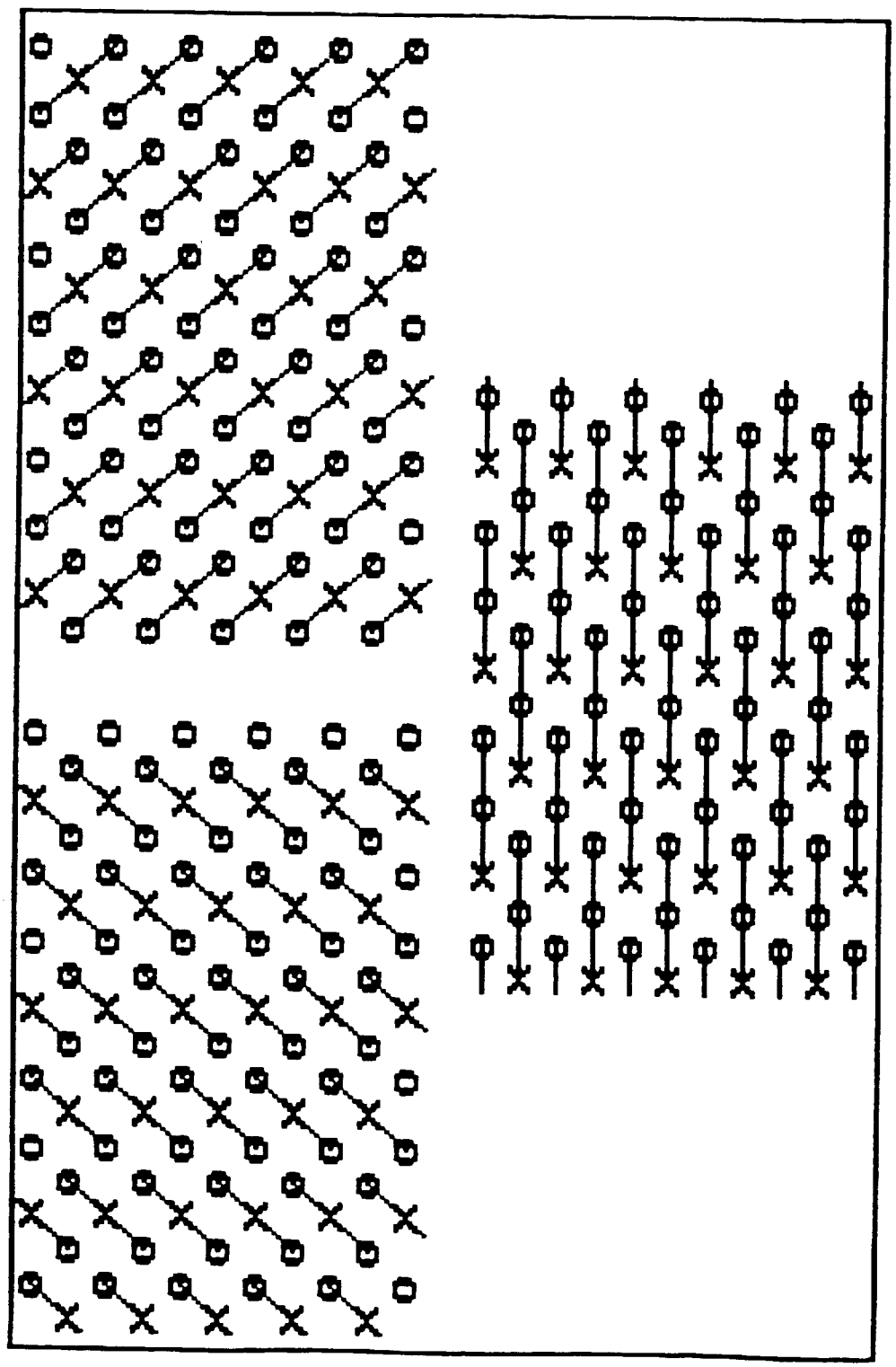
FIG. 26 shows the data point selection patterns of FIG. 24 uniformly distributed over a frame for a three phase cycle.
Figure 27:
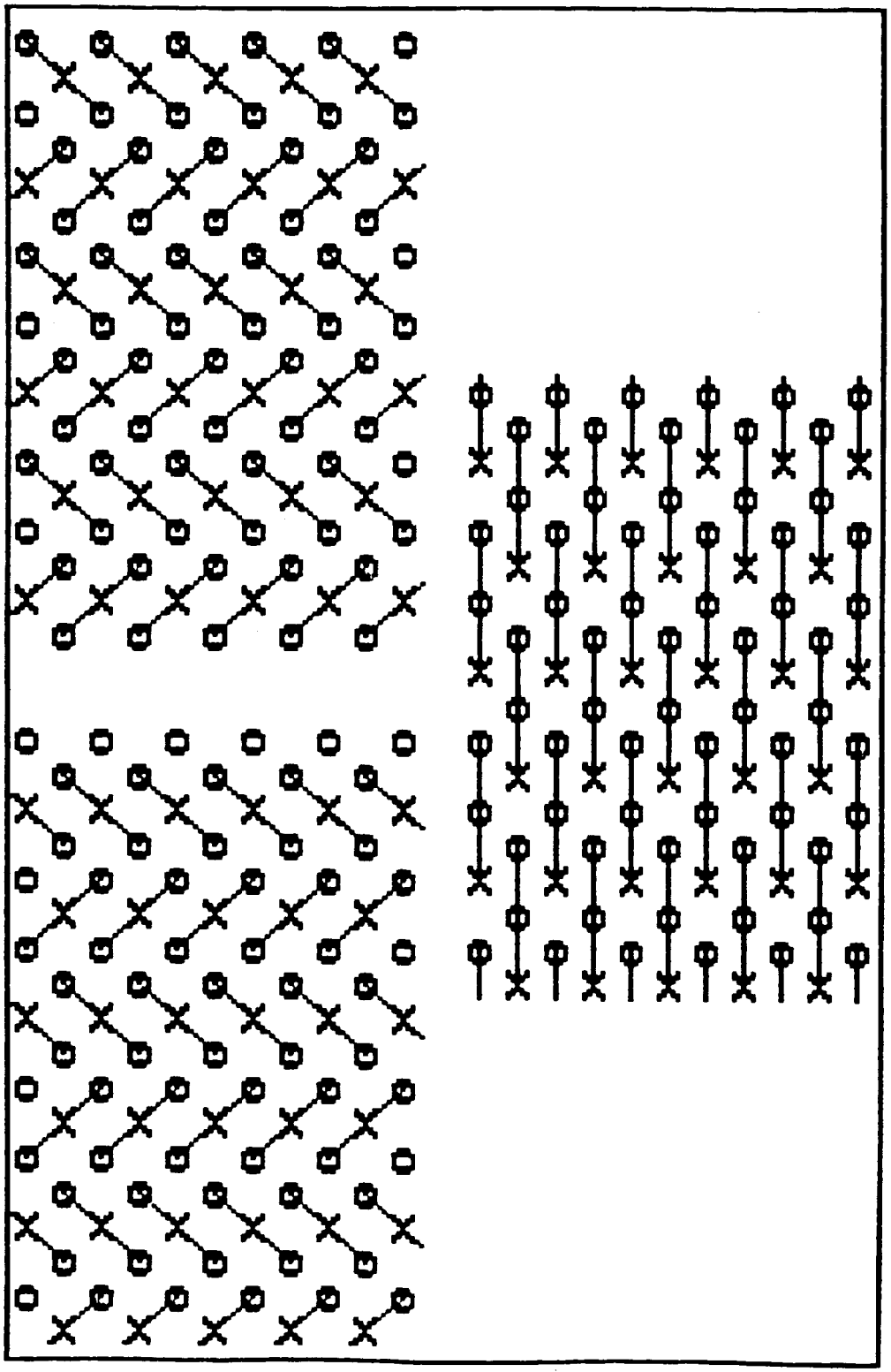
FIG. 27 shows the data point selection patterns of FIG. 24 distributed with varying phase over a frame for a three phase cycle.

FIG. 26 shows the sampling patterns of FIG. 24 uniformly distributed over a frame for a three phase cycle. All (o)-points are used once in each frame. Combined with the two phase cycle of odd and even video fields, this would result in a combined repeat of six. It is impossible to order these three patterns in a cycle without creating a spin in one direction. The great regularity and short repeat inherent in this pattern may produce a visible "rotation" texture. The phase can be varied over the frame in order to combat this, for example, as shown in FIG. 27. In other differential phase patterns some points might be used multiply, and others not at all, in some phases. As an alternative, the interleaved pattern from FIG. 19 may be used. One pattern would be "spun" clockwise, the other counter-clockwise. The two would tend to balance each other.

Figure 28:
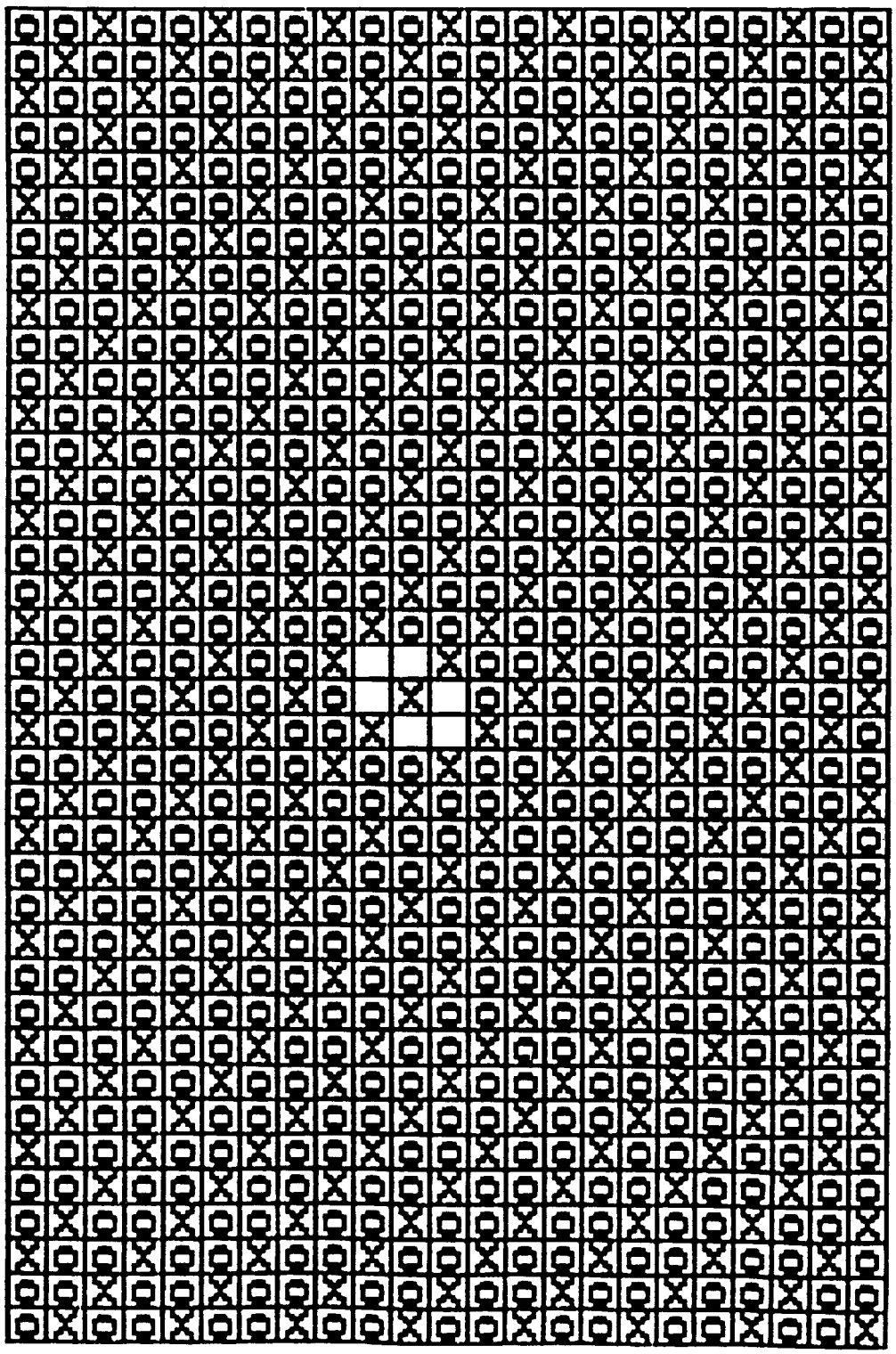
FIG. 28 shows the (2+1):1 pattern skewed to be imposed on a rectilinear grid without any non-active points.

Lastly, the patterns can be turned, by 90 degrees, 120 degrees or any convenient amount, to facilitate implementation. Also, any four closest neighboring, active points, which form a rhombus, can be skewed to a square configuration. The entire pattern will be equivalently skewed. This configuration can be imposed on a rectilinear grid without any non-active points. It may be used to facilitate adaption to some rectilinear raster scan systems. In FIG. 28, the (o)-points of one hexagonal cell have been blanked out to make it easier to see how the pattern has been skewed.

Further Details of Implementation

Figure 29:
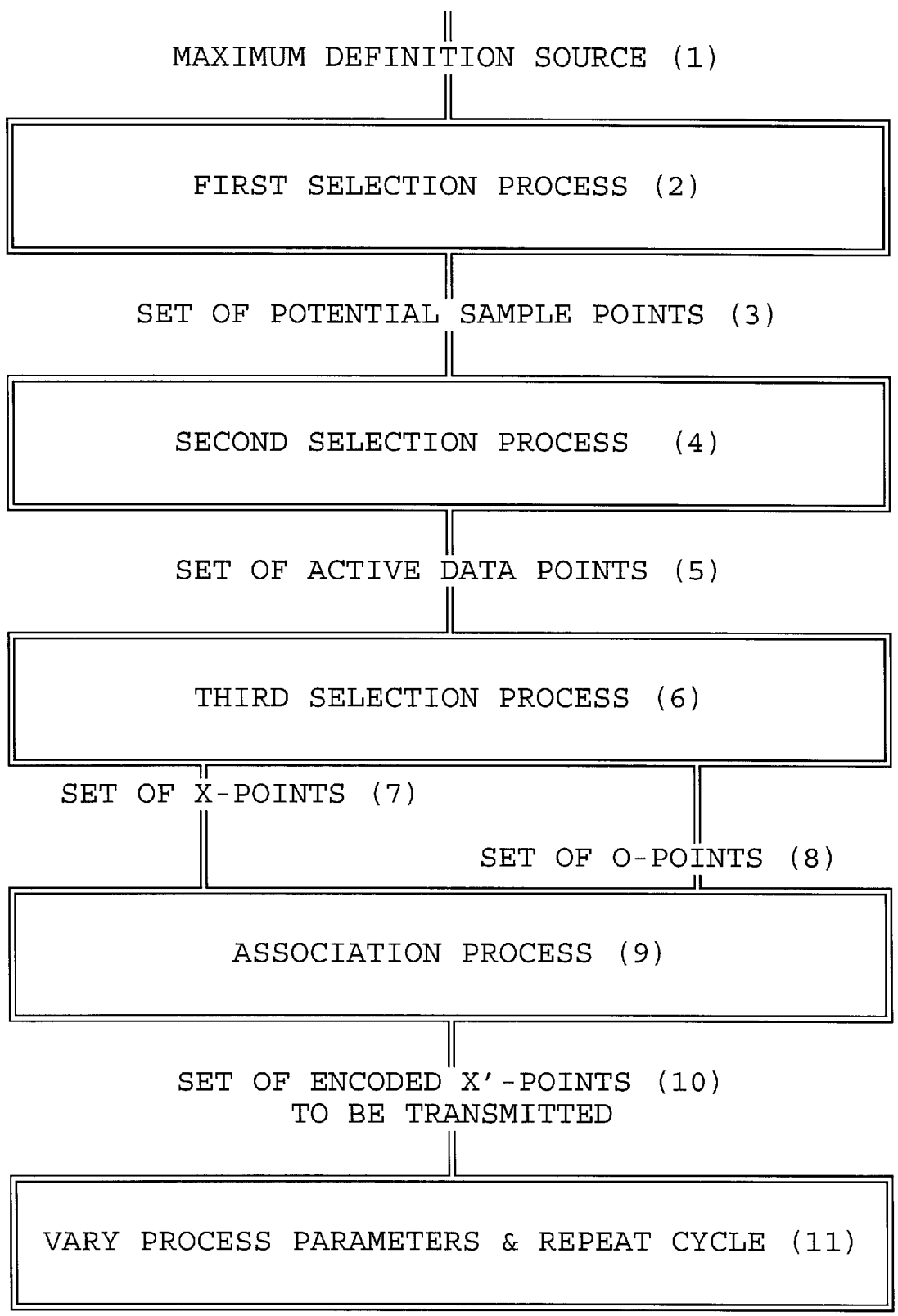
FIG. 29 is a flow chart of the general process of the instant invention.

FIG. 29 is a flow chart of the generalized process of the instant invention, as described herein. Process steps are represented in the figure by boxes, information set inputs to and outputs from the processes are represented by lines.

The initial input to the process is the maximum definition source (1) which may be an HDTV signal, an audio signal, a motion picture film, a "real scene" which is to be scanned by a television camera, or a computer database from which a synthetic television signal will be generated.

A given frame of source information (e.g., an HDTV field; a "chunk", say one second, of audio signal; a film frame; or a real or synthetic television frame) may be sampled at an arbitrarily high definition or resolution. The first process step (2) is to select, from all possible samples which might be derived from the source signal, a subset of points which may potentially be sampled (3).

The second process step (4) is to select from the potential sample points (3) a subset of active points (5) which will actually be sampled.

The third process step (6) is to select from the active points (5) two further subsets: the points for which data will be transmitted, the x-points (7); and the points which will be sampled but for which data will not be separately transmitted, the o-points (8).

The fourth process step (9) is to create mathematical associations between the x-points and o-points. This results in the encoded values that will be transmitted for the x-points (denoted here as x'-points—read x-prime-points) (10) which will each, in general, be a combination of the sample value of an x-point and the sample values of some subset of the o-points.

The last process step (11) is to vary the parameters of the four previous processes in a non-trivial manner—the variable STS—as described herein; and then to repeat the cycle with the next frame of source information.

Figure 30:
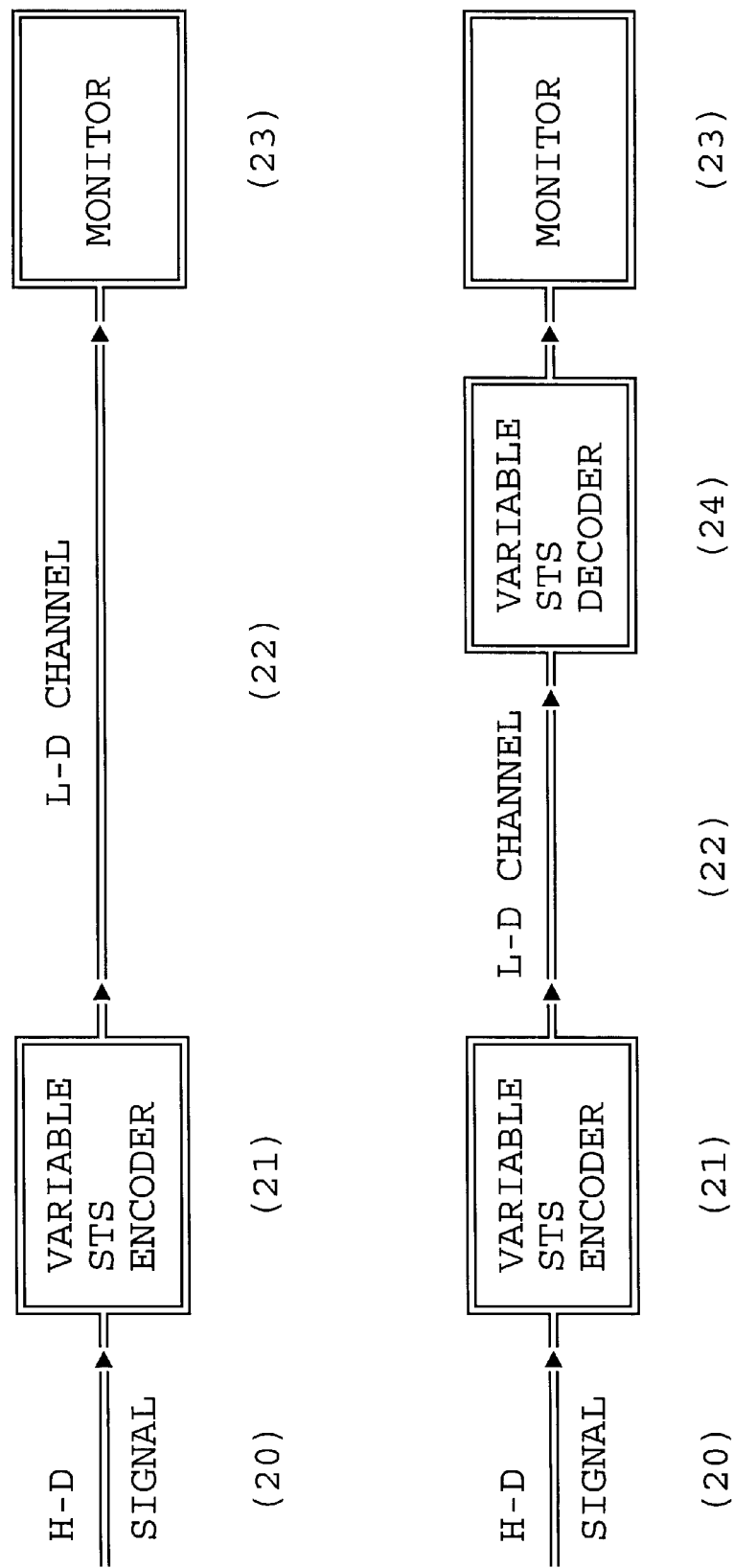
FIG. 30 depicts two main embodiments of the variable STS scheme.

FIG. 30 depicts two main ways that the variable STS scheme may be implemented. In the upper system diagram, high-definition signal (20) is encoded by the variable STS encoder of the instant invention (21), transmitted over a low-definition channel (22) and then displayed directly on a television monitor (23) which may be of either low- or high-definition.

The lower system diagram, is identical except that, prior to display on the monitor, the encoded signal is decoded by a companion variable STS decoder (24) which may, in practice, be incorporated into the monitor (23).

Figure 31:
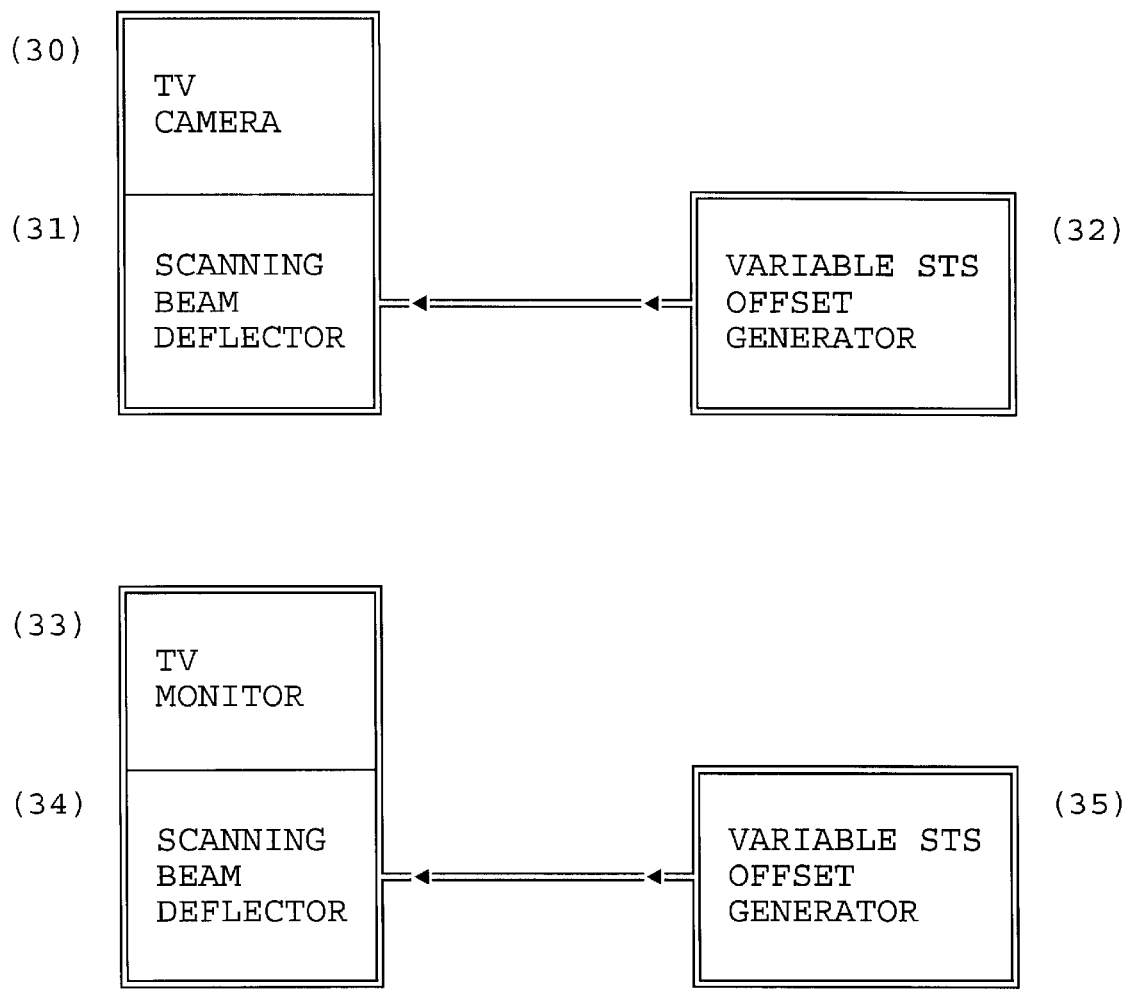
FIG. 31 consists of two system diagrams depicting a way to implement a companion pair of a variable STS encoder (above) and decoder (below).

FIG. 31 consists of two system diagrams of a way to implement a companion pair of a variable STS encoder (above) and decoder (below).

The encoder consists of a standard television camera (30) which is not shown in detail except for the subsystem (31) which controls the deflection of the scanning beam across the imaging element. The non-standard element which implements the instant invention is the variable STS offset generator (32) which generates a "wobble" or perturbation signal which in turn modulates the standard repeated raster pattern of the deflection of the scanning beam.

Similarly, the decoder consists of a standard television monitor (40) which is not shown in detail except for the subsystem (41) which controls the deflection of the scanning beam across the picture tube. The non-standard element which implements the instant invention is the variable STS offset generator (42) which generates a "wobble" signal which in turn modulates the standard repeated raster pattern of the deflection of the scanning beam. The offset may be applied uniformly to an entire image frame or may vary over the image frame. The wobble of the monitor raster would be synchronized with the wobble of the camera by information imbedded in the transmitted signal and/or pattern information incorporated into the variable STS offset generator.

Figure 32:
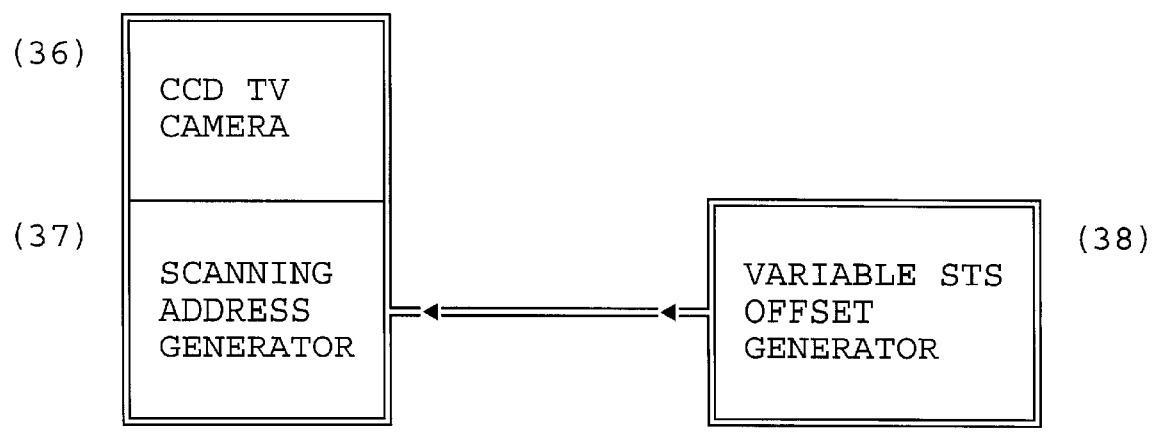
FIG. 32 consists of a system diagram depicting a variable STS encoder employing a video camera with a digital CCD imaging element.

FIG. 32 consists of a system diagram of the equivalent encoder employing a newer type standard video camera with a digital CCD imaging element. The encoder consists of a standard CCD television camera (36) which is not shown in detail except for the subsystem (37) which controls the generation of the addressing signals used to access the pixels of the CCD imaging element. The non-standard element which implements the instant invention is the variable STS offset generator (38) which generates a "wobble" signal which in turn modulates the standard repeated raster pattern of the addressing of the imaging element.

Figure 33:
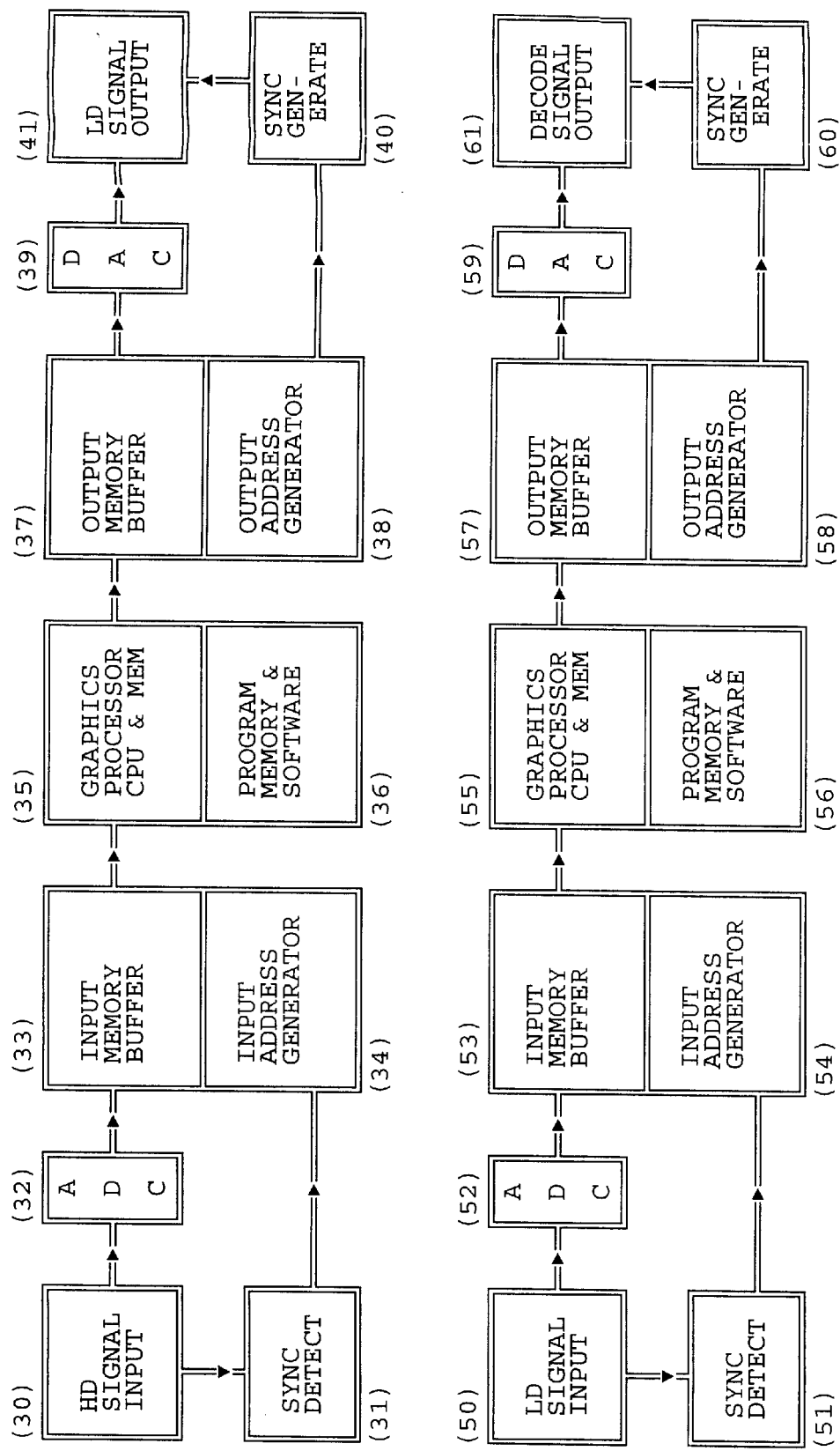
FIG. 33 consists of two block system diagrams depicting another way to implement a companion pair of a variable STS encoder (above) and decoder (below).

FIG. 33 consists of two block system diagrams of a more complex way to implement a companion pair of a variable STS encoder (above) and decoder (below).

The encoder consists of hardware elements that, taken together, constitute a standard type of computer display device known as a Frame Store or Frame Buffer. For example, elements 31 through 34 would constitute a scanning or digitizing frame buffer. If we extended the list to elements 31 through 36, it would be an "intelligent" scanning frame buffer. Similarly, elements 37 through 40, or 35 through 40, would constitute a display frame buffer or "intelligent" display frame buffer. Elements 31 through 40 would constitute an "intelligent" frame buffer capable of both digitizing and displaying, however, in that case elements 33 and 37 might be a combined into a single memory buffer.[25]

Similar comments can be made about the hardware elements of the decoder 51 through 60.

Also note that there are four pairs of elements (33/34, 37/38, 53/54 & 57/58) each consisting of memory buffer and an address generator. For each pair, the two halves are interconnected and an input/output line communication with one element may be considered to communicate with both. Similarly the computer and memory elements 35/36 and 55/56 are also interrelated.

Referring now to the encoder (above) the high-definition signal input (30) may consist of an HDTV camera, computer generated graphic or any other high-definition information source. If the signal is an analog signal it is converted to digital form by the analog-to-digital converter (ADC) element (32) otherwise, if the signal originates in digital form, this element may be removed. (Similar statements about the optionality of the other converter elements (39, 52 & 59) are implied by this and will not be repeated.)

The digital HD signal is then input to the input memory buffer (33). The choice of the addresses at which the individual signal samples are stored is made by the input address generator (34) which is synchronized by the sync detector (31) which extracts timing information from the HD signal input (30).

Depending upon the complexity of the particular encoding scheme to be implemented and the computational speed of the graphics processor CPU (35), the size of the input memory buffer (33) may range from a partial "window" of an input frame (as is common in the design of digital television TBCs—time base correctors), to an entire frame store, to storage for several frames as is described in the section entitled "FRAME STORE TECHNIQUES", above. It may even be reduced to size zero if the CPU (35) is very fast and/or the encoding scheme is very simple. (The same statements may be applied to the other memory buffers (37, 53 & 57) where appropriate.)

The graphics processor CPU (35) is a specialized, high-speed micro processor of which many now exist (for example, the Texas Instruments TI34010)[26] and which may also be called a DSP for digital signal processor. It generally will also have an amount of computational or "scratch pad" memory, or registers associated with it, as indicated by "& MEM" in (35). As is common practice in high speed computing, if additional speed or computing power is required, several CPUs may be employed to operate in tandem as a composite CPU (for example, the systems made by Broadcast Television Systems or Pixar)[27]. The graphics processor (35) also has associated with it additional program memory to hold software (36).

Working from data input from the input memory buffer (33) the graphics processor (35/36) computes the encoded x'-point values, according to the variable STS encoding schemes or other techniques described herein by the accompanying text and diagrams, and places the results in the output memory buffer (37)[28]

For some implementations either memory buffer (33 or 37 in the encoder, 53 or 57 in the decoder) may be absent, or both functions may be implemented by a common memory buffer. Also, the scheme described in the section entitled "FRAME STORE TECHNIQUES", above, which employs two separate frame stores may also be implemented as shown by buffers 33 and 37, or 53 and 57.

The data placed in the output memory buffer (37) by the graphics processor (35/36) may then be scanned out, under control of the output address generator (38), converted by the digital-to-analog converter or DAC (39), and output as a low-definition encoded data signal (41). The output signal (41) will also contain synchronization information, generated by the sync generator (40) based on timing information from the output address generator (38).

The combined, data and synchronization, encoded low-definition signal output (41) is then available for transmission, for recording on videotape, videodisc or other media, or for direct undecoded display in certain instances.

The operation of the variable STS decoder (below, 50–61) is virtually identical to that of the encoder (above, 30–41) except that: the low-definition signal input (50) is now the encoded low-definition output of the encoder (41) which is available via cable, radio transmission, from a storage medium or any other appropriate means; the graphics processor (55/56) now implements the variable STS decoding and reconstruction schemes or other techniques described herein by the accompanying text and diagrams; and, the output (61) is now a decoded/reconstructed signal which is available for display on a television monitor.

Figure 34:
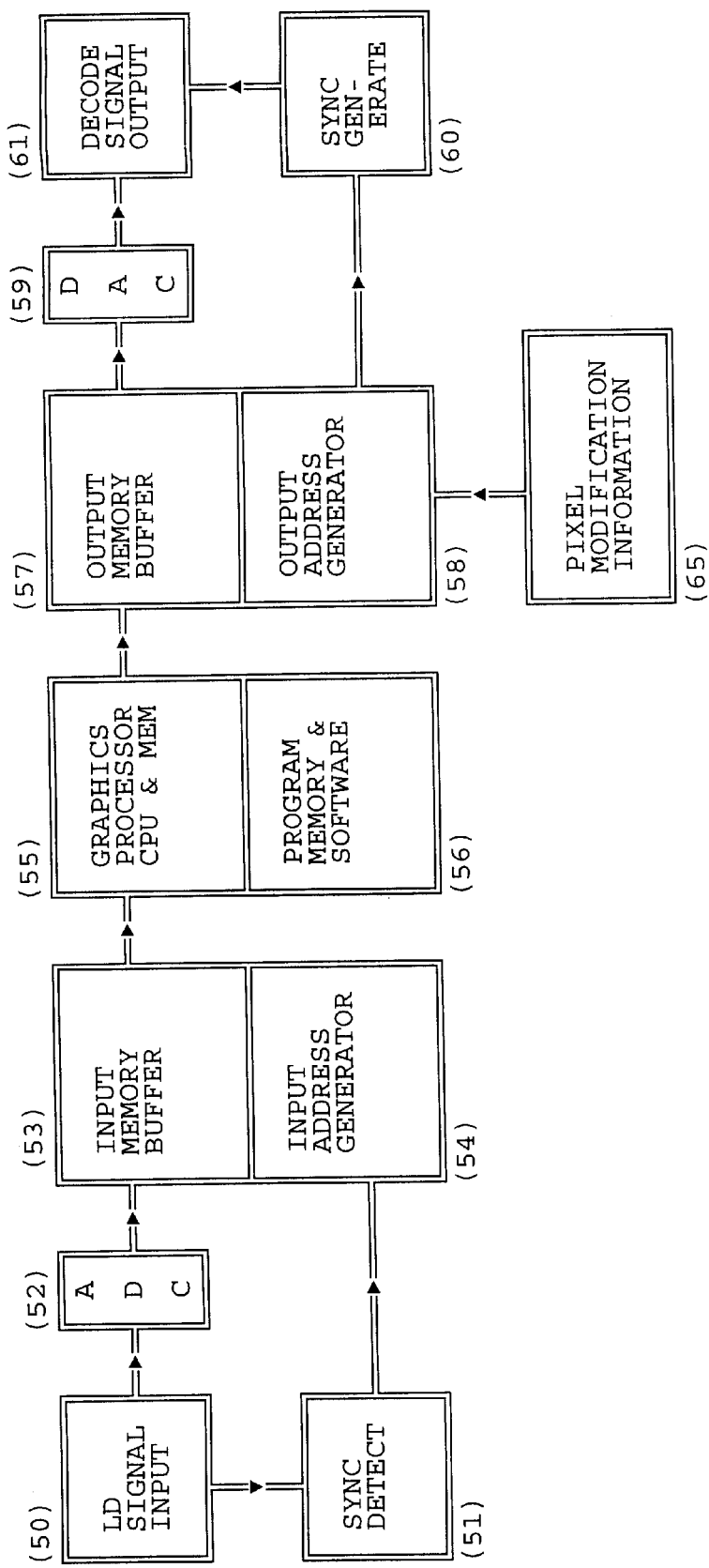
FIG. 34 consists of a block system diagram depicting another way to implement a variable STS decoder, largely identical to FIG. 33 (bottom), with the addition of a pixel modification information element.

Referring now to FIG. 34, a variable STS decoder is shown in block system form that is largely identical to FIG. 33 (bottom), with the addition of pixel modification information element (65). This additional information may be derived from the LD signal input (50) and/or created by graphics processor (55/56); and it may be input to the output address generator (58) from information stored in the input memory buffer (53), information stored in the output memory buffer (57), or information generated or stored in the graphics processor (55/56).

The pixel modification information (65) will be used to modify the scanning of data from output memory buffer (57) as controlled by the output address generator (58) and/or to modify the synchronization signal part generated by the sync generator (60) and which is included in the decoded signal output (61). It will be used to modify geometric information about the display of individual pixels such as the position, size or shape of the pixel as displayed on a television monitor to which the decoded signal output (60) is sent.

FIG. 35 shows one example of a data structure which could be stored for each pixel of the input memory buffer (53) or the output memory buffer (57). For each pixel 8 bits of data would be stored representing any of 256 levels of red intensity (70), 8 bits of data representing one of 256 levels of green intensity (71), 8 bits of data representing one of 256 levels of blue intensity (72), and two bits representing pixel modification information (73). The two bits of pixel modification data would allow for a choice among four possibilities (00, 01, 10, 11); other numbers of bits in (73) would permit other numbers of choices. Two bits might be used to pick a position (upper left, lower left, upper right, lower right) for the pixel within a 2-by-2 pixel cell. It might be used to determine a shape/size for the pixel (1×1, 1×2, 2×1, 2×2). It might be used to modify how long a pixel was to be displayed (not at all, just once, twice, until replaced) for the "accumulation mode" as described herein; the "not at all" option allowing the RGB locations (70, 71 & 72) for that pixel in that data frame to be used for other purposes (for example, additional resolution, area boundary or side strip data, as described elsewhere herein). Or it might be used in other ways, as described herein, to modify the display characteristics of individual pixels in individual frames.

FIG. 36 shows one example of an embodiment of the instant invention described above in the section entitled "FRAME STORE TECHNIQUES". Here, two arrangements of pixels are shown above and below, each employing four different shaped pixels. Two bits of data stored with the content information for each pixel would indicate:00=1×1 cell, 01=1×2 cell, 10=2×1 cell, and 11=2×2 cell. Each arrangement uses the same number of the various types of cells 16 of 00-type, 8 each of 01-type and 10-type, and 4 of 11-type. These, and other patterns may be alternated to implement a variable STS scheme.

Figure 37:
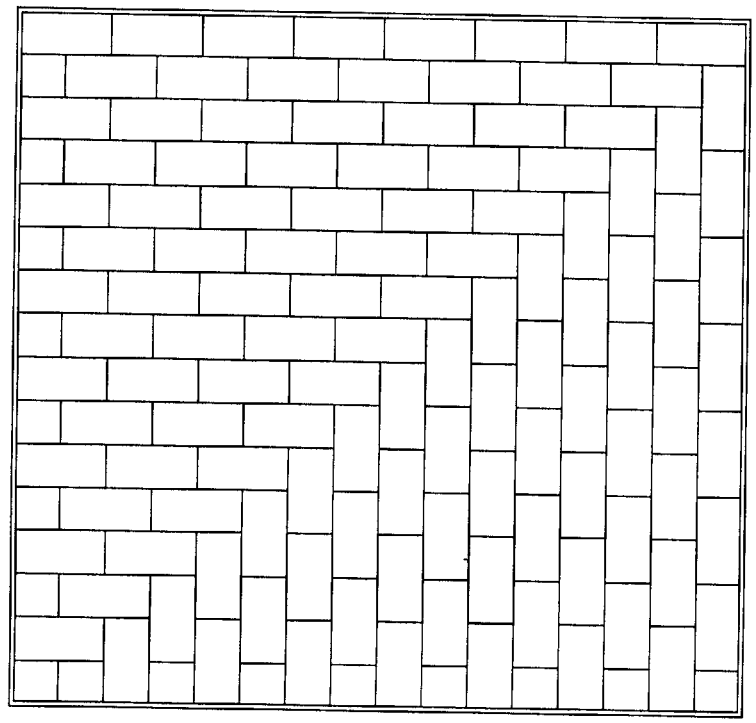
FIG. 37 shows an example of variously shaped picture elements used with imagery having detail roughly along horizontal or vertical lines.

FIG. 37 shows an example of how these variously shaped picture elements may be used to advantage with "imagery with horizontal, vertical or diagonal lines, edges or details" and as described above in the section entitled "VARIABLE ALGORITHM OVER IMAGE FRAME". Here a pattern is shown which exhibits better vertical than horizontal resolution in the upper-left-diagonal half, and better horizontal than vertical resolution in the lower-right-diagonal half. Although this pattern is extremely simple, it is meant to be illustrative only. In practice, such patterns may be varied in subtle and complex ways, over time, to implement some of the variable STS schemes as described herein.

Figure 38:
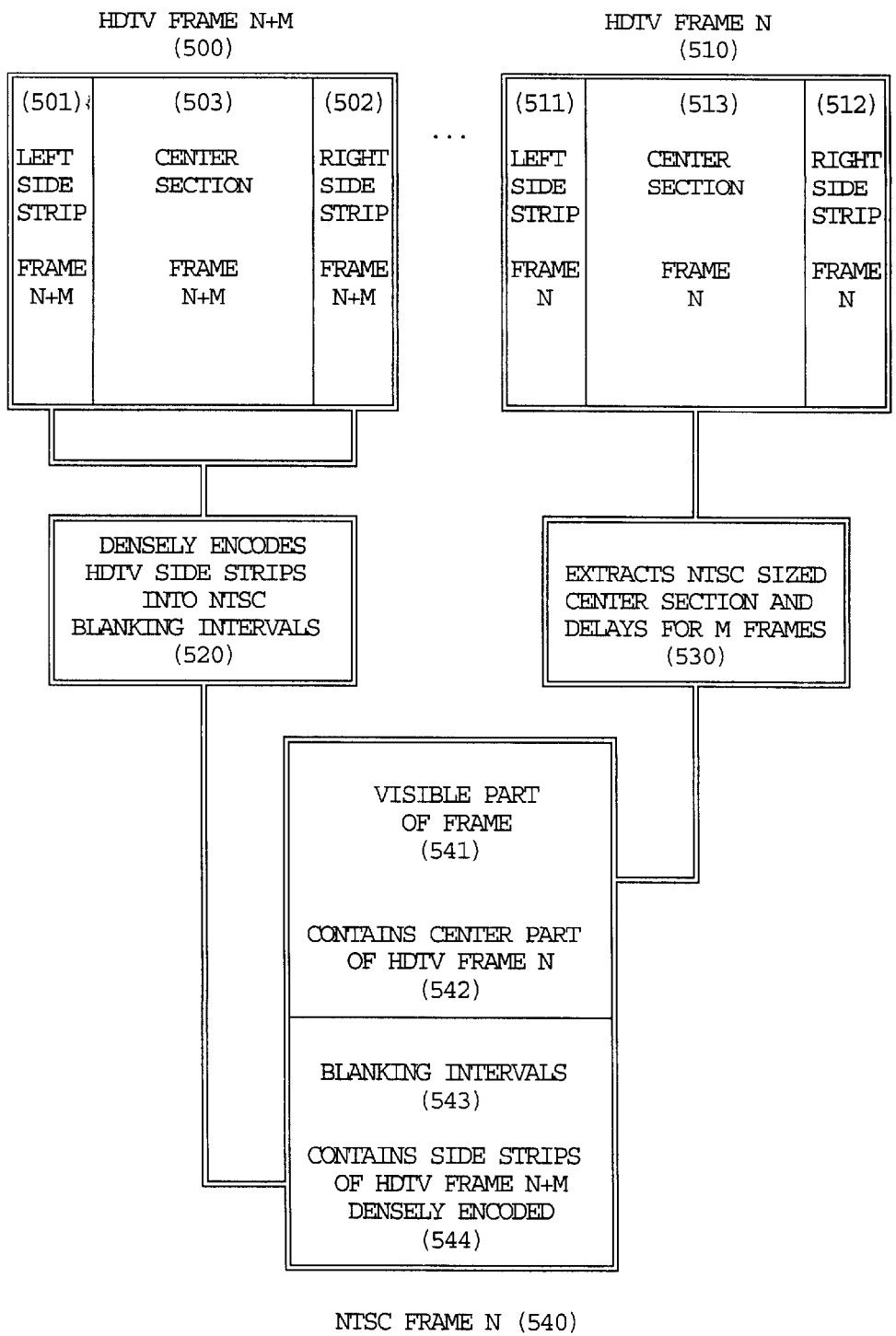
FIG. 38 depicts the encoding of an HDTV signal with side strips into an NTSC signal.

FIG. 38 depicts the encoding process and device described above in the section entitled "PRACTICAL APPLICATIONS", above, for use with an HDTV signal with "side strips". Shown are two HDTV frames (which may be the same frame if M=0) separated by M frame times. The center portion of HDTV frame N (roughly corresponding to an NTSC 4/3 aspect ratio frame) is extracted and stored or delayed for M frames. The "side strips" of subsequent HDTV frame N+M are encoded and inserted into the blanking intervals of the same NTSC frame into which the earlier center section of N is now also inserted to create an NTSC frame containing the "center portion" of HDTV frame N and the encoded "side strips" of HDTV frame N+M.

Figure 39:
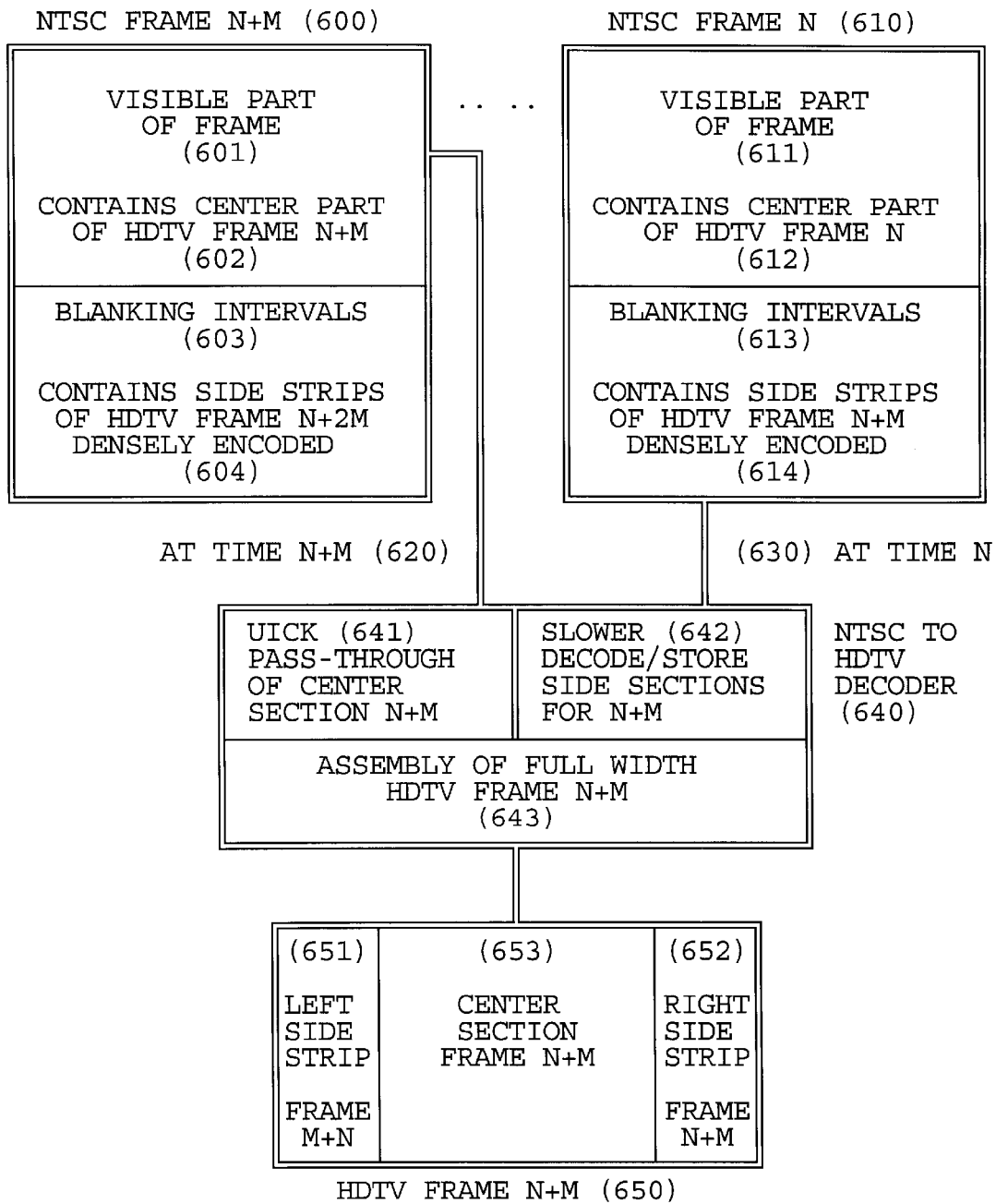
FIG. 39 depicts the decoding of an HDTV signal with side strips from an NTSC signal.

FIG. 39 shows the complementary process/device. Two frames separated by M frame times (which may be the same frame if M=0) are depicted. NTSC frame N contains the "center portion" of HDTV frame N and encoded in its blanking intervals the "side strips" of later (by M frame times) frame N+M. Similarly, NTSC frame N+M contains the "center portion" of HDTV frame N+M with the encoded "side strips" of HDTV frame N+2M. At time N the encoded information containing the "side strips" of HDTV frame N+M (contained in the blanking intervals of NTSC frame N) is directed to a "slow" decoder (which may take up to M frame times to decode this information back into the visual information representing the HDTV "side strips") and storage unit. M frame times later the standard NTSC image of frame N+M which contains the center section of HDTV frame N+M, is routed by the "quick pass-through" section to a unit which assembles that information with the delayed and stored "side strip" information and outputs a complete HDTV frame N+M at time N+M.

FIG. 40 depicts how the "variable STS" encoding principle could be applied to audio signals as indicated above. Since a standard audio signal is one-dimensional (with respect to time only) the spacial/temporal variability is pretty much limited to temporal. FIG. 40-A shows the standard method for sampling audio—samples uniformly spread in time—such as employed on a CD audio disc. FIG. 40-B shows how this scheme may be varied by sampling at specifically "random" times, although, on the average, at the same density of samples per unit time (although this is not a requirement). FIG. 40-C shows how different variable STS sampling patterns may be applied to each channel of a stereo audio signal.

Figure 41:
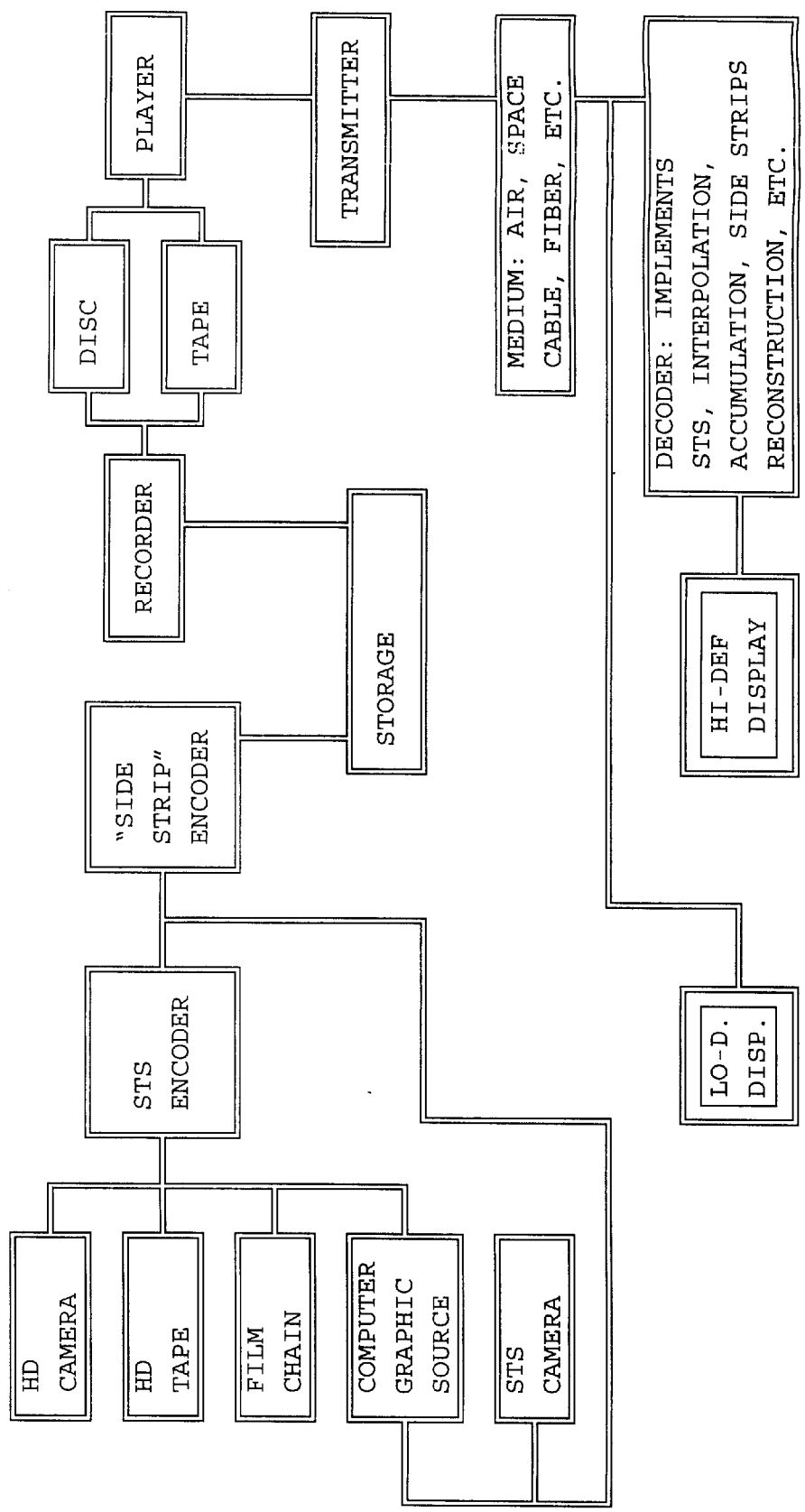
FIG. 41 depicts the myriad of optional communication devices that may be inserted between an encoder and decoder along a communications chain.

FIG. 41 depicts the myriad of optional communication devices that may be inserted between an encoder and decoder along a communications chain.

Figure 42:
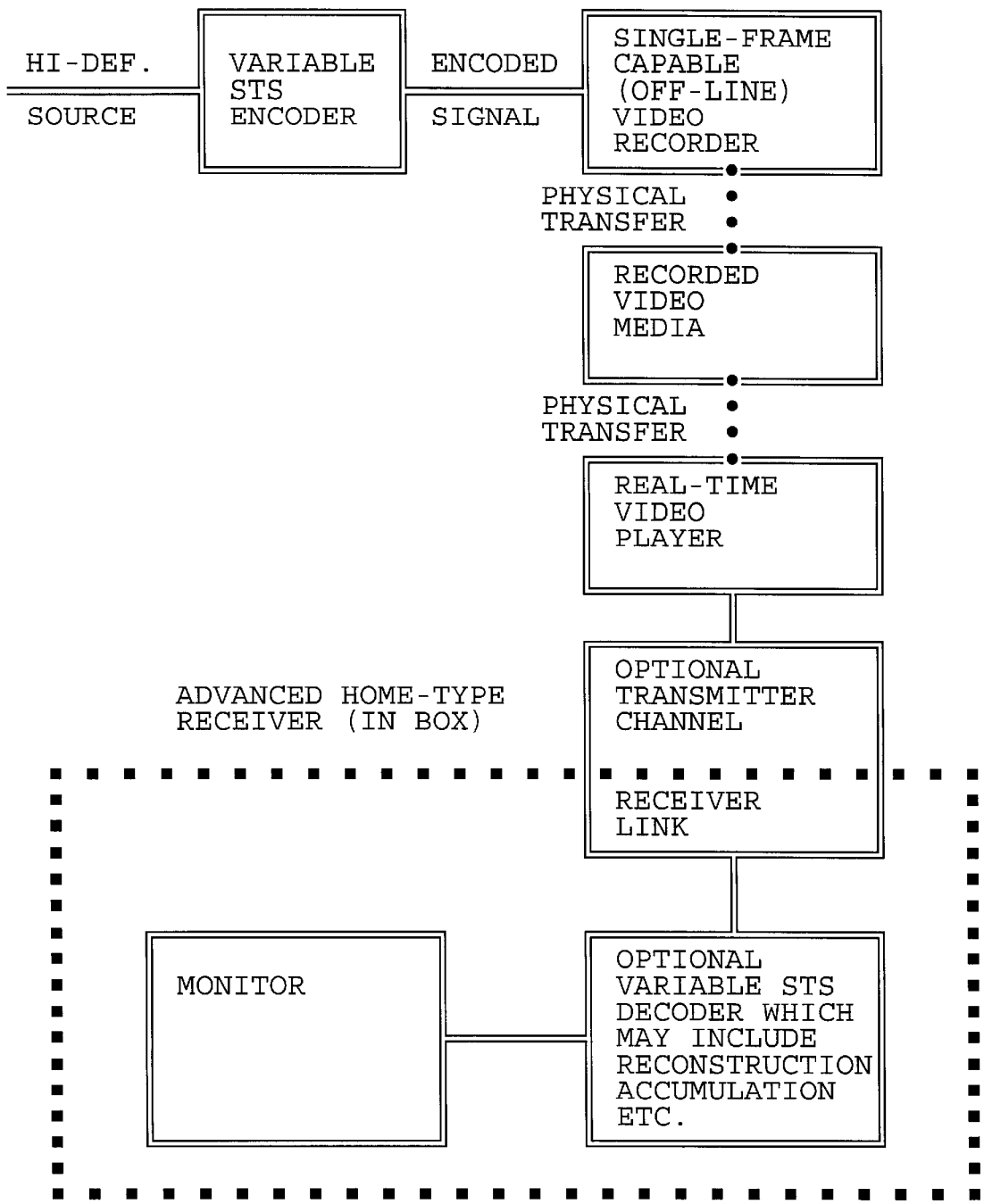
FIG. 42 depicts an off-line recording embodiment.

FIG. 42 depicts the "off-line recording" process described above. The dotted box in FIG. 42 indicates which system elements one might expect to find combined in a typical "advanced television receiver" which are currently available at least in laboratory settings.

FIG. 43 depicts a typical "shotgun" pattern such as described, above, in the section entitled "ADDING COMPLEXITY AND VARIATION". Four such patterns, which each fit within a 6×6 rectangle, are depicted which might be alternated in practice. These are just examples. Each pattern has the property that the entire raster may be tiled with the pattern as depicted in the lower illustration. With respect to a 6×6 box, the 0s represent the basic pattern in "frame 1" without any offset. The 1s represent the pattern offset 3 boxes up, the 2s 3 boxes down, the 3s to the left, the 4s to the right, the 5s up and left, the 6s up and right, the 7s down and left and, finally, the 8s three boxes to the right and down. Note that the basic 6×6 rectangle is completely covered with no overlapping pixels. Each of these "sprays" now represents a arbitrarily related set of points (rather than a geometrically coherent set of points, such as a square or an M×N rectangle) which may, for example, be thought of as o-points. The combined, and possibly weighted, values of these points would then be transmitted as an x-point value, whose location might be one of the points within the "spray" or at some other location on the raster.

Figure 44:
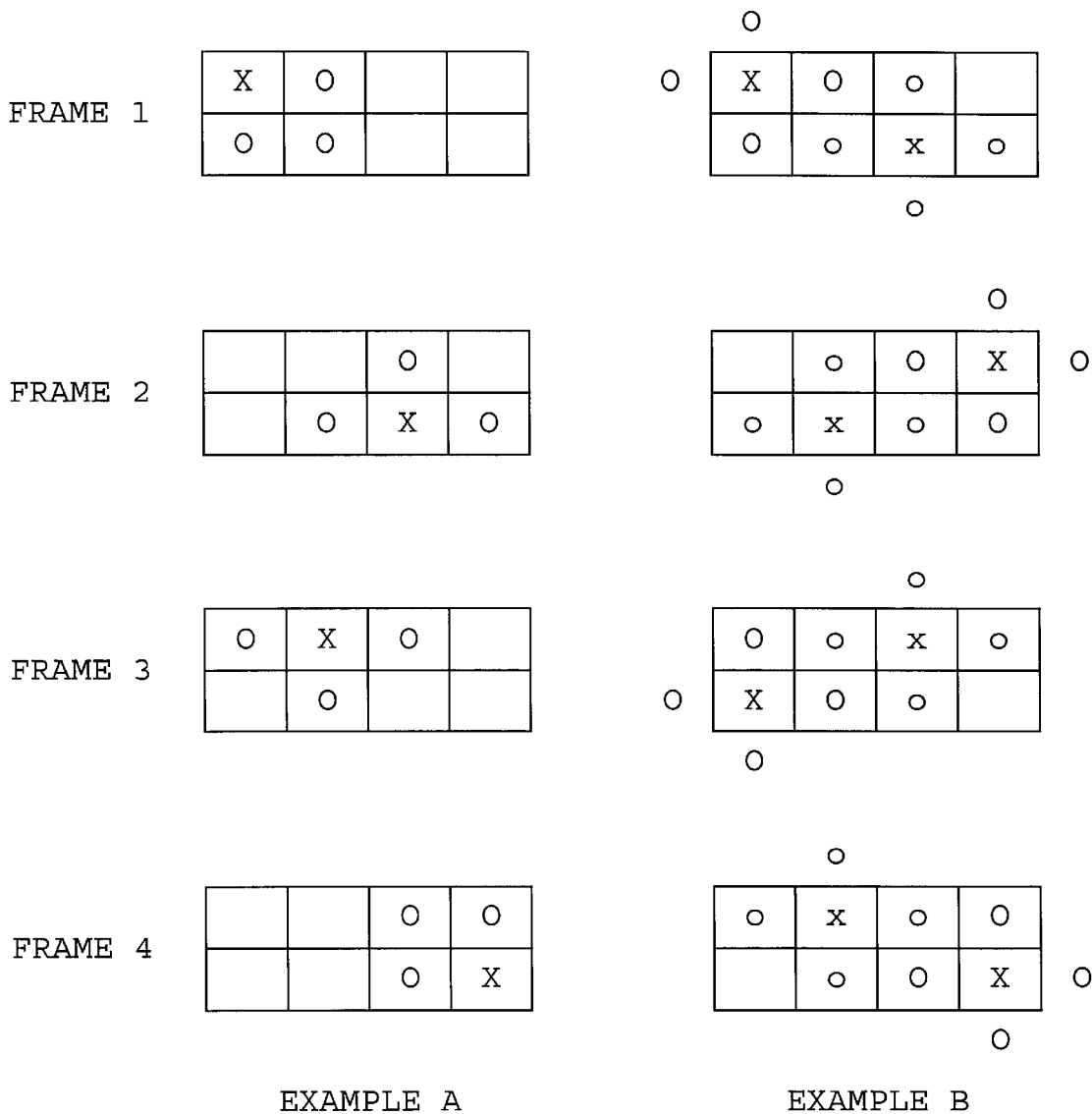
FIG. 44 depicts N×M rectangular multi-point cell data point selection patterns.

FIG. 44 depicts an N×M rectangular multi-point cell pattern, as described, above, in the section entitled "ADDING COMPLEXITY AND VARIATION". In Example A, four distributions of an x-point and 3 o-points are shown. There are four other related patterns (symmetrical about the horizontal mid-line) not shown which would allow extension to an eight frame cycle. Other variations from the disclosure may also be applied, such as shown in Example B.

FIG. 45 depicts a portion of a television receiver or video display monitor screen. The upper left image depicts transmitted points only (by Xs) in a (4+1):1 pattern. The upper right shows (by the letters A, B, C, and D), in addition, intermediate display points reconstructed by interpolation of a more complex computational method, such as is discussed, above, in the section entitled "INTERMEDIATE POINT RECONSTRUCTION". The lower left image instead shows, with the X-points, points which have been retained or "accumulated" for 1, 2, 3, or 4 frame times, as indicated, while the position of the X-points has changed, as discussed, above, in the section entitled "FRAME STORE TECHNIQUES". The lower right image shows how two screen sections (a central rectangle and the border area) would display the transmitted and either the "reconstructed" or "accumulated" information.

Figure 46:
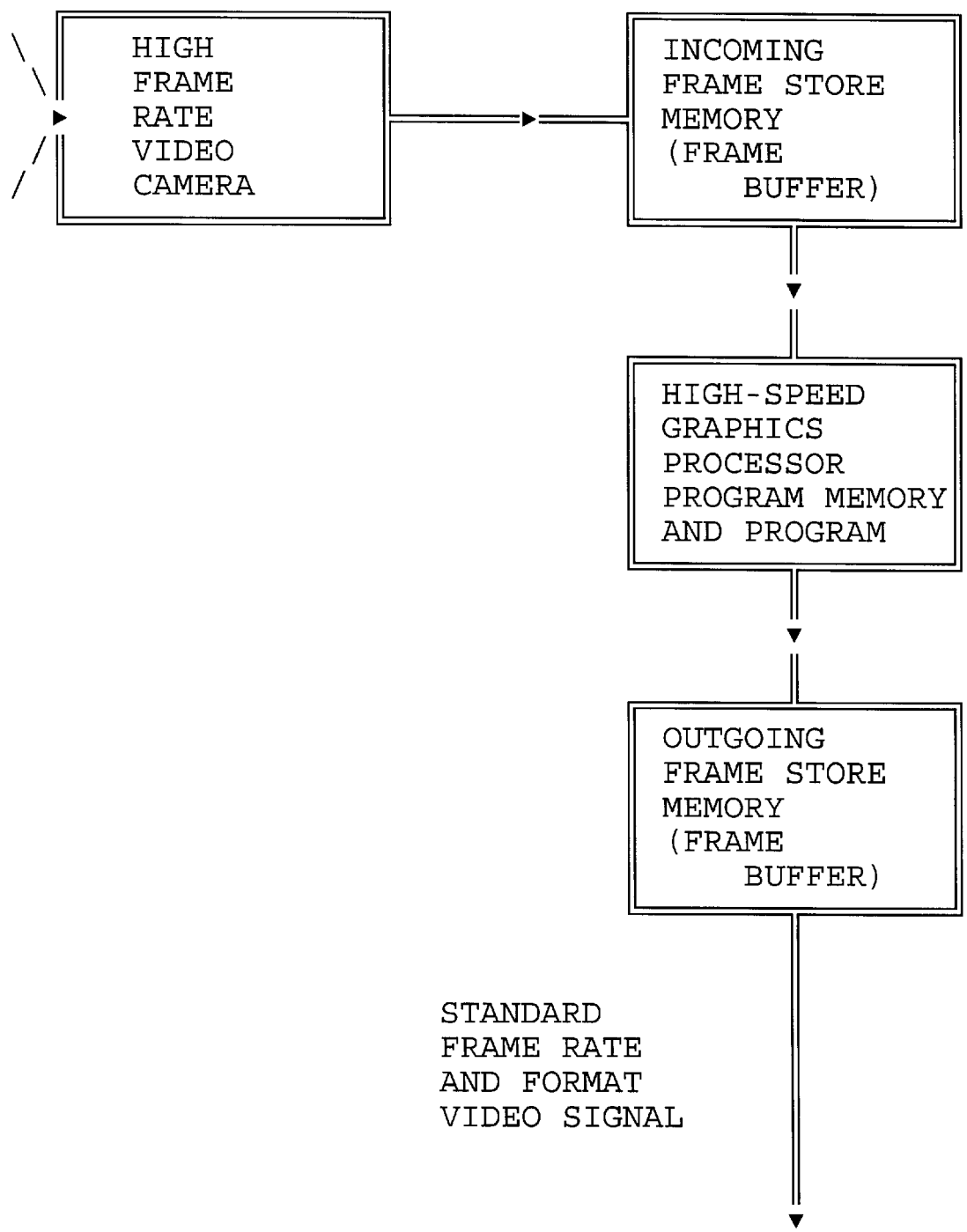
FIG. 46 depicts a system diagram for a camera employing irregular time interval variable STS operation.

FIG. 46 depicts a camera system capable of "irregular frame rate" operation, as discussed, above, in the section entitled "ADDING COMPLEXITY AND VARIATION". Shown are a high frame-rate video camera and input and output frame buffers connected to a high-speed graphics processor with program memory and-software, all of which are standard off-the-shelf items. These may be combined in a single package or plugged together. As information comes into the input frame buffer from the camera, it is selectively transferred to the output frame buffer, by the graphics processor, at irregular time intervals, by the "frame full" or in smaller sections, for output at standard display rates and formats.

The flows depicted in the software flow diagrams herein are exemplary, some items may be ordered differently, combined in a single step, skipped entirely, or accomplished in a different manner. However, the depicted flows will work. In particular, some of these functions may be carried out by hardware components, or by software routines residing on, or supplied with, such a component.

Similarly the systems depicted in the system diagrams herein are exemplary, some items may be organized differently, combined in a single element, omitted entirely, or accomplished in a different manner. However, the depicted systems will work. In particular, some of these functions may be carried out by hardware components, or by software routines residing on, or supplied with, such a component.

It will thus be seen that the objects set forth above, among those made apparent from the preceding description, are efficiently attained and certain changes may be made in carrying out the above method and in the construction set forth. Accordingly, it is intended that all matter contained in the above description or shown in the accompanying figures shall be interpreted as illustrative and not in a limiting sense.

NOTES

1. Typical examples include:

Digital Video: Selections from the SMPTE Journal and Other Publications, Society of Motion Picture and Television Engineers, Inc. (SMPTE), 1977.

Digital Video Volume 2, SMPTE 1979.

Digital Video Volume 3, SMPTE 1980.

Graphics Engines, Margery Conner, Electronic Design News (EDN), Cahners Publishing Company, Newton, ma, Volume 32, Number 5, Mar. 4, 1987, pages 112–122.

Algorithms for Graphics and Image Processing, Theo Pavlidis, Computer Science Press 1982.

Computer Vision, Ballard and Brown, Prentice-Hall, Englewood Cliffs 1982.

Industrial Applications of Machine Vision, IEEE Computer Society, Los Angeles 1982.

Structured Computer Vision, Ed. Tanimoto and Klinger, Academic Press, New York 1980.

Computer Architecture for Pattern Analysis and Image Database Management, IEEE Computer Society Press, Hot Springs 1981.

Image Processing System Architectures, Kittler & Duff, John Wiley & Sons, Inc., New York 1985.

Multiresolution Image Processing and Analysis, Ed. A. Rosenfeld, Springer-Verlag, New York 1984.

Image Reconstruction from Projections, Gabor T. Herman, Academic Press 1980.

Basic Methods of Tomography and Inverse Problems, Langenberg and Sabatier, Adam Hilger, Philadelphia 1987.

U.S. Pat. No. 2,940,005 issued Jun. 7, 1960, Inventor: P. M. G. Toulon.

Principles of Interactive Computer Graphics, Second Ed., Newman & Sproull, McGraw-Hill Book Company, New York 1979.

Advances in Image Processing and Pattern Recognition, Elsevier Science Publishers B.V., Amsterdam, 1986.

Image Recovery Theory and Application, Henry Stark, Academic Press, Inc., New York 1987. Handbook of Pattern Recognition and Image Processing, Ed. Tzay Y. Young, Academic Press, Inc., New York 1986.

Fundamentals of Interactive Computer Graphics, Foley and Van Dam, Addison-Wesley, New York, 1982.

Real Linear Algebra, Anatal E. Fekete, Marcel Dekker, Inc., New York 1985.

Finite Dimensional Multilinear Algebra, Parts I & II, Marvin Marcus, Marcel Dekker, Inc., New York 1973.

Sparse Matrix Computations, Ed. Bunch & Rose, Academic Press, Inc., New York 1976.

Matrix Computations and Mathematical Software, John R. Rice, McGraw-Hill Book Company, New York 1981.

The Architecture of Pipelined Computers, Peter M. Kogge, McGraw-Hill Book Company, New York 1981.

Digital System Design and Microprocessors, John P. Hayes, McGraw-Hill Book Company, New York 1984.

*Digital Filters and the Fast Fourier Transform*, Ed. Bede Liu, Dowden, Hutchenson and Ross, Inc., Stroudsburg 1975.

*Hardware and Software Concepts in VLSI*, Ed. Guy Rabbat, Van Nostrand Reinhold Company, Inc., New York 1983.

*Digital Signal Processing*, Oppenheim and Schafer, Prentice Hall, Inc., Englewood Cliffs 1975.

*Movements of the Eyes*, R. H. S. Carpenter, Pion, Limited, London 1977.

*Service Manual*: DCX-3000 3-Chip CCD Video Camera, SONY Corporation.

*Color Television*: Principles and Servicing 1973.

*Multi-Dimensional Sub-Band Coding: Some Theory and Algorithms*, Martin Vetterli, Signal Processing 6 (1984) 97–112, Elvsevier Science Publishers B.V. North-Holland, p. 97–112.

*The Laplacian Pyramid as a Compact Image Code*, Burt and Adelson, IEEE Transactions on Communications, Vol. Com-31, No. April 1983, p. 532–540.

*Exact Reconstruction Techniques for Tree-Structured Subband Coders*, Smith & Barnwell, IEEE Transactions on Acoustics, Speech and Signal Processing, Vol. ASSP-34, No. 3 June 1986, p. 434–441.

*Theory and Design of M-Channel Maximally Decimated Quadrature Mirror Filters with Arbitrary M, Having the Perfect Reconstruction Property*, P. P. Vaidyanathan, IEEE Transactions on Acoustics, Speech and Signal Processing, Vol. ASSP-35, No. 4, April 1987, p. 476–492.

*Application of Quadrature Mirror Filters to Split Band Voice Coding Schemes*, Esteban & Galand, IBM Laboratory, 06610, La Gaude, France.

*Extended Definition Television with High Picture Quality*, Broder Wendland, SMPTE Journal, October 1983, p. 1028–1035.

In addition, for information on the state of general knowledge in fields related to computer science, one may consult *The McGraw-Hill Computer Science Series* (and *Series in Artificial Intelligence*) including, but not limited to, the following selected titles, all published by McGraw-Hill Book Company, New York in 1983 or before:

*The Design and Analysis of Computer Communication Networks*, Ahuja

*The Design and Analysis of Instruction Set Processors*, Barbacci and Siewiorek

*Computer Structures*, Bell and Newell

*Digital Computer Arithmetic*, Cavanagh

*Systems Programming*, Donovan

*Coordinated Computing*, Filman and Friedman

*Computer Organization and Programming*, Grear

*Introduction to the Design and Analysis of Algorithms*, Goodman and Hedetniemi

*Computer Organization*, Hamacher, Vranesic, and Zaky

*Computer Architecture and Organization*, Hays

*Digital Computer Systems Principles*, Hellerman

*Computer System Performance*, Hellerman and Conroy

*Microprogramming Primer*, Katzan

*Operating Systems*, Madnick and Donovan

*Mathematical Theory of Computation*, Manna

*Introduction to Simulation: Programming Techniques and Methods of Analysis*, Payne

*Matrix Computations and Mathematical Software*, Rice

*Software Engineering: Design, Reliability, and Management*, Shooman

*Computer Structures: Principles and Examples*, Siewiorek, Ball and Newell

*Introduction to Computer Organization and Data Structures*, Stone

*Computing: An Introduction to Procedures and Procedure-Followers*, Tonge and Feldman

*An Introduction to Computer Science: An Algorithmic Approach*, Tremblay and Bunt

*Discrete Mathematical Structures with Applications to Computer Science*, Tremblay and Manohar

*An Introduction to Data Structures with Applications*, Tremblay and Sorenson

*Programming Languages*, Tucker

*Knowledge-Based Systems in Artificial Intelligence*, David and Lenat

*Computers and Thought*, Feigenbaum and Feldman

*Problem Solving Methods in Artificial Intelligence*, Nilsson

*Artificial Intelligence*, Rich

*The Psychology of Computer Vision*, Winston

2. See, for example:

*Digital Video: Selections from the SMPTE Journal and Other Publications*, Society of Motion Picture and Television Engineers, Inc. (SMPTE), 1977.

*Digital Video Volume 2*, SMPTE 1979.

*Digital Video Volume 3*, SMPTE 1980.

*Extended Definition Television with High Picture Quality*, Broder Wendland, SMPTE Journal, October 1983, p. 1028–1035.

3. For example:

PIP-512, PIP-1024 and PIP-EZ (software); PG-640 & PG-1280; MVP-AT & Imager-AT (software), all for the IBM-PC/AT, from Matrox Electronic Systems, Ltd. Que., Canada.

The Clipper Graphics Series (hardware and software), for the IBM-PC/AT, from Pixelworks, New Hampshire.

TARGA (several models with software utilities) and AT-VISTA (with software available from the manufacturer and Texas Instruments, manufacturer of the TMS34010 onboard Graphics System Processor chip), for the IBM-PC/AT, from AT&T EPICenter/Truevision, Inc., Indiana.

The low-end Pepper Series and high-end Pepper Pro Series of boards (with NNIOS software, and including the Texas Instruments TMS34010 onboard Graphics System Processor chip) from Number Nine Computer Corporation, Massachusetts.

4. For example:

FGS4000 and FGS4500 high-resolution imaging systems from Broadcast Television Systems, Utah.

911 Graphics Engine and 911 Software Library (that runs on an IBM-PC/AT connected by an interface cord) from Megatek, Corporation, California.

One/80 and One/380 frame buffers (with software from manufacturer and third parties) from Raster Technologies, Inc., Massachusetts.

Image processing systems manufactured by Pixar, Inc., California.

And many different models of graphic-capable workstations from companies such as Apollo, SUN and Silicon Graphics, Inc.

5. For Example:

GMP VLSI Graphics Microprocessor from Xtar Electronics, Inc., Illinois.

Advanced Graphics Chip Set (including the RBG, BPU, VCG and VSR) from National Semiconductor Corporation, California.

TMS34010Graphics System Processor (with available Software Development Board, Assembly Language Tools, "C" Cross-Compiler and other software) from Texas Instruments, Texas.
6. Such as Inventor's own film colorization system subject of U.S. Pat. No. 4,606,625 issued Aug. 19, 1986.
7. *The Media Lab: Inventing the Future at MIT*, Stewart Brand, Viking Press, New York 1987, page 72.
8. Reference to be supplied.
9. Also referred to as microsaccades; see, for example: *Movements of the Eyes*, R. H. S. Carpenter, Pion, Limited, London 1977.
10. See note 1.
11. For example, the RAND, RANDOM and RANDOMIZE function subroutines in "C" compiler libraries.
12. See note 2.
13. See, for example:
    *Fundamentals of Interactive Computer Graphics*, Foley and Van Dam, Addison-Wesley, New York, 1982.
    *Principles of Interactive Computer Graphics*, Second Ed., Newman & Sproull, McGraw-Hill Book Company, New York 1979.
14. See note 13.
15. See note 3.
16. See, for example: *Color Television: Principles and Servicing* 1973; and, Note 13.
17. *The Architecture of Pipelined Computers*, Peter M. Kogge, McGraw-Hill Book Company, New York 1981.
18. See for example:
    *Algorithms for Graphics and Image Processing*, Theo Pavlidis, Computer Science Press 1982.
    *Computer Vision*, Ballard and Brown, Prentice-Hall, Englewood Cliffs 1982.
    *Industrial Applications of Machine Vision*, IEEE Computer Society, Los Angeles 1982.
    *Structured Computer Vision*, Ed. Tanimoto and Klinger, Academic Press, New York 1980.
    *Multiresolution Image Processing and Analysis*, Ed. A. Rosenfeld, Springer-Verlag, New York 1984.
    *Advances in Image Processing and Pattern Recognition*, Elsevier Science Publishers B.V., Amsterdam, 1986.
    *Handbook of Pattern Recognition and Image Processing*, Ed. Tzay Y. Young, Academic Press, Inc., New York 1986.
    *Digital Signal Processing*, Oppenheim and Schafer, Prentice Hall, Inc., Englewood Cliffs 1975.
19. For example: the DQ422 VideoGraphics Interface by Diaquest, Inc., California or a similar system from Lyon-Lamb will permit output from IBM-PC frame buffers to be recorded single frame to ¾" videotape recorders. Similarly, professional or "broadcast quality" solutions exist when using 1" or 2" high-band videotape recorders.
20. For example, SMPTE time code signals, "user bits", and certain color reference signals are sometimes present during the vertical blanking signal.
21. See note 18.
22. For example, the Laplacian function may be applied for image sharpening (high-pass filtering) which involves a digital filtering kernel which subtracts the values of neighboring pixels from the pixel in question.
23. For example, see:
    *Algorithms for Graphics and Image Processing*, Theo Pavlidis, Computer Science Press 1982.
    *Multiresolution Image Processing and Analysis*, Ed. A. Rosenfeld, Springer-Verlag, New York 1984.
    *Image Reconstruction from Projections*, Gabor T. Herman, Academic Press 1980.
    *Basic Methods of Tomography and Inverse Problems*, Langenberg and Sabatier, Adam Hilger, Philadelphia 1987.
    *Advances in Image Processing and Pattern Recognition*, Elsevier Science Publishers B.V., Amsterdam, 1986.
    *Image Recovery Theory and Application*, Henry Stark, Academic Press, Inc, New York 1987.
    *Handbook of Pattern Recognition and Image Processing*, Ed. Tzay Y. Young, Academic Press, Inc., New York 1986.
    *Digital Filters and the Fast Fourier Transform*, Ed. Bede Liu, Dowden, Hutchenson and Ross, Inc., Stroudsburg 1975.
    *Digital Signal Processing*, Oppenheim and Schafer, Prentice Hall, Inc., Englewood Cliffs 1975.
    *Multi-Dimensional Sub-Band Coding: Some Theory and Algorithms*, Martin Vetterli, Signal Processing 6 (1984) 97–112, Elvsevier Science Publishers B.V. North-Holland, p. 97–112.
    *The Laplacian Pyramid as a Compact Image Code*, Burt and Adelson, IEEE Transactions on Communications, Vol. Com-31, No. April 1983, p. 532–540.
    *Exact Reconstruction Techniques for Tree-Structured Subband Coders*, Smith & Barnwell, IEEE Transactions on Acoustics, Speech and Signal Processing, Vol. ASSP-34, No. 3 June 1986, p. 434–441.
    *Theory and Design of M-Channel Maximally Decimated Quadrature Mirror Filters with Arbitrary M, Having the Perfect Reconstruction Property*, P. P. Vaidyanathan, IEEE Transactions on Acoustics, Speech and Signal Processing, Vol. ASSP-35, No. 4, April 1987, p. 476–492.
    *Application of Quadrature Mirror Filters to Split Band Voice Coding Schemes*, Esteban & Galand, IBM Laboratory, 06610, La Gaude, France.
24. See Inventor's U.S. Pat. No. 4,925,294.
25. See, for example, the devices mentioned in Note 3 as having "onboard processor chips" or most of the devices or systems mentioned in Note 4.
26. See Notes 3 and 5.
27. See Note 4.
28. Example of code implementing (4+1):1 variable STS encoding.

```
/*
This computer program implements a (4+1):1 sampling pattern, as described in
    FIGS. 6 through 11 of the patent application.
The coordinate directions are called h and v, for horizontal and vertical, just
    to avoid possible confusion between x coordinates and (x)-type pixels.
*/
#define NH         102    /* size of output image in h direction */
#define NV          96    /* size of output image in v direction */
```

-continued

```
#define NPHASE      4    /* number of phases */
#define NOTYP       4    /* number of (o)-type pixels for each (x)-type */
#define XSPACE      5    /* spacing in h or v of pixels in input image */
#define XWEIGHT     6    /* the weight of (x)-type pixels */
#define DENOM       16   /* the denominator of the weight function */
/*
For each phase, this table gives the offsets of the (o)-type pixels associated
    with each (x)-type pixel, and the weights they are to be given when
    computing the output pixel.
*/
struct sts(
    int hoffs, voffs;
    int weight;
     )sts [NPHASE] [NOTYPE] =
{
    2, -1, 4,    -3, -1, 3,    2,  4, 2,    -3,  4, 1,    /* phase 1 of 4 */
   -1, -2, 4,    -1,  3, 3,    4, -2, 2,     4,  3, 1,    /* phase 2 of 4 */
   -2,  1, 4,     3,  1, 3,   -2, -4, 2,     3, -4, 1,    /* phase 3 of 4 */
    1,  2, 4,     1, -3, 3,   -4,  2, 2,    -4, -3, 1,    /* phase 4 of 4 */
};
/*
stsresample computes a compressed image for a single frame, using an STS
    resampling scheme. The parameter 'phase' indicates which phase of the STS
    is in effect.
stsresample calls two routines not defined here;
    GetInputPIXEL (h, v) to get pixel values from the high-definition input image,
    PutOutputPixel (h, v, value) to set pixel values in the compressed output
        image.
*/
stsresample (phase)
{
    int h, v;        /* horizontal and vertical coordinates */
    int pixel;       /* the output pixel value at a particular (h,v) */
    struct sts *stsp;  /* pointer to sts information */
    int i;
    for(v=0; v<=NV; v++) {
      for (h=0 ;h<=NH; h++) {
        pixel=GetInputPixel(h * XSPACE, v * XSPACE) * XWEIGHT;
        sts = &sts[phase-1] [0];
        for(i=0; i!=NOTYPE; i++)
          pixel+=step->weight*GetInputPixel(
            h*XSPACE+stsp->hoffs,
            v*XSPACE+stsp->voffs);
        PutOutputPixel (h, v, Pixel/DENOM);
      }
    }
}
```

What is claimed is:

1. A process for deriving a second information bearing signal comprising a second succession of data frames, from a first information bearing signal comprising a first succession of data frames, which process comprises the steps of:
   a. designating a selection of a set of potential data points from the set of all possible data points of a data frame of said first signal;
   b. designating a selection of a set of active data points from said set of potential data points;
   c. designating a selection of a set of to-be-transmitted points from said set of active data points;
   d. designating a selection of a set of to-be-sampled-but-not-transmitted points from said set of active data points;
   e. designating a selection of at least one set from said to-be-sampled-but-not-transmitted points and designating a selection of at least one set from said to-be-transmitted points and designating an association between those sets; and
   f. varying at least one of said designations from frame to frame.

2. A process as in claim 1, wherein at least one of said selected sets is a proper sub-set.

3. A process as in claim 1, wherein said selected set of to-be-sampled-but-not-transmitted points is the null set.

4. A process as claimed in claim 1, wherein said first information bearing signal is a video signal and comprising the additional step of:
   g. displaying said second information bearing signal on a video monitor of a resolution comparable to the bandwidth of the set of to-be-transmitted data points.

5. A process as claimed in claim 1, wherein said first information bearing signal is a video signal and comprising the additional step of:
   g. displaying said second information bearing signal on a video monitor of a resolution comparable to the bandwidth of the set of active data points.

6. A process as in claim 5, comprising the additional step between steps f. and g. of:
   creating, by interpolation, additional information intermediate to the to-be-transmitted information.

7. A process as in claim 5, comprising the additional step between steps f. and g. of:
   creating, by reconstruction, additional information intermediate to the to-be-transmitted information.

8. A process as in claim 5, comprising the additional step between steps f. and g. of:

storing said to-be-transmitted information in a frame store, and wherein at least some of said to-be-transmitted information is accumulated in said frame store while additional to-be-transmitted information is input.

9. A process as claimed in claim 1, wherein said first information bearing signal is a high-definition video signal and said designations are of such character as to allow said second information bearing signal to be compatibly displayed on both high-definition and low-definition receivers.

10. An improved device for encoding a first and storing a second information bearing signal comprising:
   a. standard input means to input said first information bearing signal;
   b. improved encoding means, connected to the output of said input means, wherein the improvement comprises employing the designation process as claimed in claim 2, to create from said first information bearing signal an encoded second information bearing signal; and
   c. standard storage means, connected to the output of said encoding means, to store said encoded second information bearing signal.

11. An improved device for transducing and encoding a first and outputting a second information bearing signal comprising:
   a. standard imaging means to transduce and input said first information bearing signal;
   b. improved encoding means, connected to the output of said input means, wherein the improvement comprises employing the designation process as claimed in claim 2, to create from said first information bearing signal an encoded second information bearing signal; and
   c. standard output means, connected to the output of said encoding means, to output said encoded second information bearing signal.

12. An improved device for encoding a first and outputting a second information bearing signal comprising:
   a. standard input means to input said first information bearing signal;
   b. improved encoding means, connected to the output of said input means, wherein the improvement comprises employing the designation process as claimed in claim 2, to create from said first information bearing signal an encoded second information bearing signal; and
   c. standard output means, connected to the output of said encoding means, to output said encoded second information bearing signal.

13. A process as in claim 1, further employing multi-point cells arranged in a (4+1):1 pattern.

14. A process as in claim 1, further employing multi-point cells arranged in a (2+1):1 pattern.

15. A product comprising said second information bearing signal created by the process of claim 1 and conveyed on an information bearing distribution medium.

16. A process as in claim 1, wherein at least one of said variations over time is applied at irregular time intervals to a multiplicity of points in a spatial distribution.

17. A process as in claim 1, wherein at least some of the data points comprising said signals are modulated by weighting factors.

18. A process as in claim 1, wherein at least one of said information bearing signals is separated into at least two areas and, for at least one of said designations, said designation is varied differently in at least two signal areas.

19. A process for synthesizing a second information bearing signal by applying the designation scheme of claim 1, to a first information bearing signal comprising a computer generated data base.

20. A method as in claim 1 wherein data from said to-be-transmitted points is selected at every frame, and data from at least some of said to-be-sampled-but-not-transmitted points is selected for less than every frame.

21. A system component for deriving a second information bearing signal comprising a second succession of data frames, from a first information bearing signal comprising a first succession of data frames, which system component comprises:
   a. means for designating a selection of a set of potential data points from the set of all possible data points of a data frame of said first signal;
   b. means for designating a selection of a set of active data points from said set of potential data points;
   c. means for designating a selection of a set of to-be-transmitted points from said set of active data points;
   d. means for designating a selection of a set of to-be-sampled-but-not-transmitted points from said set of active data points;
   e. means for designating a selection of at least one set from said to-be-sampled-but-not-transmitted points and designating a selection of at least one set from said to-be-transmitted points and for designating an association between those sets; and
   f. means for varying at least one of said designations from frame to frame.

22. A process for deriving a second information bearing signal comprising a second succession of data frames, from a first information bearing signal comprising a first succession of data frames, which process comprises the steps of:
   a. designating a selection of a set of potential data points from the set of all possible data points of a data frame of said first signal;
   b. designating a selection of a set of active data points from said set of potential data points;
   c. designating a selection of a set of to-be-transmitted points from said set of active data points;
   d. designating a selection of a set of to-be-sampled-but-not-transmitted points from said set of active data points, wherein said set of to-be-sampled-but-not-transmitted points further comprise a multiplicity of sub-sets of to-be-sampled-but-not-transmitted points;
   e. designating a selection of at least one set of sub-sets from said to-be-sampled-but-not-transmitted points and designating a selection of at least one set from said to-be-transmitted points and designating an association between those sets; and
   f. varying at least one of said designations from frame to frame.

* * * * *